United States Patent
Yokoyama et al.

(10) Patent No.: US 12,422,929 B2
(45) Date of Patent: Sep. 23, 2025

(54) INFORMATION PROCESSING DEVICE, INFORMATION PROCESSING METHOD, PROGRAM, AND INFORMATION PROCESSING SYSTEM

(71) Applicant: Sony Group Corporation, Tokyo (JP)

(72) Inventors: Ryo Yokoyama, Tokyo (JP); Yusuke Nakagawa, Kanagawa (JP); Ayumi Nakagawa, Kanagawa (JP); Yohei Fukuma, Chiba (JP); Osamu Ito, Tokyo (JP); Takayoshi Yamasaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 203 days.

(21) Appl. No.: 18/039,156

(22) PCT Filed: Nov. 26, 2021

(86) PCT No.: PCT/JP2021/043341
§ 371 (c)(1),
(2) Date: May 26, 2023

(87) PCT Pub. No.: WO2022/118746
PCT Pub. Date: Jun. 9, 2022

(65) Prior Publication Data
US 2024/0028123 A1    Jan. 25, 2024

(30) Foreign Application Priority Data
Dec. 4, 2020   (JP) ................................ 2020-202222

(51) Int. Cl.
G06F 3/0482   (2013.01)
G06F 3/01   (2006.01)

(52) U.S. Cl.
CPC .............. G06F 3/016 (2013.01); G06F 3/011 (2013.01)

(58) Field of Classification Search
CPC ...... H04N 7/18; H04N 21/422; H04N 21/218; H04N 21/81; H04N 7/14; H04N 7/15; H04N 21/4782; H04N 23/80
See application file for complete search history.

(56) References Cited

U.S. PATENT DOCUMENTS 8,941,603 B2 *   1/2015   Karlsson ............. G06F 3/04842
                                                              340/407.1
2005/0140778 A1 *   6/2005   Kim ..................... H04M 1/0245
                                                              348/14.02
(Continued)

FOREIGN PATENT DOCUMENTS

JP   2002-314963 A   10/2002
JP   2016-083711 A   5/2016
(Continued)

Primary Examiner — Rayeez R Chowdhury
(74) Attorney, Agent, or Firm — Paratus Law Group, PLLC

(57) ABSTRACT

There is provided an information processing device (300) including a first acquisition unit (308) that acquires, according to an input from a first user, a control command including presentation unit information designating a presentation unit that presents a haptic stimulus by a haptic presentation device, and form information designating a form of the haptic stimulus, a generation unit (310) that generates, according to the control commands, a first haptic control signal to present the haptic stimulus to the presentation unit; and a first distribution unit (302) that distributes the first haptic control signal to the haptic presentation device worn on a body of each of a plurality of second users designated by the input by the first user.

22 Claims, 56 Drawing Sheets

(56) References Cited

U.S. PATENT DOCUMENTS

| | | | | |
|---|---|---|---|---|
| 2016/0248769 A1* | 8/2016 | Han | ................ | H04L 63/0861 |
| 2016/0321939 A1* | 11/2016 | Anantha | ................ | G09B 19/06 |
| 2018/0001192 A1* | 1/2018 | Vaughn | ................ | A63F 13/212 |
| 2018/0374264 A1* | 12/2018 | Gatson | ................ | G01S 15/87 |
| 2020/0241643 A1* | 7/2020 | Kim | ................ | G08B 5/38 |
| 2023/0215288 A1* | 7/2023 | Sha | ................ | G09B 19/00 |

FOREIGN PATENT DOCUMENTS

| | | |
|---|---|---|
| JP | 2017-005616 A | 1/2017 |
| JP | 2017-182539 A | 10/2017 |
| WO | WO 2018/008217 A1 | 1/2018 |
| WO | WO 2018/105266 A1 | 6/2018 |
| WO | WO 2019/163260 A1 | 8/2019 |

* cited by examiner

INFORMATION PROCESSING DEVICE, INFORMATION PROCESSING METHOD, PROGRAM, AND INFORMATION PROCESSING SYSTEM

CROSS REFERENCE TO PRIOR APPLICATION

This application is a National Stage Patent Application of PCT International Patent Application No. PCT/JP2021/043341 (filed on Nov. 26, 2021) under 35 U.S.C. § 371, which claims priority to Japanese Patent Application No. 2020-202222 (filed on Dec. 4, 2020), which are all hereby incorporated by reference in their entirety.

FIELD

The present disclosure relates to an information processing device, an information processing method, and a program, and information processing system.

BACKGROUND

In recent years, consumption activities of consumers have shifted from "consumption of goods" that is simple purchase of a product to "consumption of services" in which payment is made for an experience with a high added value. For example, also in an entertainment field such as music and an animation, consumers are strongly demanding not only a one-way experience such as viewing a live performance of an artist (distributor) or the like but also a real-time and interactive experience with a higher added value, such as interaction with the artist or between fans.

For example, as an example of such an experience, there is "tipping" to transmit data such as an illustration or text or to transmit money together with the data by a viewer of content to an artist or the like who distributes the content on the Internet. By a communication between the artist and the viewer via such "tipping", the viewer can experience a higher added value. As a result, a sense of satisfaction of the viewer with the content is further enhanced, and buying intention thereof for such a "service" is increased.

CITATION LIST

Patent Literature

Patent Literature 1: WO 2018/008217 A

SUMMARY

Technical Problem

Conventionally, a device to present a haptic stimulus such as vibration to a user has been proposed. For example, as an example, there is a jacket-type haptic presentation device described in Patent Literature 1. Such a haptic presentation device is mounted on a user in a movie theater, a theme park attraction, or the like, and is controlled to be synchronized with reproduced content viewed by the user, whereby presence of the provided reproduced content can be further amplified.

Thus, the present disclosure proposes an information processing device, an information processing method, a program, and an information processing system capable of providing a viewer with a real-time and interactive experience with a high added value by using such a haptic presentation device.

Solution to Problem

According to the present disclosure, there is provided an information processing device including: a first acquisition unit that acquires, according to an input from a first user, a control command including presentation unit information designating a presentation unit that presents a haptic stimulus by a haptic presentation device, and form information designating a form of the haptic stimulus; a generation unit that generates, according to the control command, a first haptic control signal to present the haptic stimulus to the presentation unit; and a first distribution unit that distributes the first haptic control signal to the haptic presentation device worn on a body of each of a plurality of second users designated by the input by the first user.

Furthermore, according to the present disclosure, there is provided an information processing device including: a first acquisition unit that acquires, according to an input from a first user, identification information to specify presentation unit information designating a presentation unit that presents a haptic stimulus by a haptic presentation device and form information designating a form of the haptic stimulus; a generation unit that generates, on a basis of the identification information and a database stored in advance, a first haptic control signal to present the haptic stimulus to the presentation unit; and a first distribution unit that distributes the first haptic control signal to the haptic presentation device worn on a body of each of a plurality of second users designated by the input by the first user.

Furthermore, according to the present disclosure, there is provided an information processing method including: acquiring, according to an input from a first user, a control command including presentation unit information designating a presentation unit that presents a haptic stimulus by a haptic presentation device, and form information designating a form of the haptic stimulus; generating, according to the control command, a first haptic control signal to present the haptic stimulus to the presentation unit; and distributing the first haptic control signal to the haptic presentation device worn on a body of each of a plurality of second users designated by the input by the first user, by an information processing device.

Furthermore, according to the present disclosure, there is provided a program for causing a computer to realize: a function of acquiring, according to an input from a first user, a control command including presentation unit information designating a presentation unit that presents a haptic stimulus by a haptic presentation device, and form information designating a form of the haptic stimulus; a function of generating, according to the control command, a first haptic control signal to present the haptic stimulus to the presentation unit; and a function of distributing the first haptic control signal to the haptic presentation device worn on a body of each of a plurality of second users designated by the input by the first user.

Furthermore, according to the present disclosure, there is provided an information processing system including an information processing device and a distribution device. In the information processing system, the information processing device includes: a first acquisition unit that acquires, according to an input from a first user, a control command including presentation unit information designating a presentation unit that presents a haptic stimulus by a haptic presentation device, and form information designating a form of the haptic stimulus; a generation unit that generates, according to the control command, a first haptic control signal to present the haptic stimulus to the presentation unit;

and a first distribution unit that distributes the first haptic control signal to the haptic presentation device worn on a body of each of a plurality of second users designated by the input by the first user. In the information processing system, the distribution device includes an image generation unit that superimposes a predetermined image, which is generated on a basis of the input, on an image of a real space distributed to the first user.

DESCRIPTION OF EMBODIMENTS

Figure 1:
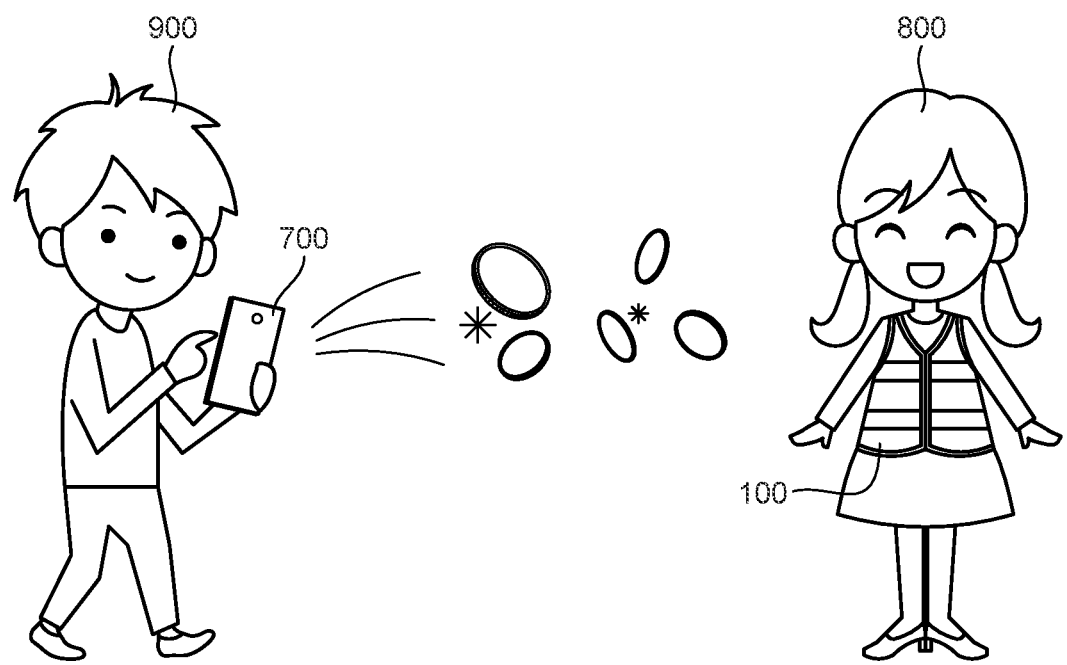
FIG. 1 is an explanatory diagram (part 1) for describing an outline of an embodiment of the present disclosure.

In the following, preferred embodiments of the present disclosure will be described in detail with reference to the accompanying drawings. Note that the same reference signs are assigned to components having substantially the same functional configuration, and overlapped description is omitted in the present specification and the drawings. Furthermore, in the present specification and the drawings, similar components of different embodiments may be distinguished by assignment of different alphabets after the same reference numerals. However, in a case where it is not specifically necessary to distinguish the plurality of similar components from each other, only the same reference sign is assigned.

Note that the description will be made in the following order.

Figure 2:
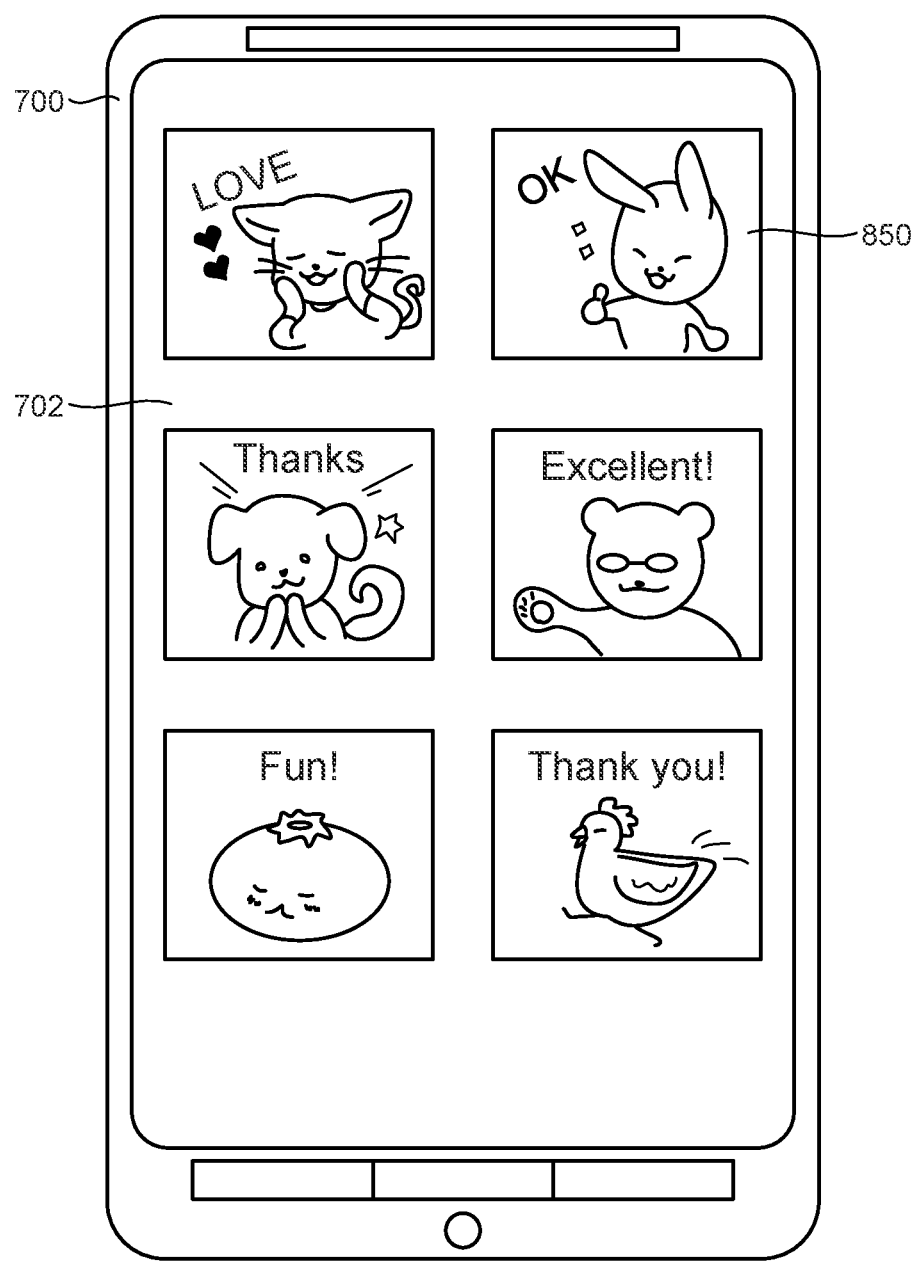
FIG. 2 is an explanatory diagram (part 2) for describing the outline of the embodiment of the present disclosure.

1. Outline of an embodiment of the present disclosure
2. Outline of an information processing system 10 of the present disclosure
   2.1 Outline of the information processing system 10
   2.2 Detailed configuration of a haptic presentation device 100
   2.3 Detailed configuration of a server for haptics 300
   2.4 Detailed configuration of a distribution data editing server 400
   2.5 Detailed configuration of a live distribution server 500
   2.6 Detailed configuration of a user terminal 700
3. First Embodiment
4. Second Embodiment
5. Third Embodiment
6. Fourth Embodiment
7. Fifth Embodiment
8. Sixth Embodiment
9. Seventh Embodiment
10. Eighth Embodiment
11. Ninth Embodiment
12. Conclusion
13. First modification example of an information processing system 10 of the present disclosure
14. Second modification example of an information processing system 10 of the present disclosure
15. Method of outputting a haptic stimulus
16. Modification example of a stamp display
17. Hardware configuration
18. Supplementary note 1. Outline of an Embodiment of the Present Disclosure First, before describing details of embodiments of the present disclosure, an outline of an embodiment of the present disclosure created by the present inventors will be described with reference to FIG. 1 and FIG. 2. FIG. 1 and FIG. 2 are explanatory diagrams for describing the outline of the embodiment of the present disclosure.

As described above, consumption activities of consumers have shifted from "consumption of goods" to "consumption of services" in recent years. Specifically, in an entertainment field, consumers are strongly demanding not only a one-way experience such as viewing a live performance of an artist or the like but also a real-time and interactive experience with a higher added value, such as interaction with the artist.

Thus, in view of such a situation, the present inventors have intensively studied whether it is possible to provide a viewer with an experience with a higher added value, and conceived to use a haptic presentation device (haptic device) that presents a haptic stimulus such as vibration to a wearer. The present inventors have considered that the viewer can acquire an experience with a higher added value by using such a haptic presentation device.

In the embodiment of the present disclosure created on the basis of such an idea, a distributor 800 who causes a performance or content to be viewed or performs distribution thereof is caused to wear, for example, a vest-type haptic presentation device 100 as illustrated in FIG. 1. The haptic presentation device 100 includes a plurality of haptic stimulation units (such as actuators or the like) inside. Furthermore, when receiving a predetermined signal, each of the haptic stimulation units can present a haptic stimulus to the distributor 800 who is the wearer. Then, as illustrated in FIG. 2, a viewer 900 selects one stamp with a haptic stimulus effect 850 from among a plurality of stamps with a haptic stimulus effect 850 displayed on a display unit 702 of a user terminal 700, and transmits the selected stamp with a haptic stimulus effect 850. Then, by transmission of the selected stamp with a haptic stimulus effect 850, a predetermined haptic control signal corresponding to a haptic stimulus given to the stamp 850 is transmitted to the haptic stimulation unit (so-called "tipping" with a haptic stimulus effect is performed). Furthermore, the haptic stimulation unit presents the haptic stimulus corresponding to the selected stamp with a haptic stimulus effect 850 to the wearer on the basis of the received predetermined haptic control signal.

Thus, when the distributor 800 perceives the presented haptic stimulus and takes an action, the viewer 900 can check the action induced by the haptic stimulus presented by the stamp 850 transmitted by the viewer himself/herself in real time. Then, when it is possible to check the action induced by the haptic stimulus related to the stamp 850 transmitted by the viewer himself/herself in real time, the viewer 900 can feel that direct interaction with the distributor 800 is made, that is, an experience with higher added value can be acquired.

In such a manner, in the embodiment of the present disclosure created by the present inventors, not only visual information such as an illustration, an animation, and text and auditory information such as music but also haptic information can be transmitted from the viewer 900 to the distributor 800. Thus, according to the embodiment of the present disclosure, it is possible to provide the viewer 900 with a real-time and interactive experience with a high added value, and a sense of satisfaction of the viewer 900 with respect to a performance or content is further enhanced, or buying intention for such a "service" is increased. Hereinafter, details of the embodiments of the present disclosure created by the present inventors will be sequentially described.

2. Outline of an Information Processing System 10 of the Present Disclosure

Figure 3:
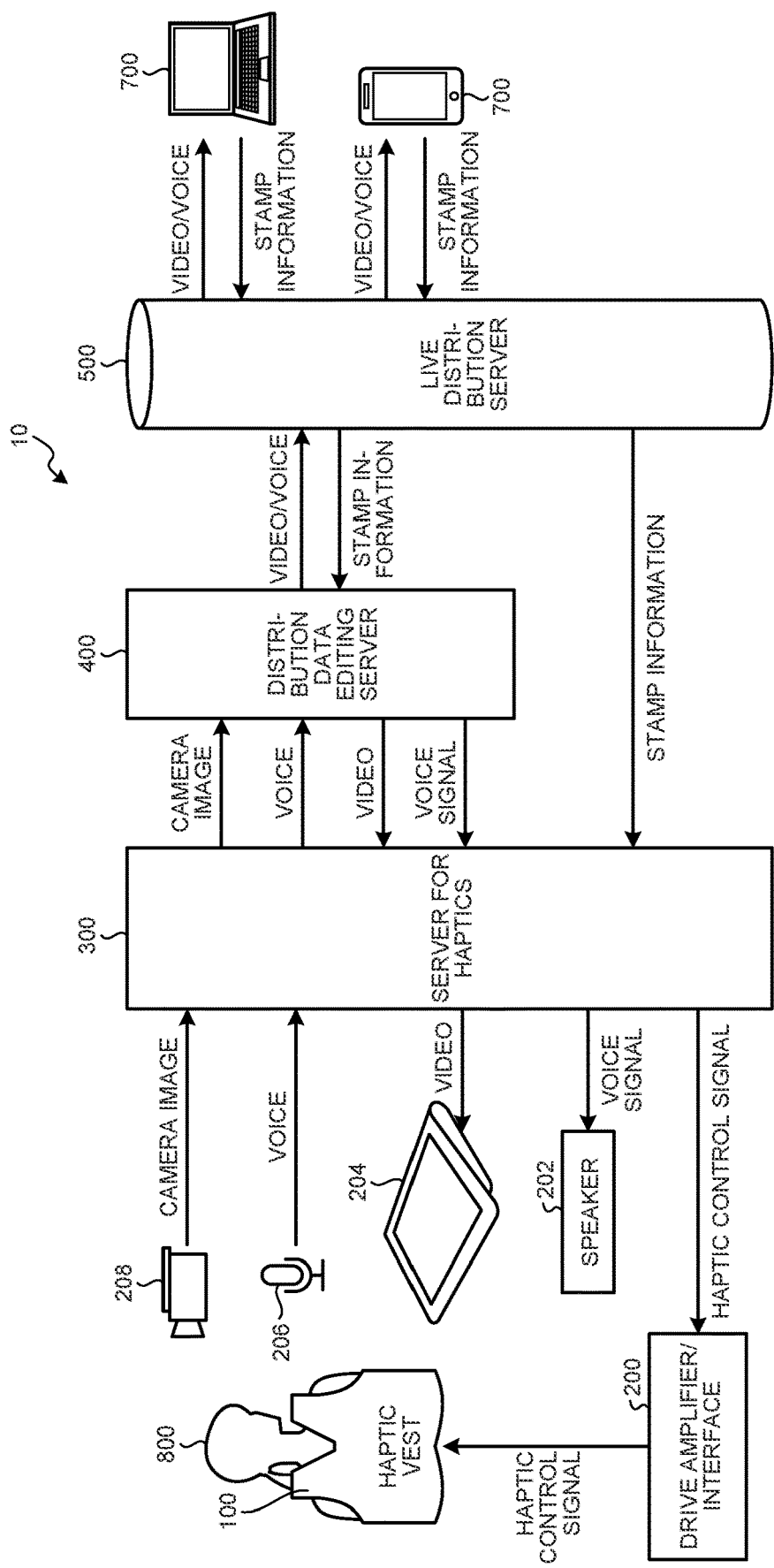
FIG. 3 is a system diagram illustrating a schematic configuration example of an information processing system 10 according to the embodiment of the present disclosure.

<2.1 Outline of the Information Processing System 10>
First, an outline of the information processing system 10 according to an embodiment of the present disclosure will be described with reference to FIG. 3. FIG. 3 is a system diagram illustrating a schematic configuration example of the information processing system 10 according to the embodiment of the present disclosure. In the following description, it is assumed that the distributor 800 and the viewer 900 exist in different spaces or in the same space. That is, for example, the viewer 900 may directly view appearance of the distributor 800 or may view a distributed video of the distributor 800 in the information processing system 10.

Specifically, as illustrated in FIG. 3, in the information processing system 10 according to the present embodiment, for example, a haptic presentation device 100, a drive amplifier/interface 200, a speaker 202, a monitor 204, a microphone (hereinafter, referred to as a microphone) 206, and a camera 208 are arranged on a side of the distributor 800. Furthermore, in the information processing system 10, for example, a server for haptics (information processing device) 300, a distribution data editing server 400, and a live distribution server 500 (another information processing device) are arranged between the side of the distributor 800 and a side of the viewer 900. Furthermore, in the information processing system 10, a smartphone or a tablet as an example of the user terminal 700 is arranged on the side of the viewer 900. The devices included in the information processing system 10 can perform transmission to and reception from each other via various communication networks such as a wired/wireless local area network (LAN), Wi-Fi (registered trademark), Bluetooth (registered trademark), a mobile communication network (long term evolution (LTE), fifth generation mobile communication system (5G)), and the like. Note that the number of devices included in the information processing system 10 is not limited to the number of devices illustrated in FIG. 3, and may be larger. Furthermore, the information processing system 10 may include a device not illustrated in FIG. 3. For example, the information processing system 10 can include a general-purpose personal computer (PC), a game machine, a mobile phone, a portable media player, a speaker, a projector, a display (such as digital signage), a wearable device such as headphones, smart glasses, or a smart watch, and the like.

Note that, in the information processing system 10 illustrated in FIG. 3, for example, the server for haptics 300 that manages presentation of a haptic stimulus, the distribution data editing server 400 in which application for editing a video and voice to be distributed to the viewer 900 is built, and the live distribution server 500 that manages distribution to the viewer 900 may be operated by different business operators. That is, in the present embodiment, a business operator that manages and operates each server is not specifically limited, and all of business operators that operate the servers may be different, or a part or all of the servers may be operated by a common business operator. Hereinafter, an outline of each of the devices included in the information processing system 10 according to the present embodiment will be described.

(Haptic Presentation Device 100)

The haptic presentation device 100 includes, for example, a device that can be worn on a body. In the present embodiment, the haptic presentation device 100 is assumed to be, for example, a vest-type (sleeveless outerwear-shaped) device worn by the distributor 800. As described above, the vest-type haptic presentation device 100 includes the plurality of haptic stimulation units (not illustrated) inside. For example, the predetermined number (for example, 6) of haptic stimulation units can be arranged on each of a front side and a back side of the distributor 800 inside the haptic presentation device 100. As an example, the individual haptic stimulation units arranged on the front side and the individual haptic stimulation units arranged on the back side are arranged in a positional relationship of facing each other.

Note that in the present embodiment, a shape of the haptic presentation device 100 is not limited to the vest type, and may be an outerwear shape having sleeves. In this case, one or more haptic stimulation units may be arranged not only on a chest and an abdomen of the distributor 800 but also at positions corresponding to both arms of the distributor 800. Furthermore, in the present embodiment, the haptic presentation device 100 is not limited to have an outerwear shape, and may have a shape of pants, shoes, a belt, a hat, gloves, a mask, or the like.

Furthermore, one microphone 206 may be arranged on each of right and left shoulder portions of the haptic presentation device 100, one microphone 206 may be arranged on one of the right and left sides, or three or more microphones 206 may be arranged. Furthermore, the microphone 206 may be arranged around the distributor 800 as another device independent of the haptic presentation device 100. Furthermore, a worn state detection sensor (such as a fastener type sensor, a pressure sensor, or the like) (not illustrated) to detect a worn state of the haptic presentation device 100, an inertial measurement unit (IMU) (not illustrated) to detect a motion and a posture of the distributor 800, a biological information sensor to detect biological information of the distributor 800 (such as a sensor that senses a heart rate, a pulse, brain waves, respiration, perspiration, myoelectric potential, a skin temperature, skin electric resistance, eye movement, a pupil diameter, or the like) (not illustrated), and the like may be built in the haptic presentation device 100. Note that a detailed configuration of the haptic presentation device 100 will be described later.

(Drive Amplifier/Interface 200)

The drive amplifier/interface 200 is an interface that transmits and receives a haptic control signal to and from the haptic presentation device 100 and the server for haptics 300. For example, the drive amplifier/interface 200 can acquire profile information (such as function information) of the haptic presentation device 100 from the haptic presentation device 100, convert and amplify a haptic control signal generated by the server for haptics 300, and perform transmission thereof to the haptic presentation device 100.

(Monitor 204)

For example, the monitor 204 can display a video or the like of the distributor 800, which video or the like is captured by the camera 208 (described later), toward the distributor 800, and the monitor 204 can superimpose and display text, an icon, an animation, or the like on an image of the distributor 800. For example, the monitor 204 is realized by a liquid crystal display (LCD) device, an organic light emitting diode (OLED) device, or the like. Furthermore, in the present embodiment, a display unit (not illustrated) of the monitor 204 may be provided as a unit integrated with an input unit (not illustrated). In this case, the input unit is realized by, for example, a touch panel superimposed on the display unit. Furthermore, in the present embodiment, a speaker 202 that outputs voice to the distributor 800 may be provided in the monitor 204.

(Camera 208)

The camera 208 is one or a plurality of visible light cameras that images the distributor 800 from one viewpoint or multiple viewpoints, and a video photographed by the camera 208 is transmitted to the user terminal 700 on the side of the viewer 900 via the server for haptics 300, the distribution data editing server 400, and the live distribution server 500. Note that the camera 208 may capture an image of a periphery of the distributor 800 or a real object or the like present therearound. Specifically, the camera 208 includes a lens system including an imaging lens, a diaphragm, a zoom lens, a focus lens, and the like, and a drive system that causes the lens system to perform focusing operation and zooming operation. Furthermore, the camera 208 includes a solid imaging element array or the like that photoelectrically converts imaging light acquired by the lens system and generates an imaging signal. Note that the solid imaging element array may be realized by, for example, a charge coupled device (CCD) sensor array, a complementary metal oxide semiconductor (CMOS) sensor array, or the like.

(Server for Haptics 300)

The server for haptics 300 can receive, via the live distribution server 500, a stamp with a haptic stimulus effect (control command) 850 input from the viewer 900, generate a haptic control signal according to the stamp 850, and transmit the generated haptic control signal to the haptic presentation device 100. Each stamp with a haptic stimulus effect 850 is associated with each predetermined control command, and each control command includes information designating a perception position at which a vibration stimulus is presented (position information) (specifically, such as information designating a haptic stimulation unit that presents the haptic stimulus, for example), information designating a waveform type, intensity, and the like of the vibration stimulus (form information), and the like. Furthermore, the control command can include identification information (ID) designating a haptic stimulation unit (not illustrated) provided in the haptic presentation device 100 and the form information. Specifically, the server for haptics 300 generates a haptic control signal (waveform data) to be input to each of the haptic stimulation units, which are provided in the haptic presentation device 100, in such a manner that a vibration stimulus with a designated waveform is presented at designated intensity at a designated perception position by the control command, and transmits the haptic control signal to the haptic presentation device 100. Furthermore, the control command associated with each stamp with a haptic stimulus effect 850 may include only identification information (ID) of the stamp 850. In this case, the server for haptics 300 may refer to the identification information of the received stamp 850 and generate a haptic control signal (waveform data) corresponding to the stamp 850 on the basis of data associated with the identification information and stored in advance. Note that in the present specification, the "perception position" includes a movement path of the perception position and a perception range having a predetermined size. Furthermore, a detailed configuration of the server for haptics 300 will be described later.

(Distribution Data Editing Server 400)

The distribution data editing server 400 can edit the video from the camera 208 which video is received via the server for haptics 300, and can edit the voice from the microphone 206 which voice is received via the server for haptics 300. Moreover, the distribution data editing server 400 can transmit the edited video and voice data to the user terminal 700 via the live distribution server 500, and can perform an output thereof to the speaker 202 and the monitor 204 via the server for haptics 300. For example, the distribution data editing server 400 can generate the video data for distribution by superimposing an image of the stamp 850 input from the viewer 900 or a video effect associated with the stamp 850 on the image of the distributor 800 which image is captured by the camera 208. Note that a detailed configuration of the distribution data editing server 400 will be described later.

(Live Distribution Server 500)

The live distribution server 500 can distribute an image or the like of the distributor 800 or the like, an image for selecting the stamp with a haptic stimulus effect 850, or the like, to the user terminal 700. For example, the live distribution server 500 can perform authentication via a Web application programming interface (API) and monitor the stamp with a haptic stimulus effect 850 and the like transmitted from the viewer 900. Note that a detailed configuration of the live distribution server 500 will be described later.

Furthermore, in the present embodiment, the server for haptics 300, the distribution data editing server 400, and the live distribution server 500 may be realized by a single device or may be realized by a plurality of devices, and are not specifically limited. The detail will be described later.

(User Terminal 700)

The user terminal 700 is used by the viewer 900 or installed in the vicinity of the viewer 900, and is a terminal for the viewer 900 to input the stamp with a haptic stimulus effect 850 and the like, for example. Then, the user terminal 700 receives the stamp with a haptic stimulus effect (control command) 850 input from the viewer 900, and transmits the received stamp 850 to the server for haptics 300 via the live distribution server 500. Furthermore, for example, the user terminal 700 can receive, via the live distribution server 500, and display a video of the distributor 800 to which video a video effect associated with the received stamp 850 is applied and a haptic stimulus associated with the stamp 850 is presented. At that time, the user terminal 700 may receive identification information (ID) of the stamp 850, read information of a video effect associated with the identification information from own storage unit (not illustrated), and perform processing by itself, or may receive a video to which the video effect is already applied. For example, the user terminal 700 can be a wearable device such as a smartphone, a tablet personal computer (PC), a mobile phone, a laptop PC, or a head mounted display (HMD). Furthermore, the user terminal 700 may be a dedicated device installed in a room provided by a business operator, such as a karaoke box. Note that a detailed configuration of the user terminal 700 will be described later.

<2.2 Detailed Configuration of the Haptic Presentation Device 100>

Figure 4:
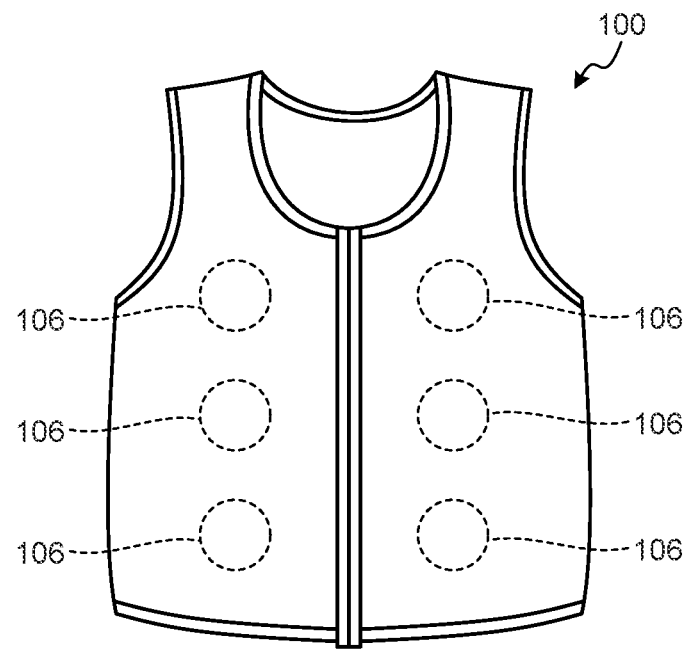
FIG. 4 is a view illustrating an appearance configuration example of a haptic presentation device 100 according to the embodiment of the present disclosure.
Figure 5:
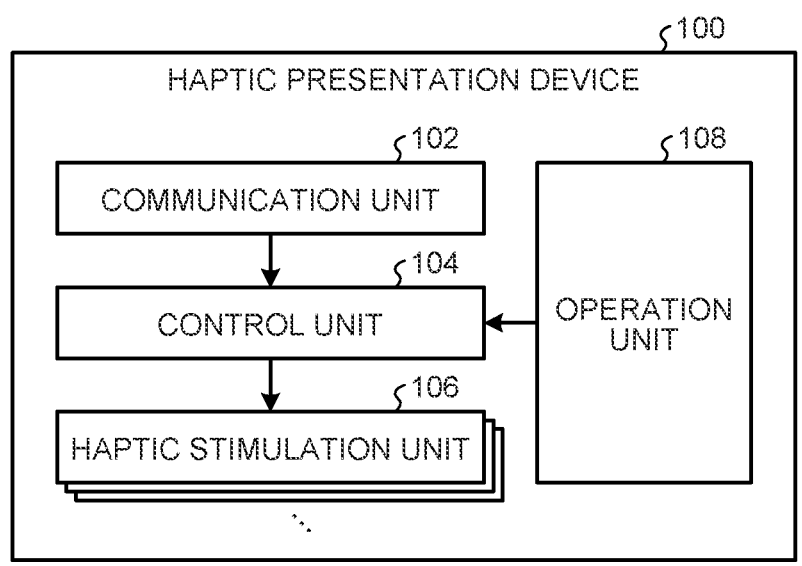
FIG. 5 is a view illustrating a functional configuration example of the haptic presentation device 100 according to the embodiment of the present disclosure.

Next, a detailed configuration of the haptic presentation device 100 will be described with reference to FIG. 4 and FIG. 5. FIG. 4 is a view illustrating an appearance configuration example of the haptic presentation device 100 according to the present embodiment, and FIG. 5 is a view illustrating a functional configuration example of the haptic presentation device 100 according to the present embodiment. As described above, the haptic presentation device 100 is a device that is worn on a part of the body of the distributor 800 and that gives a haptic stimulus to the distributor 800, for example, by vibrating according to the stamp (control command) 850.

As illustrated in FIG. 4, for example, the vest-type haptic presentation device 100 includes a plurality of haptic stimulation units 106 inside as described above. The haptic stimulation unit 106 includes, for example, an actuator, generates vibration by being driven by a haptic control signal generated by the server for haptics 300, and presents the vibration as the haptic stimulus. An eccentric motor, a linear vibrator, a piezoelectric element, or the like can be used as the actuator, for example.

Furthermore, as illustrated in FIG. 5, the haptic presentation device 100 includes a communication unit 102, a control unit 104, the above-described haptic stimulation units 106, and an operation unit 108. Hereinafter, the functional blocks of the haptic presentation device 100 will be sequentially described.

(Communication Unit 102)

The communication unit 102 is wirelessly connected to the server for haptics 300 via the drive amplifier/interface 200, and can transmit and receive information to and from the server for haptics 300.

(Control Unit 104)

The control unit 104 is a controller, and can drive the haptic stimulation units 106 on the basis of the haptic control signal input via the communication unit 102 described above. The control unit 104 is realized by, for example, execution of various programs, which are stored in a read only memory (ROM) or the like inside the haptic presentation device 100, by a central processing unit (CPU), a micro processing unit (MPU), or the like with a random access memory (RAM) as a work area. Also, the control unit 104 can be realized by, for example, an integrated circuit such as an application specific integrated circuit (ASIC) or a field programmable gate array (FPGA).

(Operation Unit 108)

The operation unit 108 is an operation device such as a touch sensor, a pressure sensor, a proximity sensor, a button, a switch, or a lever operated by the distributor 800, and can be caused by the distributor 800 to weaken intensity of the presented haptic stimulus or to stop presenting the haptic stimulus, for example.

Although the detailed configuration of the haptic presentation device 100 according to the present embodiment has been specifically described above, the detailed configuration of the haptic presentation device 100 according to the present embodiment is not limited to the example illustrated in FIG. 4 and FIG. 5.

Furthermore, the haptic presentation device 100 is not limited to the vest-type wearable device in the above-described manner, and may be a wearable device that can be worn on a part of a body of a user (such as an earlobe, neck, arm, wrist, or ankle). More specifically, examples of the wearable device include wearable devices of various types/ forms such as an ear device type, an anklet type, a ring type, a glove type, a bracelet (wristband) type, a collar type, an eyewear type, a headwear type, a pad type, a badge type, and a clothing type. Furthermore, the haptic presentation device 100 may be configured as an on-hand type mounted on a device held in a hand of the distributor 800, such as a smartphone, a tablet, a camera, a game controller, a portable music player, or the like, or may be a pen type, a stick type, or a handle type. Furthermore, the haptic presentation device 100 is not limited to the wearable type or the on-hand type, and may be configured as a slate/floor type mounted on furniture such as a bed, a chair, or a table or various facilities.

Furthermore, in the embodiment of the present disclosure, it is described that a haptic stimulus (vibration) is presented to the distributor 800 by the haptic presentation device 100. However, this is not a limitation, and wind, an electrical stimulation, an ultrasonic wave, a sense of force, heat, humidity, a smell, or the like may be given to the distributor 800 instead of the haptic stimulus or together with the haptic stimulus. Furthermore, in the embodiment of the present disclosure, the presentation of the haptic stimulus to the distributor 800 is not a limitation. The haptic stimulus or the like may be presented to the viewer 900 who selects the stamp 850 or the viewer 900 who simply enjoys the distribution by the distributor 800.

<2.3 Detailed Configuration of the Server for Haptics 300>

Figure 6:
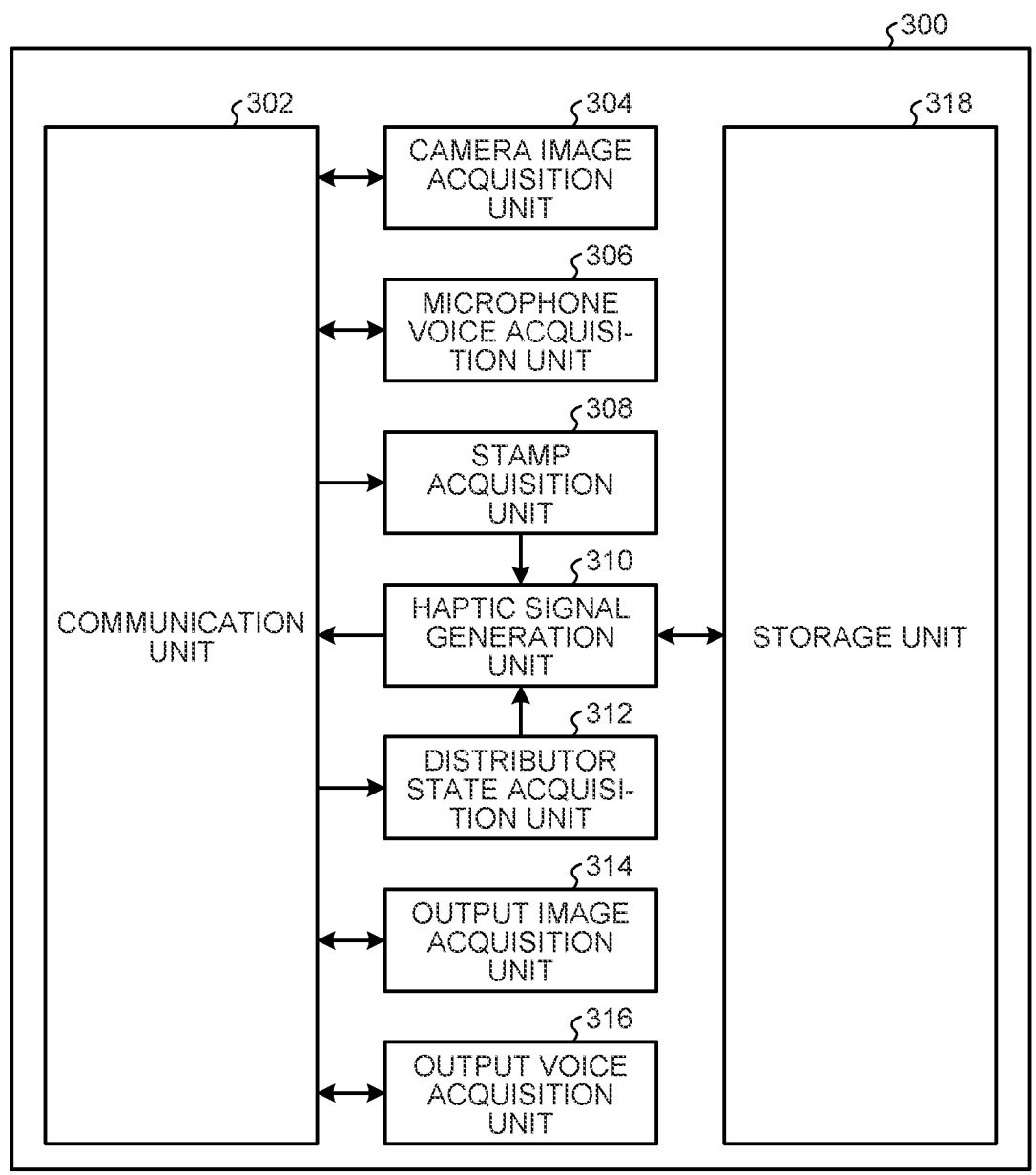
FIG. 6 is a view illustrating a functional configuration example of a server for haptics 300 according to the embodiment of the present disclosure.

Next, a detailed configuration of the server for haptics 300 according to the embodiment of the present disclosure will be described with reference to FIG. 6. FIG. 6 is a view illustrating a functional configuration example of the server for haptics 300 according to the embodiment of the present disclosure. As illustrated in FIG. 6, the server for haptics 300 mainly includes a communication unit 302, a camera image acquisition unit 304, a microphone voice acquisition unit 306, a stamp acquisition unit 308, a haptic signal generation unit 310, a distributor state acquisition unit 312, an output image acquisition unit 314, an output voice acquisition unit 316, and a storage unit 318. Hereinafter, the functional blocks of the server for haptics 300 will be sequentially described.

(Communication Unit 302)

The communication unit (distribution unit) 302 can transmit and receive information to and from the haptic presentation device 100, the speaker 202, the monitor 204, and the camera 208. The communication unit 302 is a communication interface having a function of transmitting and receiving data, and is realized by communication devices such as a communication antenna, a transmission/reception circuit, and a port (not illustrated). Specifically, the communication unit 302 can transmit a haptic control signal to the haptic presentation device 100, transmit video data (also including text information, for example) from the distribution data editing server 400 to the monitor 204, and transmit voice data (predetermined voice) from the distribution data editing server 400 to the speaker 202.

Next, the camera image acquisition unit 304, the microphone voice acquisition unit 306, the stamp acquisition unit 308, the haptic signal generation unit 310, the distributor state acquisition unit 312, the output image acquisition unit 314, and the output voice acquisition unit 316 will be described. These functional units are realized by, for example, execution of various programs, which are stored in a ROM or the like inside the server for haptics 300, by a CPU, an MPU, or the like with a RAM as a work area.

(Camera Image Acquisition Unit 304)

The camera image acquisition unit 304 can acquire an image of a real space on the side of the distributor 800 and an image of the distributor 800 from the camera 208, and perform transmission thereof to the distribution data editing server 400 via the communication unit 302.

(Microphone Voice Acquisition Unit 306)

The microphone voice acquisition unit 306 can acquire an environmental sound in the real space on the side of the distributor 800 or a voice of the distributor 800 from the microphone 206, and perform transmission thereof to the distribution data editing server 400 via the communication unit 302.

(Stamp Acquisition Unit 308)

The stamp acquisition unit 308 can acquire a control command including position information that is associated with the stamp with a haptic stimulus effect 850 input from the viewer 900 and that designates a presentation position at which a haptic stimulus is presented by the haptic presentation device 100 (presentation unit information) and form information designating a form of the haptic stimulus, and can perform an output thereof to the haptic signal generation unit 310 (described later). Furthermore, the stamp acquisition unit 308 may acquire a control command including only identification information (ID) associated with the stamp with a haptic stimulus effect 850, and perform an output thereof to the haptic signal generation unit 310 (described later).

(Haptic Signal Generation Unit 310)

The haptic signal generation unit 310 can generate a haptic control signal for controlling the haptic presentation device 100 on the basis of the control command associated with the stamp with a haptic stimulus effect 850 input from the viewer 900. Specifically, on the basis of the control command including a perception position of the vibration stimulus (position information), a waveform type of the vibration stimulus, intensity information of the vibration stimulus (form information), and the like, the haptic signal generation unit 310 generates waveform data to be input to each of the haptic stimulation units 106 (specifically, the vibration actuators), which are provided in the haptic presentation device 100, in such a manner as to present the vibration stimulus with the designated waveform with the designated intensity at the designated perception position. Note that the haptic control signal may include information instructing to present a vibration stimulus at a presentation timing, a frequency, an interval, and a presentation time of the haptic stimulus based on the control command. Furthermore, the haptic signal generation unit 310 may refer to the control command including only the identification information (ID) associated with the stamp with a haptic stimulus effect 850 input from the viewer 900, and generate the haptic control signal (including a perception position, a waveform type, intensity information, and the like) corresponding to the stamp 850 on the basis of data associated with the identification information and stored in advance.

Furthermore, when the frequency and intensity of the vibration stimulus designated by the control command have a wide band (such as 50 to 500 Hz), the haptic signal generation unit 310 may compress the vibration stimulus to a narrow band (such as 100 Hz) in accordance with the function of the haptic presentation device 100 and generate waveform data. Furthermore, the haptic signal generation unit 310 may adjust the haptic control signal according to a worn state of the haptic presentation device 100 of the distributor 800 or a profile (function or the like) of the haptic presentation device 100.

Furthermore, the haptic signal generation unit 310 can transmit the generated haptic control signal to the haptic presentation device 100 worn on the body of the distributor 800 via the communication unit 302.

(Distributor State Acquisition Unit 312)

For example, the distributor state acquisition unit 312 can acquire sensing data or the like acquired by the worn state detection sensor (not illustrated) for detecting the worn state of the haptic presentation device 100, and perform an output thereof to the haptic signal generation unit 310 described above.

(Output Image Acquisition Unit 314)

The output image acquisition unit 314 can acquire the edited video data (predetermined image and text information) from the distribution data editing server 400 and perform transmission thereof to the monitor 204 via the communication unit 302.

(Output Voice Acquisition Unit 316)

The output voice acquisition unit 316 can acquire the edited voice data and the like from the distribution data editing server 400 and perform transmission thereof to the speaker 202 via the communication unit 302.

(Storage Unit 318)

The storage unit 318 is realized by storage devices such as the ROM that stores the programs, calculation parameters, and the like used for processing by the haptic signal generation unit 310, the RAM that temporarily stores parameters and the like that change appropriately, and an HDD that stores various databases (DB). For example, the storage unit 318 stores a previously generated haptic data library (such as a perception position and a vibration waveform pattern) associated with the identification information (ID) of each stamp 850, and the above-described haptic signal generation unit 310 can also generate a haptic control signal by using the haptic data library. Furthermore, the storage unit 318 may store, for example, information such as the number of haptic stimulation units 106 of the haptic presentation device 100, positions thereof, a frequency characteristic, a maximum input voltage, and the like as the profile information of the haptic presentation device 100. The haptic signal generation unit 310 can adjust the haptic control signal with reference to such profile information.

Although the detailed configuration of the server for haptics 300 according to the present embodiment has been specifically described above, the detailed configuration of the server for haptics 300 according to the present embodiment is not limited to the example illustrated in FIG. 6.

<2.4 Detailed Configuration of the Distribution Data Editing Server 400>

Figure 7:
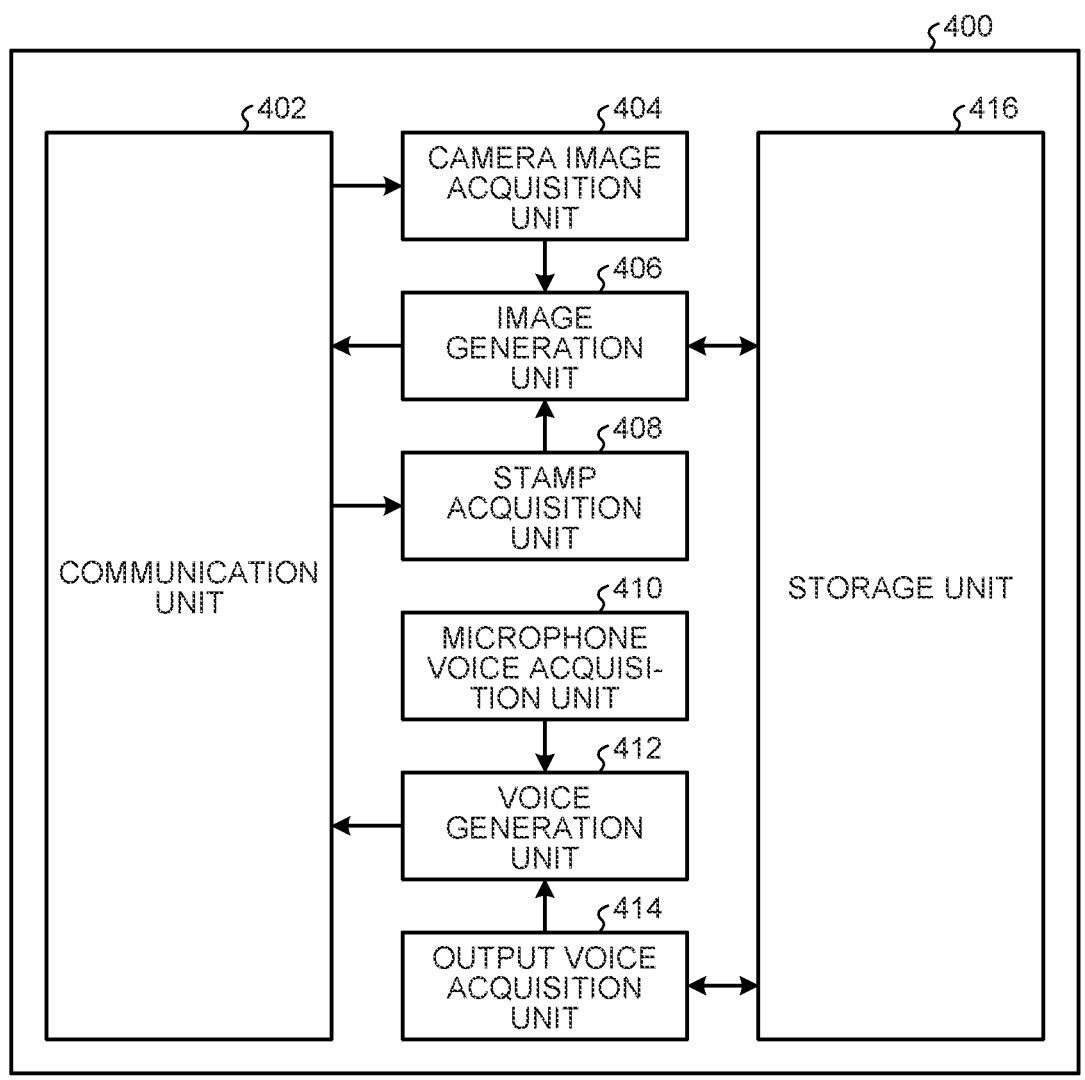
FIG. 7 is a view illustrating a functional configuration example of a distribution data editing server 400 according to the embodiment of the present disclosure.

Next, the detailed configuration of the distribution data editing server 400 according to the embodiment of the present disclosure will be described with reference to FIG. 7. FIG. 7 is a view illustrating a functional configuration example of the distribution data editing server 400 according to the embodiment of the present disclosure. As illustrated in FIG. 7, the distribution data editing server 400 mainly includes a communication unit 402, a camera image acquisition unit 404, an image generation unit 406, a stamp acquisition unit 408, a microphone voice acquisition unit 410, a voice generation unit 412, an output voice acquisition unit 414, and a storage unit 416. Hereinafter, the functional blocks of the distribution data editing server 400 will be sequentially described.

(Communication Unit 402)

The communication unit 402 can transmit and receive information to and from the server for haptics 300 and the live distribution server 500. The communication unit 402 is a communication interface having a function of transmitting and receiving data, and is realized by communication devices such as a communication antenna, a transmission/reception circuit, and a port (not illustrated).

Next, the camera image acquisition unit 404, the image generation unit 406, the stamp acquisition unit 408, the microphone voice acquisition unit 410, the voice generation unit 412, and the output voice acquisition unit 414 will be described. These functional units are realized by, for example, execution of various programs, which are stored in a ROM or the like inside the distribution data editing server 400, by a CPU, an MPU, or the like with a RAM as a work area.

(Camera Image Acquisition Unit 404)

The camera image acquisition unit 404 can acquire the image of the real space on the side of the distributor 800 or the image of the distributor 800 from the camera 208 via the server for haptics 300, and perform an output thereof to the image generation unit 406 (described later).

(Image Generation Unit 406)

The image generation unit 406 can generate image data to be presented to the viewer 900 or the distributor 800. For example, the image generation unit 406 can generate video data of superimposing and displaying virtual objects such as an icon, an animation, and text on the image of the distributor 800. More specifically, the virtual object can be, for example, an animation of an explosion of a bomb, the animation being displayed at the same time as presentation of the haptic stimulus. Furthermore, the virtual object may be an image corresponding to the stamp with a haptic stimulus effect 850 input from the viewer 900. For example, in a case of a heart-shaped stamp 850, the image generation unit 406 can generate video data of superimposing and displaying the heart-shaped stamp 850 on the image of the distributor 800. Moreover, for example, the image generation unit 406 may apply a video effect, which is associated with the stamp 850 input from the viewer 900, on the image of the distributor 800. Furthermore, for example, in a case where the haptic stimulus cannot be presented to the distributor 800 since the haptic presentation device 100 is not worn on the body of the distributor 800, the image generation unit 406 can also generate video data to be presented to the viewer 900 or the like instead of the haptic stimulus.

(Stamp Acquisition Unit 408)

The stamp acquisition unit 408 can acquire information of the stamp with a haptic stimulus effect 850 input from the viewer 900, and perform an output thereof to the image generation unit 406 and the voice generation unit 412.

(Microphone Voice Acquisition Unit 410)

The microphone voice acquisition unit 410 can acquire the voice of the distributor 800 from the microphone 206 via the server for haptics 300 and perform an output thereof to the voice generation unit 412 (described later).

(Voice Generation Unit 412)

The voice generation unit 412 can generate voice data to be presented to the viewer 900 or the distributor 800. For example, the voice generation unit 412 can generate voice data indicating a voice like explosion of a bomb, the voice data being output at the same time as the presentation of the haptic stimulus. Furthermore, the voice generation unit 412 may generate voice data of a voice corresponding to the stamp with a haptic stimulus effect 850 input from the viewer 900. For example, in a case of the stamp 850 in a form of a wild bird, the voice generation unit 412 generates voice data in which song of the wild bird is superimposed on a singing voice or the like of the distributor 800. Furthermore, the voice generation unit 412 may generate voice data in which a voice of the viewer 900 acquired by the user terminal 700 is superimposed on the singing voice or the like of the distributor 800. Furthermore, for example, in a case where the haptic stimulus cannot be presented to the distributor 800 since the haptic presentation device 100 is not worn on the body of the distributor 800, the voice generation unit 412 can also generate voice data to be output to the viewer 900 or the like instead of the haptic stimulus.

(Output Voice Acquisition Unit 414)

The output voice acquisition unit 414 can acquire a voice, which is input from the viewer 900 with the user terminal 700, and perform an output thereof to the voice generation unit 412.

(Storage Unit 416)

The storage unit 416 is realized by storage devices such as the ROM that stores the programs, calculation parameters, and the like used for processing in the image generation unit 406 and the output voice acquisition unit 414, the RAM that temporarily stores parameters and the like that change appropriately, and an HDD that stores various databases (DB). For example, the storage unit 416 stores, in association with the identification information (ID) of each stamp 850, an image and voice data library generated in advance and the image generation unit 406 and the output voice acquisition unit 414 generate video data and voice data by using the image and voice data library.

Although the detailed configuration of the distribution data editing server 400 according to the present embodiment has been specifically described above, the detailed configuration of the distribution data editing server 400 according to the present embodiment is not limited to the example illustrated in FIG. 7.

<2.5 Detailed Configuration of a Live Distribution Server 500>

Next, the detailed configuration of the live distribution server 500 according to the embodiment of the present disclosure will be described with reference to FIG. 8. FIG.

8 is a view illustrating a functional configuration example of the live distribution server 500 according to the embodiment of the present disclosure. As illustrated in FIG. 8, the live distribution server 500 mainly includes a communication unit 502, a GUI control unit 504, a stamp acquisition unit 506, a voice data acquisition unit 508, an image data acquisition unit 510, a haptic signal acquisition unit 512, a viewer information acquisition unit 514, a distribution control unit 516, and a storage unit 518. Hereinafter, the functional blocks of the live distribution server 500 will be sequentially described.

(Communication Unit 502)

The communication unit 502 can transmit and receive information to and from the user terminal 700, the distribution data editing server 400, and the server for haptics 300. The communication unit 502 is a communication interface having a function of transmitting and receiving data, and is realized by communication devices such as a communication antenna, a transmission/reception circuit, and a port (not illustrated).

Next, the GUI control unit 504, the stamp acquisition unit 506, the voice data acquisition unit 508, the image data acquisition unit 510, the haptic signal acquisition unit 512, the viewer information acquisition unit 514, and the distribution control unit 516 will be described. These functional units are realized by, for example, execution of various programs, which are stored in a ROM or the like inside the live distribution server 500, by a CPU, an MPU, or the like with a RAM as a work area.

(GUI Control Unit 504)

The graphical user interface (GUI) control unit 504 can control the user terminal 700 of the viewer 900 and display a screen to input the stamp with a haptic stimulus effect (control command) 850. Specifically, the GUI control unit 504 causes the display unit 702 of the user terminal 700 to display a screen in a manner illustrated in FIG. 2 as a screen to select the stamp with a haptic stimulus effect 850. A large number of stamps with a haptic stimulus effect 850 are displayed on the selection screen (stamp selection screen). Each of the stamps with a haptic stimulus effect 850 is associated with a control command for the haptic presentation device 100, and the viewer 900 can input the control command by selecting the stamp 850 displayed on the selection screen. Note that it is preferable in the present embodiment that an image of the stamp with a haptic stimulus effect 850 intuitively recall a haptic stimulus, a feeling (message), or the like that the viewer 900 desires to transmit to the distributor 800. Furthermore, as described later, the GUI control unit 504 may cause the display unit 702 of the user terminal 700 to display an image from which a stamp without a haptic stimulus effect can be selected in addition to the stamps with a haptic stimulus effect 850.

(Stamp Acquisition Unit 506)

The stamp acquisition unit 506 can acquire information (such as ID) of the stamp with a haptic stimulus effect 850 input from the viewer 900, and perform transmission thereof to the distribution data editing server 400 and the server for haptics 300 via the communication unit 502. Furthermore, the stamp acquisition unit 506 may acquire, from the user terminal 700, command information such as a haptic control signal or an image table control signal corresponding to the input.

(Voice Data Acquisition Unit 508)

The voice data acquisition unit 508 can acquire the voice data from the distribution data editing server 400 via the communication unit 502 and perform transmission thereof to the user terminal 700.

(Image Data Acquisition Unit 510)

The image data acquisition unit 510 can acquire image data from the distribution data editing server 400 via the communication unit 502, and perform transmission thereof to the user terminal 700.

(Haptic Signal Acquisition Unit 512)

The haptic signal acquisition unit 512 can acquire the haptic control signal from the server for haptics 300 and perform transmission thereof to the user terminal 700. For example, in a case where a vibrating device (not illustrated) is mounted on the user terminal 700, a haptic stimulus corresponding to the stamp 850 selected by the viewer 900 may be reproduced by the vibrating device.

(Viewer Information Acquisition Unit 514)

For example, the viewer information acquisition unit 514 can acquire identification information (such as ID) of the viewer 900, which information is transmitted from the user terminal 700, and perform authentication on the viewer 900.

(Distribution Control Unit 516)

The distribution control unit 516 can control transmission of data from the voice data acquisition unit 508, the image data acquisition unit 510, and the haptic signal acquisition unit 512 to the user terminal 700 of the viewer 900 authenticated by the viewer information acquisition unit 514.

(Storage Unit 518)

The storage unit 518 is realized by storage devices such as the ROM that stores the programs, calculation parameters, and the like used for processing in the live distribution server 500, the RAM that temporarily stores parameters and the like that change appropriately, and an HDD that stores various databases (DB). For example, the storage unit 518 may store the identification information of the viewer 900, and may further store information of a previously acquired control command or a previously used stamp (control command) 850 of the viewer 900 in association with the identification information of the viewer 900.

Figure 8:
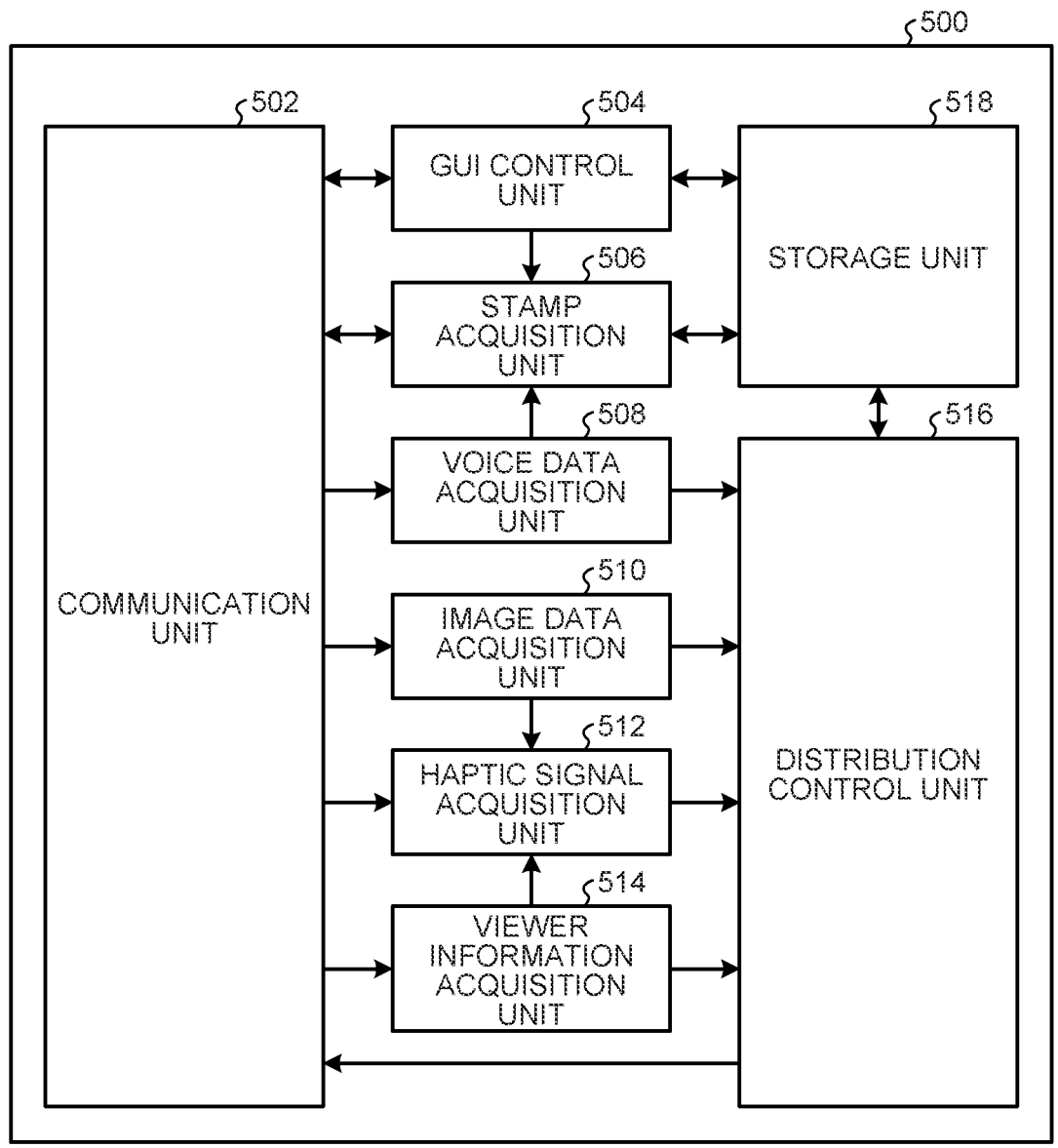
FIG. 8 is a view illustrating a functional configuration example of a live distribution server 500 according to the embodiment of the present disclosure.

Although the detailed configuration of the live distribution server 500 according to the present embodiment has been specifically described above, the detailed configuration of the live distribution server 500 according to the present embodiment is not limited to the example illustrated in FIG. 8. For example, the live distribution server 500 may further include a recommendation unit (not illustrated) that selects a stamp (control command) 850 used by the viewer 900 at a high frequency or a stamp (control command) 850 used by the viewer at a low frequency with reference to the information stored in the storage unit 518, and recommends the selected stamp with a haptic stimulus effect 850 to the viewer 900. Furthermore, the recommendation unit may recommend the viewer 900 to input the stamp 850 to the distributor 800 who has not acquired a predetermined number of stamps 850 or more in the past.

<2.6 Detailed Configuration of a User Terminal 700>

Figure 9:
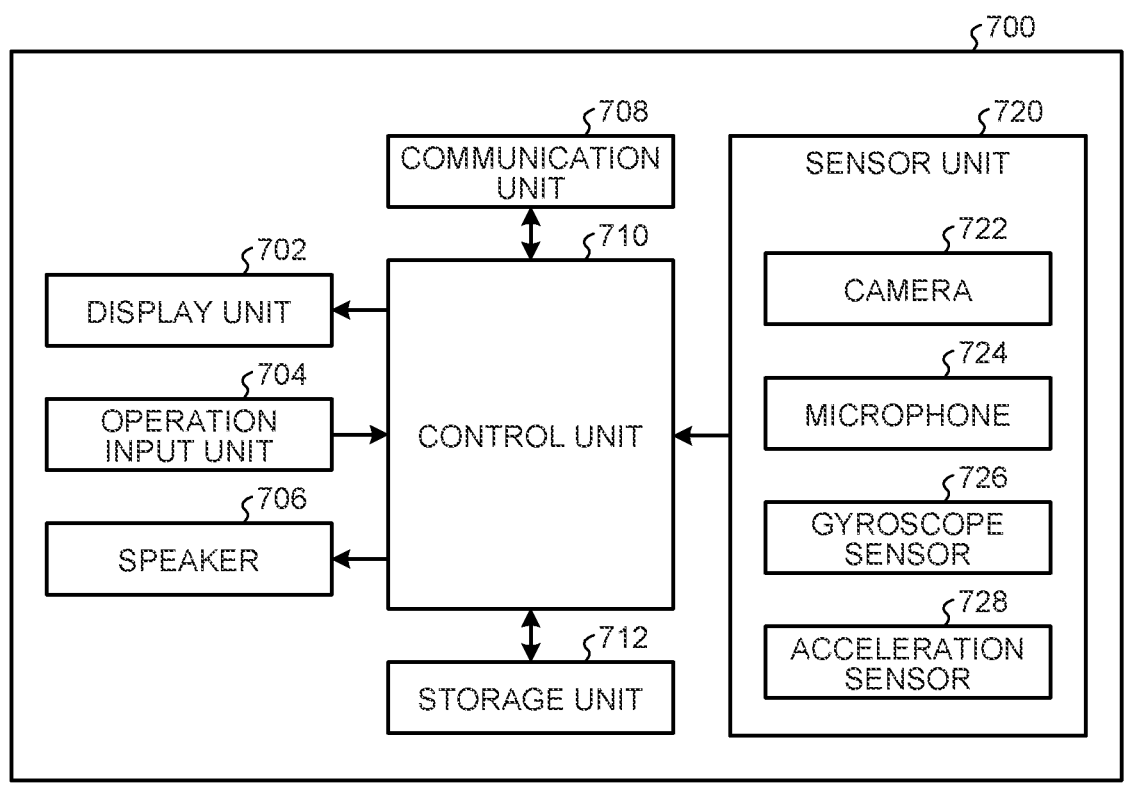
FIG. 9 is a view illustrating a functional configuration example of a user terminal 700 according to the embodiment of the present disclosure.

Next, the detailed configuration of the user terminal 700 according to the embodiment of the present disclosure will be described with reference to FIG. 9. FIG. 9 is a view illustrating a functional configuration example of the user terminal 700 according to the present embodiment. As illustrated in FIG. 9, the user terminal 700 mainly includes a display unit 702, an operation input unit 704, a speaker 706, a communication unit 708, a control unit 710, a storage unit 712, and a sensor unit 720. Hereinafter, the functional blocks of the user terminal 700 will be sequentially described.

(Display Unit 702)

The display unit 702 can display, for example, a selection screen for selection of the stamp with a haptic stimulus effect (control command) 850, the image of the distributor 800, and the like toward the viewer 900. Furthermore, the display unit 702 can superimpose and display a text, an icon, an animation, or the like on the image of the distributor 800. The display unit 702 is realized by a liquid crystal display device, an OLED device, or the like.

(Operation Input Unit 704)

To the operation input unit 704, for example, a result of selection of the stamp with a haptic stimulus effect 850 associated with the control command including the position information designating the presentation position at which the haptic stimulus is presented and the form information designating the form of the haptic stimulus is input by the viewer 900. Alternatively, the control command may be directly input to the operation input unit 704. For example, the operation input unit 704 is realized by a switch, a button, a touch panel, a lever, or the like. Furthermore, contents of the operation input by the operation input unit 704 may be displayed by the display unit 702 described above. Furthermore, the operation input unit 704 can receive information of an input operation from the viewer 900 on the position selection screen that is provided in such a manner as to be superimposed on the display unit 702 described above and that is for designation of the presentation position displayed by the display unit 702 (such as position information).

(Speaker 706)

The speaker 706 can reproduce voice under the control by the control unit 710 (described later). Note that the speaker 706 may be provided in the user terminal 700, or may be a device separate from the user terminal 700, such as a pair of earphone speakers (not illustrated).

(Communication Unit 708)

The communication unit 708 can transmit and receive information to and from the live distribution server 500, and specifically can transmit, to the live distribution server 500, the information of the stamp with a haptic stimulus effect (control command) 850 input by the viewer 900. Furthermore, the communication unit 708 can receive information transmitted from the live distribution server 500. For example, the communication unit 708 is a communication interface having a function of transmitting and receiving data, and is realized by communication devices such as a communication antenna, a transmission/reception circuit, and a port (not illustrated).

(Control Unit 710)

The control unit 710 is a controller of the user terminal 700, and is realized by, for example, execution of various programs, which are stored in a ROM or the like inside the user terminal 700, by a CPU, an MPU, or the like with a RAM as a work area.

(Storage Unit 712)

The storage unit 712 is realized by storage devices such as the ROM that stores the programs, calculation parameters, and the like used for the processing by the control unit 710 described above, and the RAM that temporarily stores parameters and the like that change appropriately.

(Sensor Unit 720)

The sensor unit 720 can acquire sensing data related to an operation from the viewer 900 (such as vibration given to the user terminal 700). For example, as illustrated in FIG. 9, the sensor unit 720 mainly includes a camera 722, a microphone 724, a gyroscope sensor 726, and an acceleration sensor 728. Note that the above-described sensors are examples, and the present embodiment is not limited thereto.

For example, the camera 722 captures an image of a motion or the like of the viewer 900, and outputs the captured image to the control unit 710 described above.

Then, the control unit 710 can extract a predetermined motion by the viewer 900 from the image captured by the camera 722 and acquire a control command related to the extracted motion. Specifically, the camera 722 includes a lens system including an imaging lens, a diaphragm, a zoom lens, a focus lens, and the like, and a drive system that causes the lens system to perform focusing operation and zooming operation. Furthermore, the camera 722 includes a solid imaging element array or the like that photoelectrically converts imaging light acquired by the lens system and generates an imaging signal. Note that the solid imaging element array may be realized by, for example, a CCD sensor array, a CMOS sensor array, or the like. Furthermore, the camera 722 may include a time of flight (ToF) sensor (not illustrated). For example, the ToF sensor emits irradiation light having a predetermined cycle to a subject, detects reflected light reflected by the subject, and detects a phase difference or a time difference between the irradiation light and the reflected light, whereby depth information of the subject can be acquired. Here, the depth information of the subject is information of a depth that is one piece of information of a distance from the ToF sensor to each point on a surface of the subject. Then, by aggregating the depth information of a plurality of points on the surface of the subject, shape information related to an uneven shape of the surface of the subject, that is, outer shape information of the subject can be acquired.

The microphone 724 collects the voice of the viewer 900 and outputs the collected voice data to the control unit 710 described above. Then, the control unit 710 may extract a voice pattern of the viewer 900 from the voice collected by the microphone 724 and acquire a control command related to the extracted voice pattern (such as designation of the stamp 850 by the voice of the viewer 900, for example).

The gyroscope sensor 726 is realized by, for example, a three-axis gyroscope sensor, and detects an angular velocity (rotation speed) of movement of the user terminal 700 by the viewer 900. Furthermore, the acceleration sensor 728 is realized by, for example, a three-axis acceleration sensor (also referred to as a G sensor), and detects acceleration of the movement of the user terminal 700 by the viewer 900. In the present embodiment, an operation performed by the viewer 900 on the user terminal 700 can be recognized from the sensing data by these sensors, and a control command related to the recognized operation can be further acquired.

Although the detailed configuration of the user terminal 700 according to the present embodiment has been specifically described above, the detailed configuration of the user terminal 700 according to the present embodiment is not limited to the example illustrated in FIG. 9, and may further include, for example, a vibrating device (vibrator) that gives notification to the viewer 900 by vibration. That is, although not illustrated in FIG. 9, the user terminal 700 may be equipped with a vibrating device that reproduces the haptic stimulus, or may be a haptic presentation device 100 worn on the body of the viewer 900.

3. First Embodiment

Figure 13:
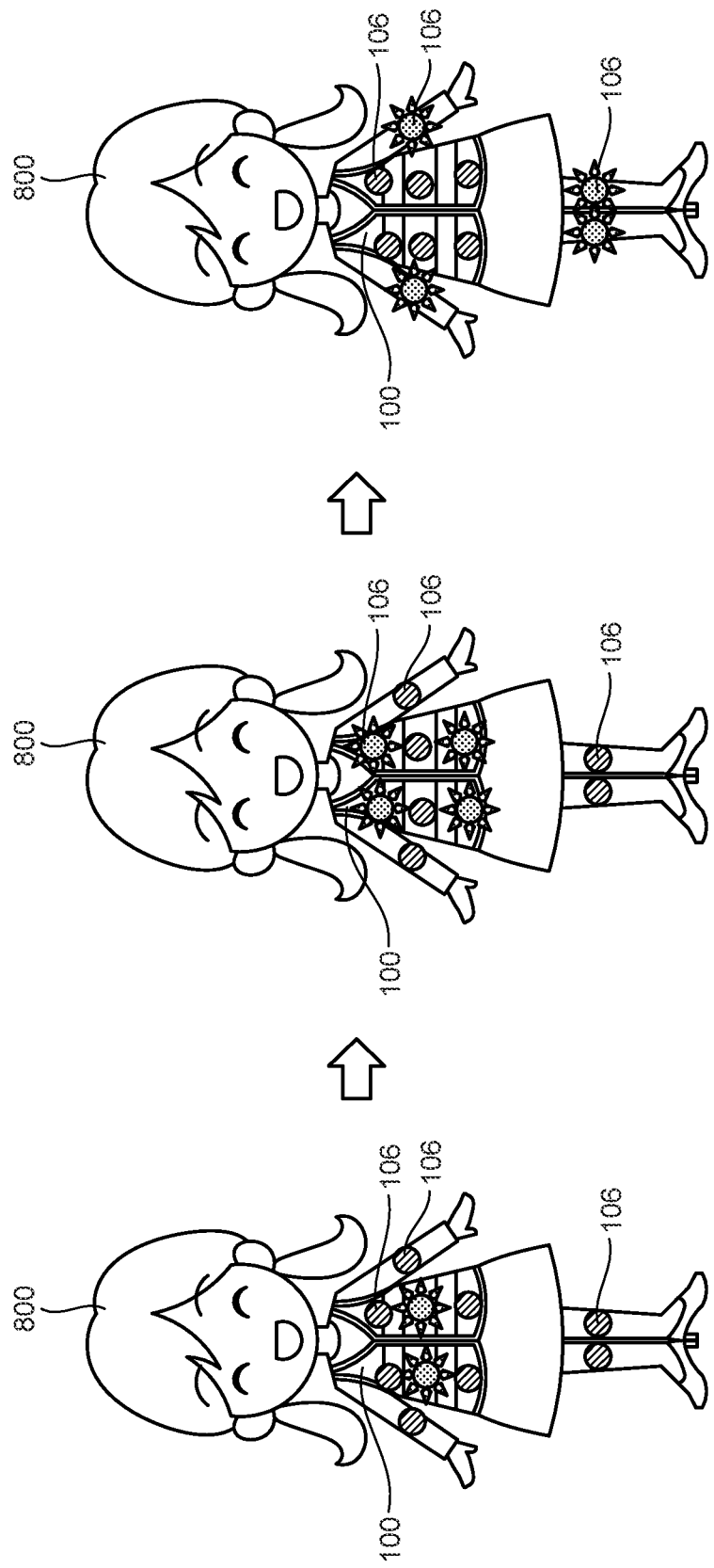
FIG. 13 is an explanatory diagram (part 2) for describing a haptic stimulus presentation example according to the first embodiment of the present disclosure.
Figure 14:
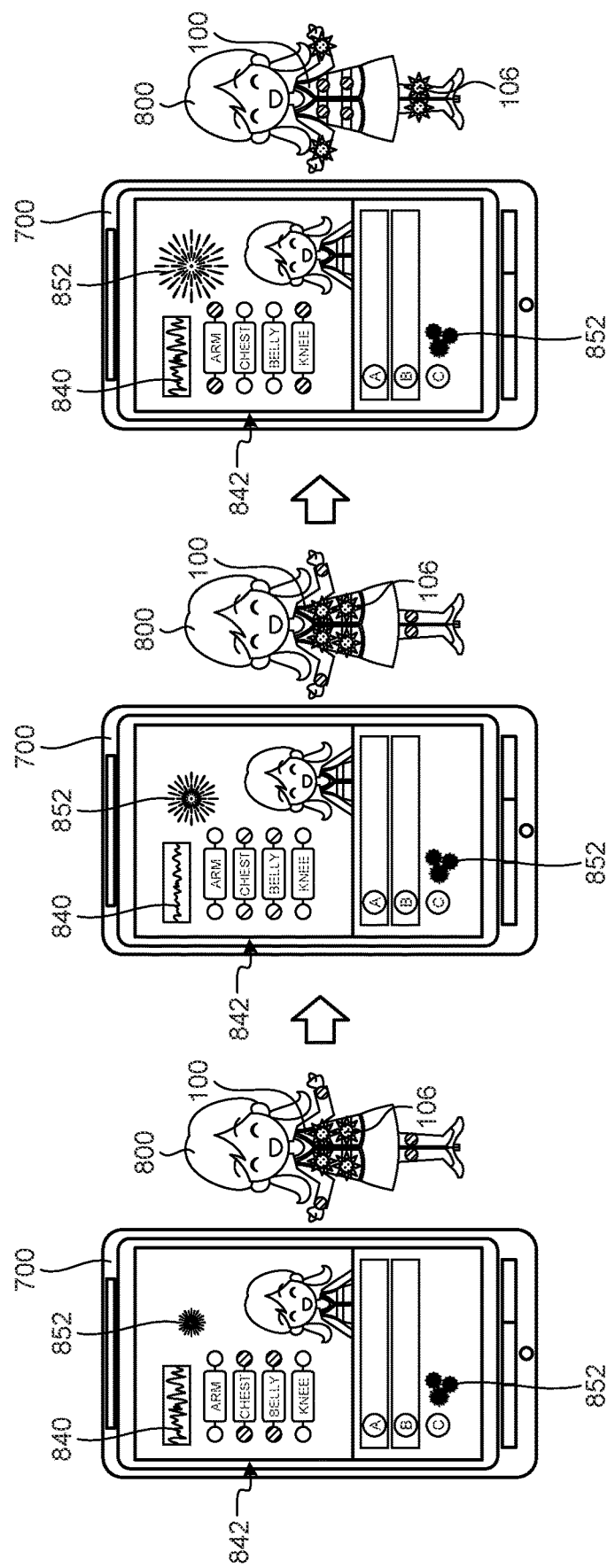
FIG. 14 is an explanatory diagram (part 3) for describing a haptic stimulus presentation example according to the first embodiment of the present disclosure.

First, a first embodiment of the present disclosure will be described with reference to FIG. 10 to FIG. 18. FIGS. 10, 12, and 15 to 18 are explanatory diagrams for describing display examples according to the present embodiment, and FIGS. 11, 13, and 14 are explanatory diagrams for describing haptic stimulus presentation examples according to the present embodiment.

Figure 10:
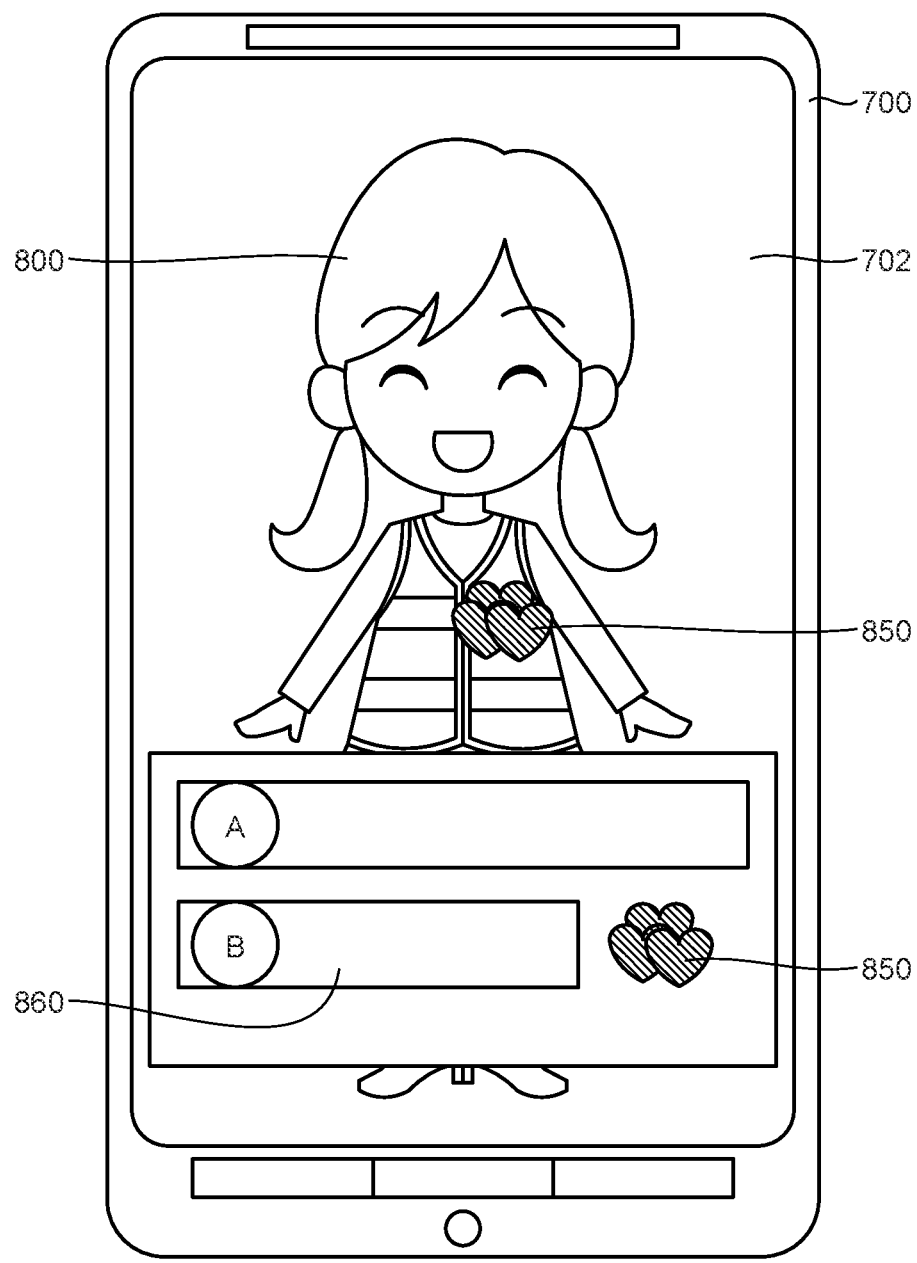
FIG. 10 is an explanatory diagram (part 1) for describing a display example according to a first embodiment of the present disclosure.
Figure 11:
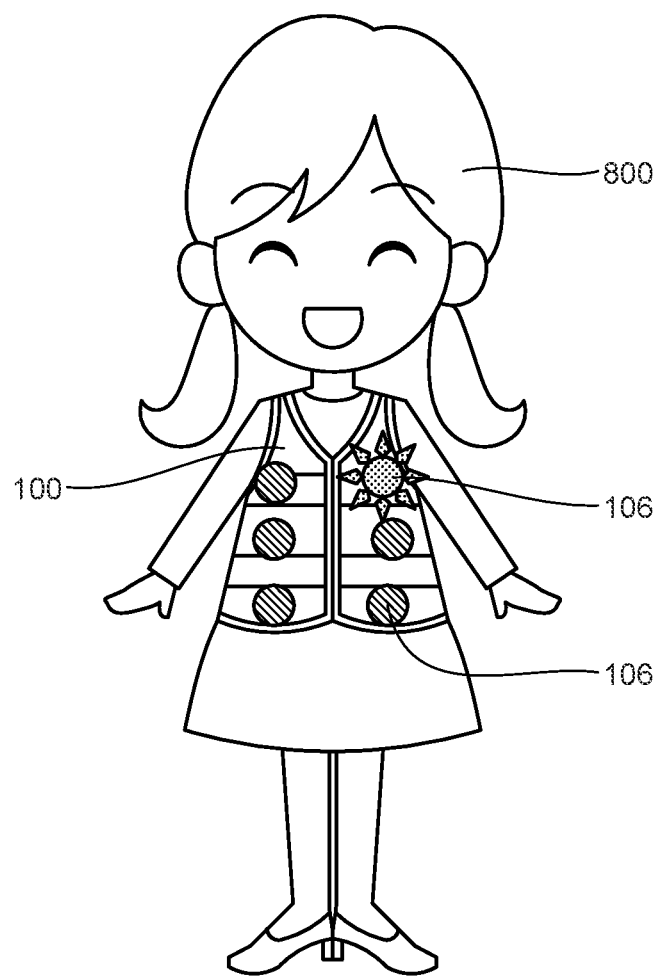
FIG. 11 is an explanatory diagram (part 1) for describing a haptic stimulus presentation example according to the first embodiment of the present disclosure.

In the example illustrated in FIG. 10, it is assumed that a viewer 900 selects a stamp with a haptic stimulus effect 850 having a plurality of heart shapes. In such a case, in a user terminal 700 illustrated in FIG. 10, the input stamp 850 may be displayed next to a comment 860 of the viewer 900. Then, as illustrated in FIG. 11, a haptic stimulation unit 106 at a haptic position, which is designated by a control command associated with the selected stamp 850, of a haptic presentation device 100 worn on a body of a distributor 800 vibrates, whereby a haptic stimulus is presented to the distributor 800.

At this time, as illustrated in FIG. 10, an information processing system 10 may distribute, toward the viewer 900, an image in which an image of the stamp 850 is superimposed and displayed on an image of the distributor 800 (augmented reality (AR) display). Specifically, a position on which the stamp 850 is superimposed may be a perception position designated by a control command associated with the stamp 850. At this time, the information processing system 10 may distribute, together with the image, comments 860 of viewers 900 viewing the image of the same distributor 800. Furthermore, in the present embodiment, the information processing system 10 may automatically select the stamp 850 on the basis of the comment input by the viewer 900, and present a haptic stimulus associated with the automatically selected stamp 850 to the distributor 800.

Figure 12:
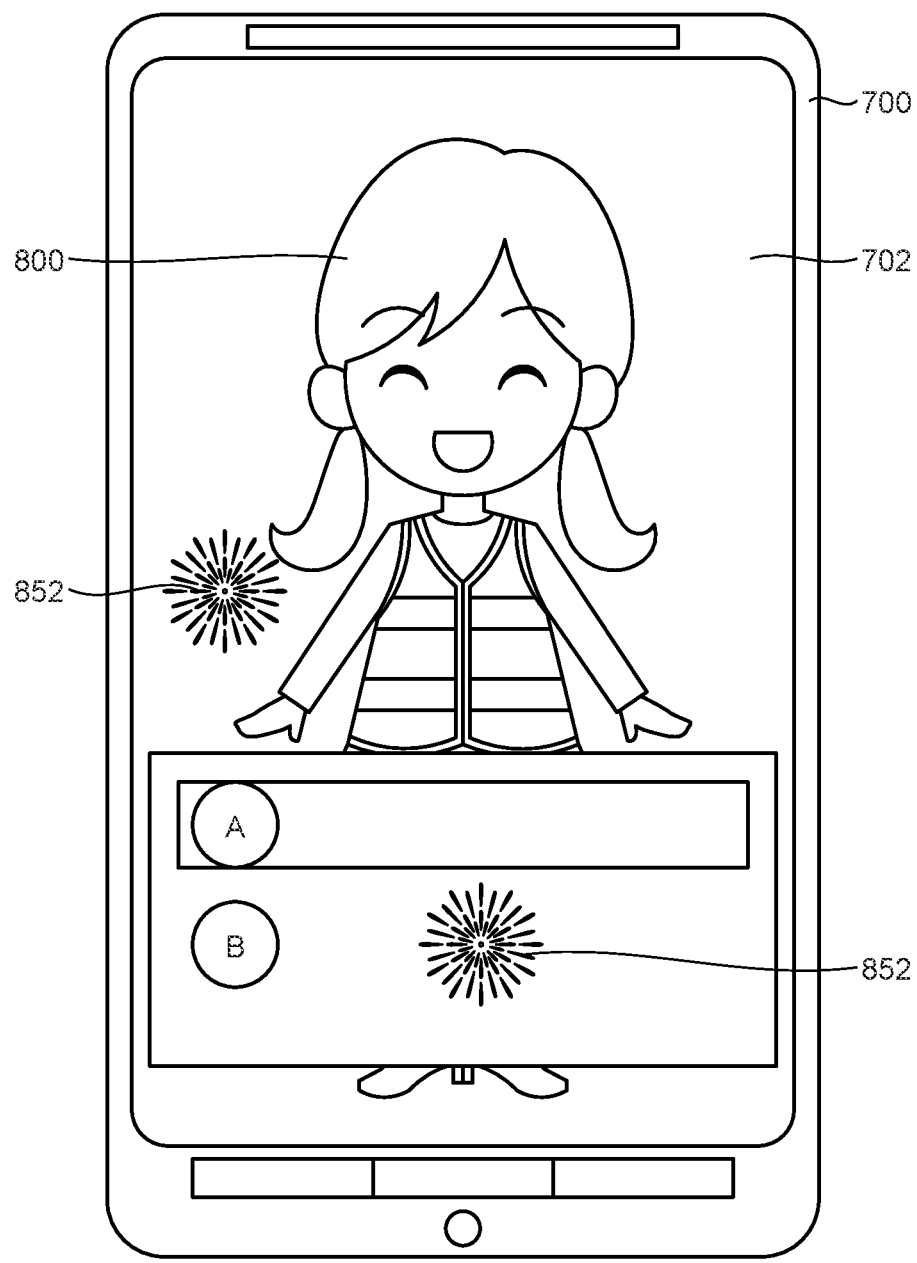
FIG. 12 is an explanatory diagram (part 2) for describing a display example according to the first embodiment of the present disclosure.

Furthermore, in the present embodiment, a virtual object superimposed on the image of the distributor 800 may be an animation image as illustrated in FIG. 12. In the example illustrated in FIG. 12, a stamp 852 input by the viewer 900 is a firework, and an animation image of the firework (image in which light spreads from a center toward an outer periphery) 852 is superimposed on the image of the distributor 800 according to the stamp 852. Then, in this case, as illustrated in FIG. 13, according to a control command associated with the selected stamp 852, a haptic position at which a haptic stimulus is presented (that is, a haptic stimulation unit 106 where the haptic stimulus is presented) of the haptic presentation device 100 worn on the body of the distributor 800 changes in synchronization with the change in the animation image 852. Specifically, in synchronization with the image in which the light spreads from the center toward the outer periphery of the firework animation image 852, the haptic stimulation unit 106, which presents the haptic stimulus, of the haptic presentation device 100 changes from a haptic stimulation unit 106 located at the center to a haptic stimulation unit 106 located at the outer periphery. Note that in the present embodiment, the change in the animation image 852 is not limited to be synchronized with the change in the haptic position, and may be synchronized with, for example, any of changes in a frequency, a waveform, and intensity of the haptic control signal.

Furthermore, as illustrated in FIG. 14, in the above embodiment, it may be presented to the viewer 900 by indication of specific information that the haptic position at which the haptic stimulus is presented (that is, the haptic stimulation unit 106 where the haptic stimulus is presented) of the haptic presentation device 100 worn on the body of the distributor 800 changes in synchronization with the change in the animation image 852. For example, a display 842 indicating which part (haptic stimulation unit 106) is vibrating is displayed on the user terminal 700 of the viewer 900 which user terminal is illustrated in FIG. 14. In the example of FIG. 14, since the haptic position changes when the animation image 852 changes, a display of the display 842 also changes. Furthermore, in the display 842, a color, a shade of the color, brightness, and the like of the vibrating part may change according to a change in intensity of the haptic stimulus presented at each haptic position. Furthermore, in the example of FIG. 14, a specific waveform image 840 of the reproduced haptic stimulus is also displayed. Note that the waveform image may be displayed in a deformed manner, and a color of the waveform, a shade of the color, brightness, a thickness of a line, or the like may change according to a change in the intensity of the haptic stimulus.

Figure 15:
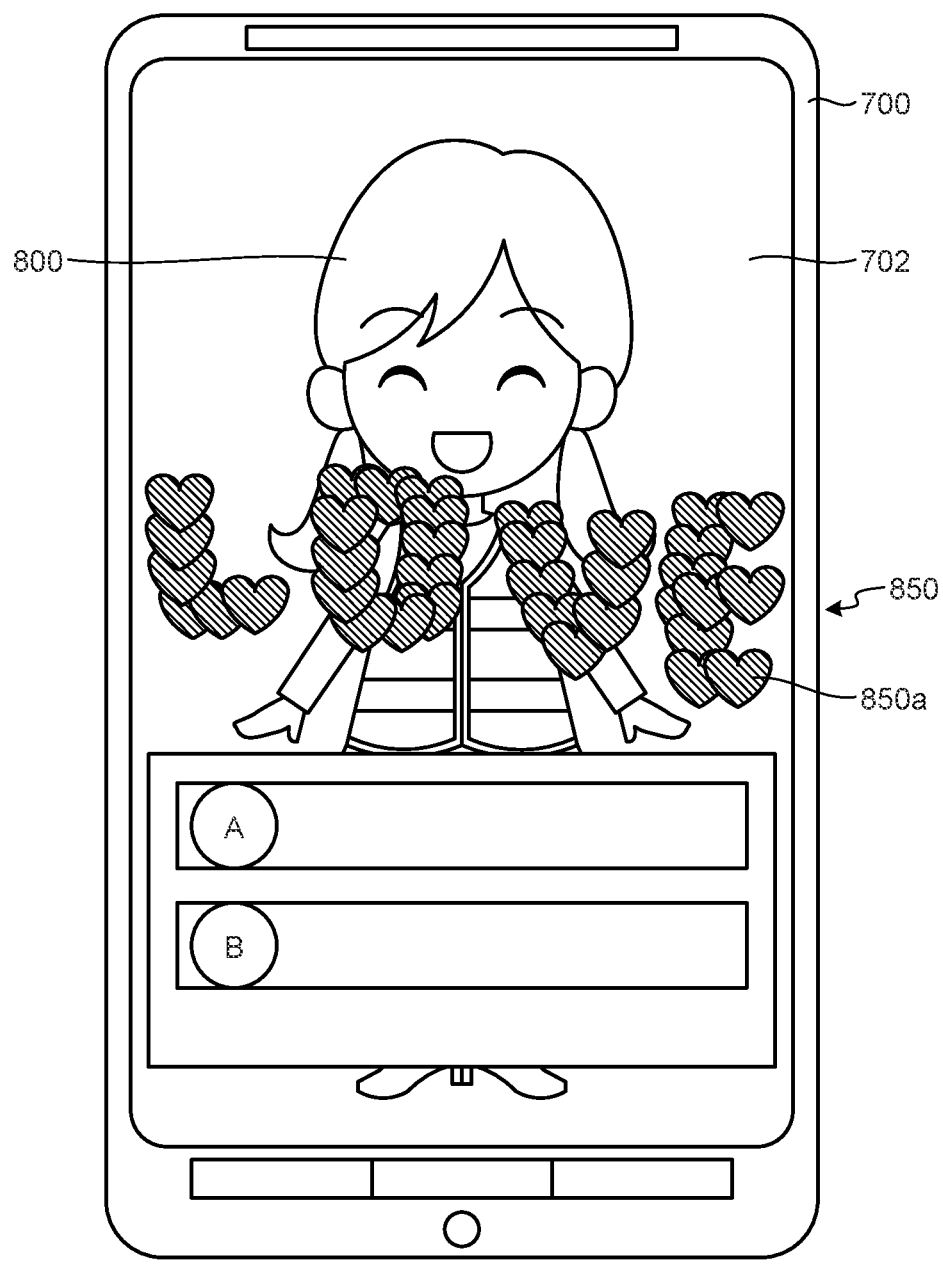
FIG. 15 is an explanatory diagram (part 3) for describing a display example according to the first embodiment of the present disclosure.

Furthermore, as illustrated in FIG. 15, in the present embodiment, the stamp 850 and the virtual object to be superimposed on the image of the distributor 800 are not limited to those prepared in advance, and may be configured by a track or the like drawn by an operation by the viewer 900. Specifically, the viewer 900 may form a stamp 850 indicating one word (stamp 850 including a word "LOVE" is formed in FIG. 15) by arranging a plurality of stamps 850a along a track determined by the viewer himself/herself. Furthermore, the stamp 850 in FIG. 15 may be an animation image in which the plurality of small stamps 850a appears in order along the track drawn by the viewer 900 and creates the word "LOVE".

Figure 16:
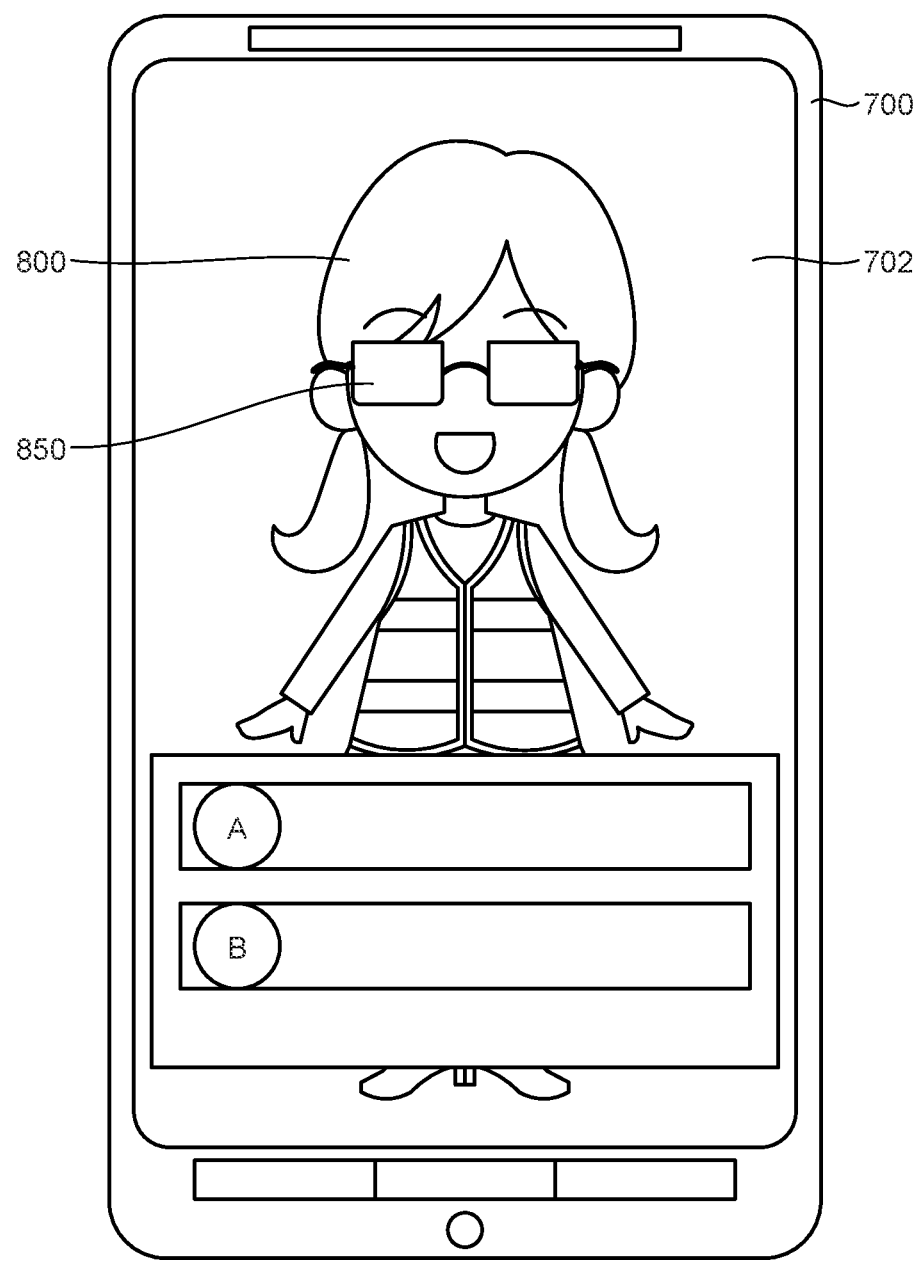
FIG. 16 is an explanatory diagram (part 4) for describing a display example according to the first embodiment of the present disclosure.

Furthermore, as illustrated in FIG. 16, in the present embodiment, the stamp 850 and the virtual object prepared in advance may be deformed according to a shape of an object in a real space on which superimposition is performed. For example, in the example illustrated in FIG. 16, a shape and a size of an eyeglass-type stamp 850 are changed in accordance with a shape and a size of a face of the distributor 800, and the stamp 850 is superimposed on an image of the face of the distributor 800.

Furthermore, in the present embodiment, the stamp 850 itself, a coin for purchasing the stamp 850, or the like may be generated as a gift to the viewer 900 which gift is based on a result of a lottery, a login bonus (store visit bonus), a subscription service, victory or defeat prediction, or the like.

Figure 17:
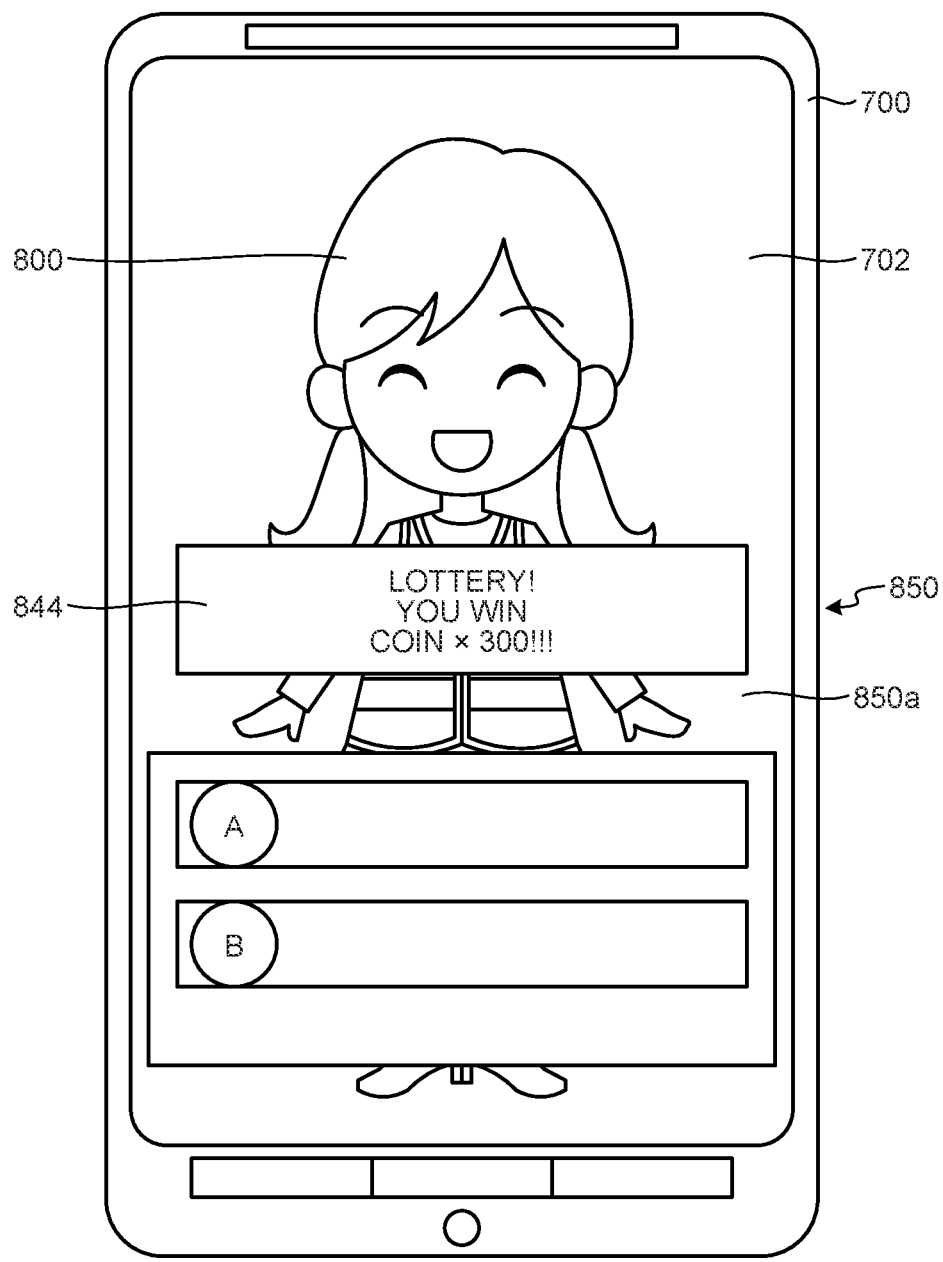
FIG. 17 is an explanatory diagram (part 5) for describing a display example according to the first embodiment of the present disclosure.

For example, in the example illustrated in FIG. 17, the distributor 800 prepares a coin as an award, designates a condition under which the lottery can be performed (specifically, for example, an input of a password or an arbitrary comment), and holds the lottery. Then, in a case where the designated condition is satisfied, the viewer 900 can acquire a coin by participating in the lottery. Then, the viewer 900 can purchase the stamp with a haptic stimulus effect 850 with the acquired coin.

Figure 18:
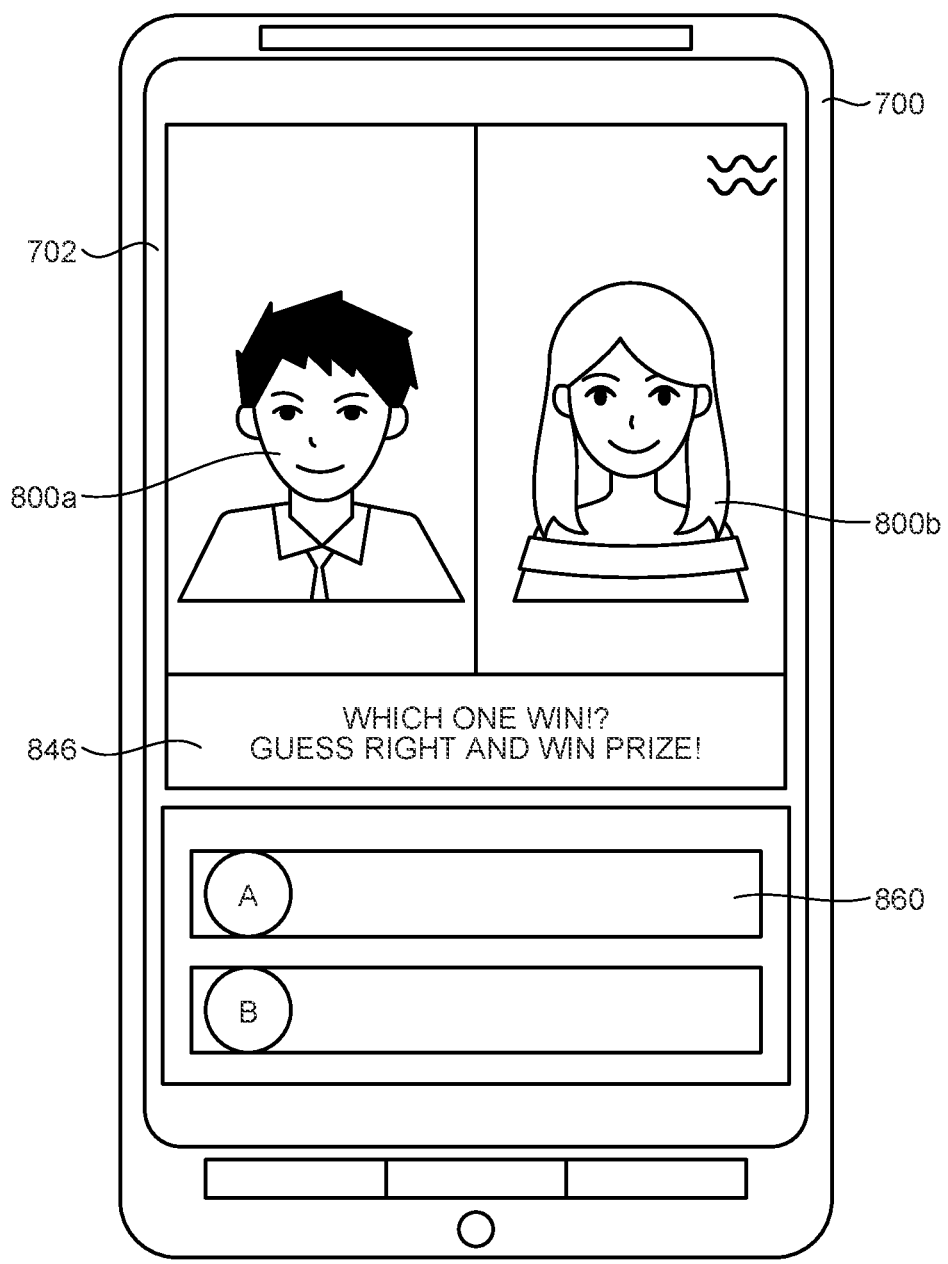
FIG. 18 is an explanatory diagram (part 6) for describing a display example according to the first embodiment of the present disclosure.

Furthermore, for example, in the example illustrated in FIG. 18, in a case where two distributors 800a and 800b play a predetermined game, the viewer 900 predicts a victory or defeat result thereof. Then, in a case where the prediction succeeds, the viewer 900 can acquire the stamp with a haptic stimulus effect 850 as a gift.

Furthermore, in the present embodiment, for example, the viewer 900 can acquire a bonus by logging in once a day to a predetermined application or site. The bonus can be a stamp with a haptic stimulus effect 850 or a virtual currency with which the stamp 850 can be purchased. Furthermore, in the present embodiment, the viewer 900 may acquire the bonus not only in a case of logging in to the predetermined application or the like but also in a case of visiting a predetermined store (detected by a position sensor mounted on the user terminal 700). Furthermore, by continuously logging in, the viewer 900 may be able to acquire more stamps 850 or an expensive stamp (rare stamp) 850.

Furthermore, in the present embodiment, the distributor 800 may provide a stamp with a haptic stimulus effect 850 or a virtual currency, with which the stamp 850 can be purchased, as a benefit limited to a subscription service subscriber by releasing a subscription function. In such a manner, by subscribing to the subscription service of the favorite distributor 800, the viewer 900 can support the distributor 800 and use the above-described benefit limited to the subscriber.

As described above, in the first embodiment, by devising a presentation method of presenting a haptic stimulus corresponding to the stamp with a haptic stimulus effect 850 selected by the viewer 900 to the distributor 800 or an image presented to the viewer 900 or the distributor 800 at the time of presentation of a haptic stimulus, the viewer 900 can feel that he/she directly interacts with the distributor 800. In other words, the viewer 900 can acquire a real-time and interactive experience with a high added value.

4. Second Embodiment

Figure 19:
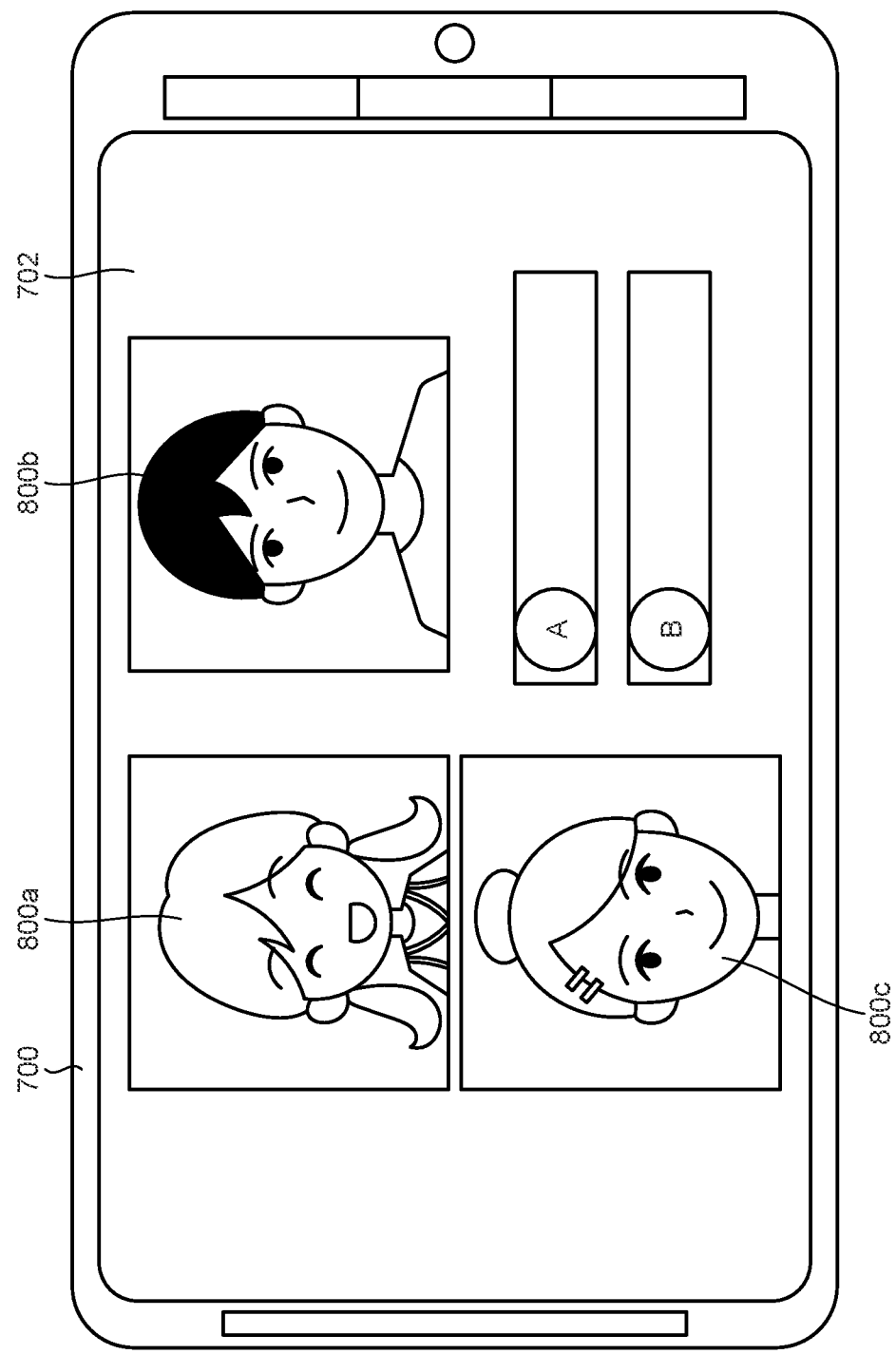
FIG. 19 is an explanatory diagram for describing a second embodiment of the present disclosure.
Figure 20:
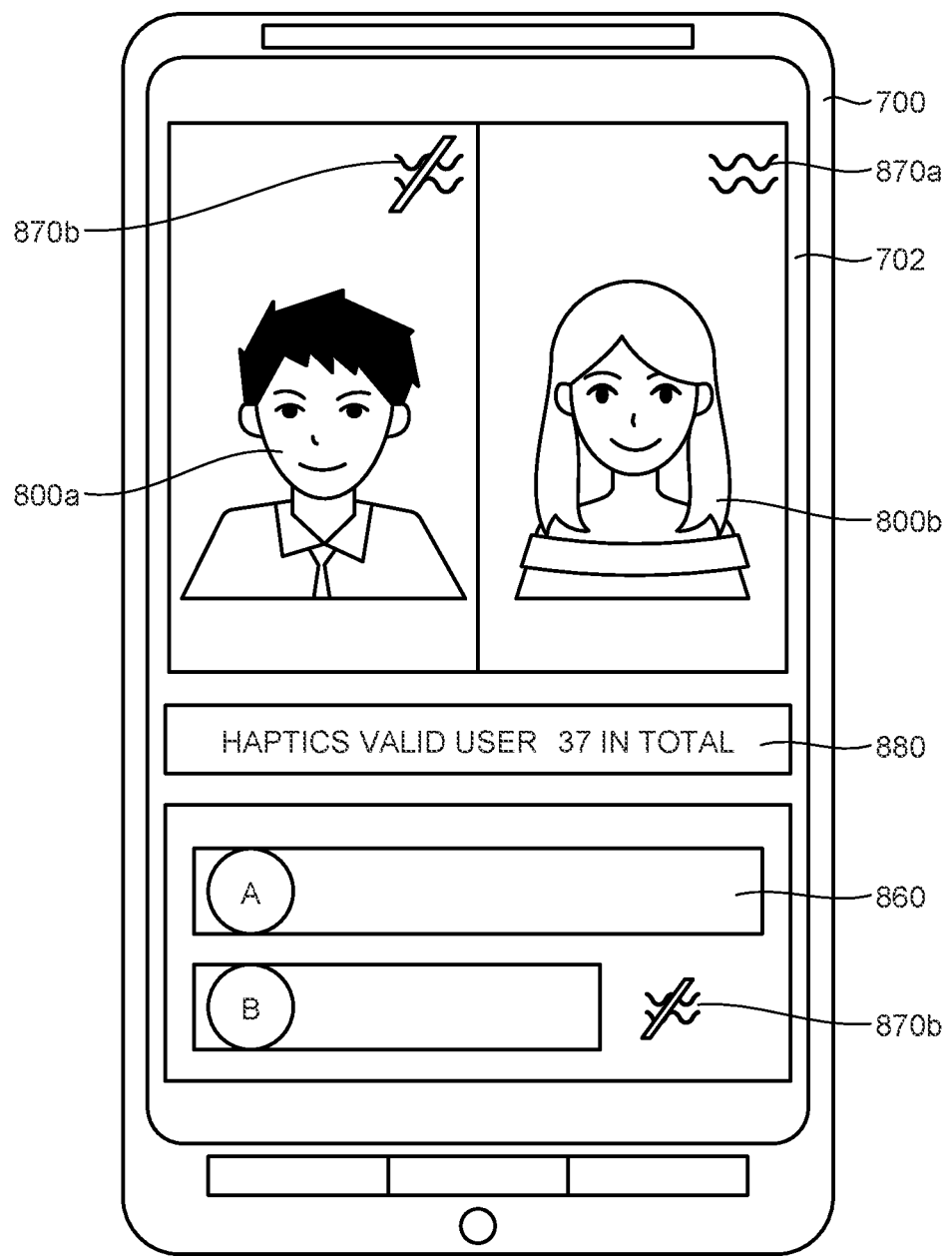
FIG. 20 is an explanatory diagram for describing a display example according to the second embodiment of the present disclosure.

Furthermore, a viewer 900 may enjoy distributions from a plurality of distributors 800 at the same time. A second embodiment of the present disclosure applied in such a case will be described with reference to FIG. 19 and FIG. 20. FIG. 19 is an explanatory diagram for describing the present embodiment, and FIG. 20 is an explanatory diagram for describing a display example according to the present embodiment. For example, as illustrated in FIG. 19, one viewer 900 may enjoy distributions from a plurality of distributors 800a, 800b, and 800c at the same time. In the present embodiment, a method of selecting a distributor 800 to whom a stamp with a haptic stimulus effect (control command) 850 is transmitted and a method of selecting which distributor 800 senses a presented haptic stimulus, the selection being performed by the viewer 900 will be described.

For example, in the present embodiment, as illustrated in FIG. 19, when the viewer 900 displays distribution screens from the plurality of distributors 800a, 800b, and 800c on a display unit 702 of a user terminal 700, the viewer 900 may simultaneously transmit the same stamp 850 to all or a part of the distributors 800a, 800b, and 800c. Alternatively, in the present embodiment, the viewer 900 may determine the distributor 800 to whom the stamp 850 is to be transmitted by selecting a distribution screen of the distributor 800 to whom the haptic stimulus is desired to be presented or an icon (not illustrated) superimposed on the distribution screen. More specifically, for example, the viewer 900 performs a touch operation on the distribution screen of the distributor 800 to whom transmission is desired to be performed, and then performs a touch operation on the stamp 850, whereby the stamp with a haptic stimulus effect 850 can be transmitted to the distributor 800.

Furthermore, in the present embodiment, a voice input may be used as a means to select the distributor 800 to whom the transmission is to be performed. For example, a name of the distributor 800 may be called, a position (such as a right side or a lower side) of the distribution screen may be uttered, information of an object located in a real space included in a distribution image of the distributor 800 (such as a chair, a color of clothes of the distributor 800, an accessory worn by the distributor 800, and the like), or information of a virtual object superimposed on the image of the distributor 800 may be uttered. Furthermore, in the present embodiment, a position of a line of sight of the viewer 900 may be used as a means to select the distributor 800 to whom the transmission is to be performed.

Furthermore, in the present embodiment, it is preferable that an icon 870 indicating whether haptic presentation is acceptable is displayed, for example, on an upper right of each distribution screen, as illustrated in FIG. 20. For example, an icon 870a indicates that the distributor 800b can receive a haptic control signal, and an icon 870b indicates that the distributor 800b cannot receive the haptic control signal. Thus, with reference to such an icon 870, the viewer 900 can determine the distributor 800 to whom the stamp 850 is to be transmitted.

Furthermore, as illustrated in FIG. 20, the viewer 900 can set, by operating the icon 870 displayed next to a comment display 860 of himself/herself, whether a haptic presentation device 100 worn by himself/herself is capable of receiving a haptic stimulus. Specifically, for example, by long tapping on the icon 870b displayed next to the own comment display 860, the viewer 900 can switch and set whether a haptic control signal can be received or cannot be received. Furthermore, in the present embodiment, by operating an icon 870 displayed next to a comment display 860 of another viewer 900, the viewer 900 may set, with respect to a haptic control signal input by another viewer 900, whether the haptic presentation device 100 worn by himself/herself can receive a haptic stimulus.

Furthermore, in the present embodiment, in a case where the viewer 900 wears the haptic presentation device 100 or a vibrating device (not illustrated) is mounted on the user terminal 700 of the viewer 900, the viewer 900 can feel a haptic stimulus corresponding to the stamp 850, which is transmitted to the distributor 800, by the haptic presentation device 100 or the vibrating device. Note that the haptic stimulus felt by the viewer 900 may be a haptic stimulus corresponding to the stamp 850 selected by himself/herself, or may be a haptic stimulus corresponding to a stamp 850 transmitted to the distributor 800 selected by the viewer 900 from another viewer 900. In this case, by operating the icon 870 on the upper right of each distribution screen illustrated in FIG. 20, the viewer 900 can previously select the distributor 800 corresponding to the haptic stimulus desired to be felt.

Furthermore, in the present embodiment, in a case where the viewer 900 selects the plurality of distributors 800, haptic stimuli presented to the distributors 800 may be superimposed (specifically, waveforms of the haptic control signals are superimposed) and presented to the viewer 900. Furthermore, in the present embodiment, a ratio of the superimposition of the haptic stimuli may be determined according to a degree of interest (such as the number of transmitted stamps 850, the number of transmitted comments 860, or a percentage of time in which the line of sight remains) related to each distribution of the viewer 900. Furthermore, in the present embodiment, intensity, presentation time, and the like of the haptic stimulus presented to the distributor 800 may change according to the degree of interest of the viewer 900 (such as the number of transmitted stamps 850, the number of transmitted comments, or the percentage of time in which the line of sight remains) related to each distribution.

Furthermore, in the present embodiment, in a case where the distributor 800 does not wear the haptic presentation device 100, viewers 900 may transmit a stamp with a haptic stimulus effect 850 to each other. In this case, a stamp 850 selected by one viewer 900 may be transmitted only to the other viewer 900 set by the one viewer 900. Alternatively, only a stamp 850 from the one viewer 900 set by the other viewer 900 may be transmitted to the other viewer 900. Furthermore, in the present embodiment, the viewer 900 may set in advance whether it is possible to receive a haptic control signal from another viewer 900. Specifically, for example, as illustrated in FIG. 20, the viewer 900 can perform switching setting whether a haptic control signal can be received or cannot be received by performing long-tapping of the icon 870*b* displayed next to the comment display 860 by himself/herself. Alternatively, in the present embodiment, by operating an icon 870 displayed next to a comment display 860 of another viewer 900, the viewer 900 may set, with respect to a haptic control signal input by another viewer 900, whether the haptic presentation device 100 worn by himself/herself can receive a haptic stimulus. Furthermore, in the present embodiment, for example, as illustrated in FIG. 20, it is preferable that the number of viewers 900 capable of receiving the haptic control signal is displayed on a display 880 for the viewer 900.

Figure 21:
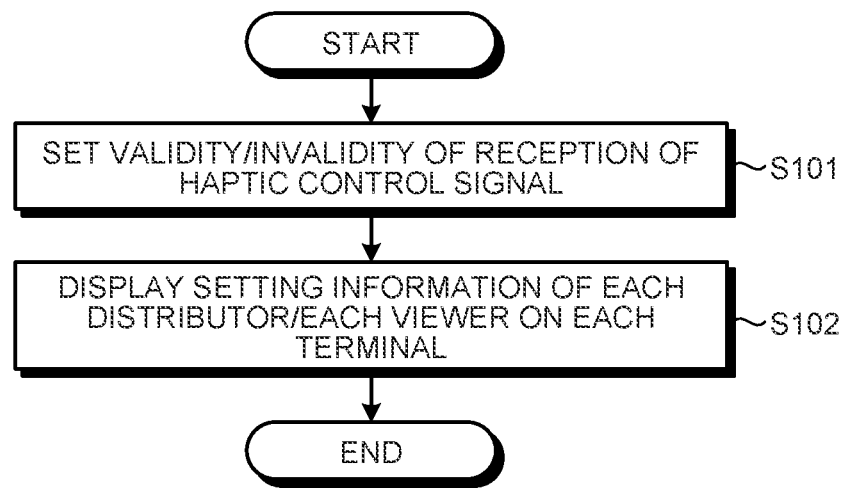
FIG. 21 is a flowchart (part 1) of an example of an information processing method according to the second embodiment of the present disclosure.
Figure 22:
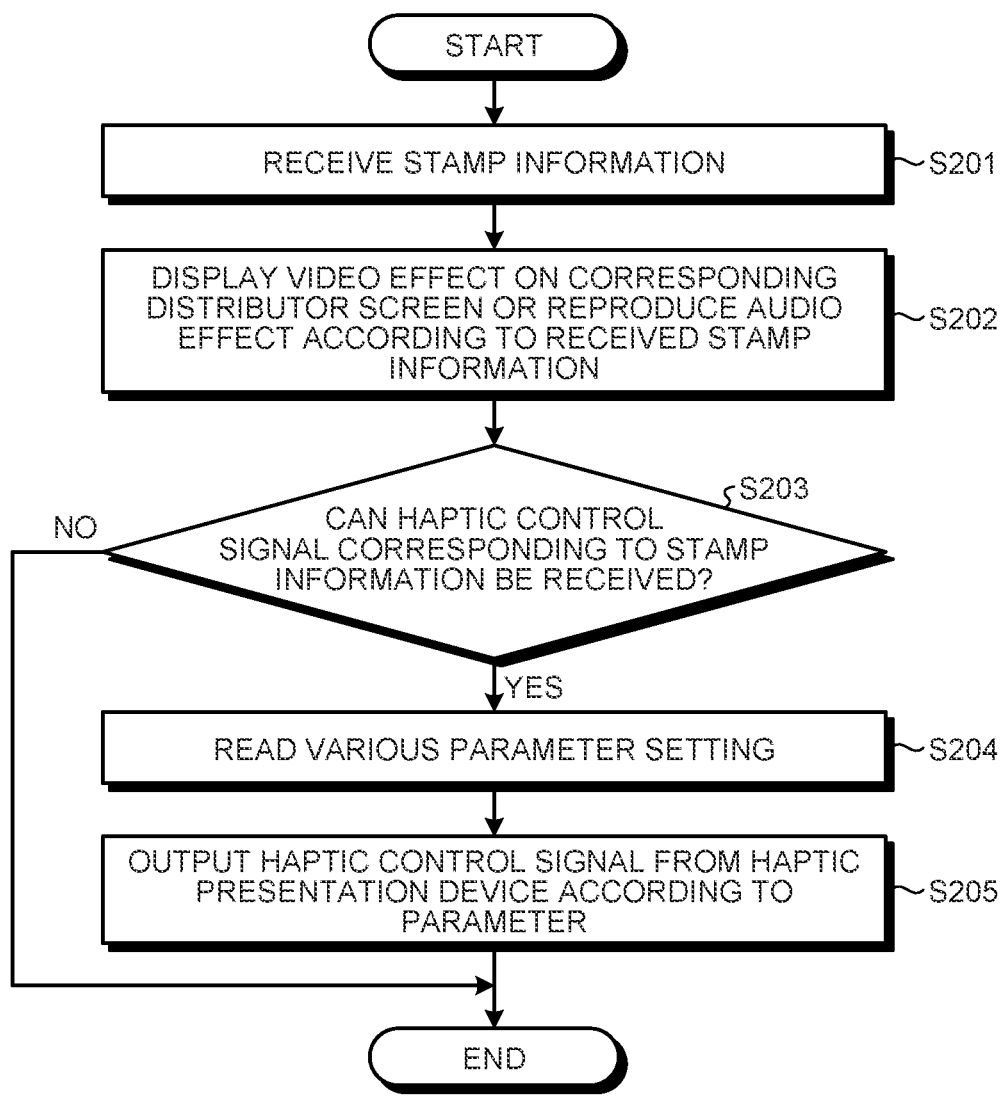
FIG. 22 is a flowchart (part 2) of an example of an information processing method according to the second embodiment of the present disclosure.

Next, an example of an information processing method according to the present embodiment will be described with reference to FIG. 21 and FIG. 22. FIG. 21 and FIG. 22 are flowcharts of the example of the information processing method according to the present embodiment.

First, an information processing method at the time of setting will be described with reference to FIG. 21. As illustrated in FIG. 21, the example of the information processing method according to the present embodiment includes a plurality of steps from Step S101 to Step S102. Hereinafter, details of each step included in the example of the information processing method according to the present embodiment will be described.

On the basis of setting information that indicates whether a haptic control signal can be received or cannot be received and that is from a distributor 800 and a viewer 900, the information processing system 10 sets validity/invalidity of reception of the haptic control signal in the haptic presentation device 100 of each distributor 800 or viewer 900 (Step S101). Then, the information processing system 10 displays the setting information on a monitor 204 of the distributor 800 or a user terminal 700 of the viewer 900 (Step S102). Note that in a case where the viewer 900 performs viewing on a browser, it is preferable that the setting be stored in a server for haptics 300 as a setting value associated with identification information of the viewer 900.

Next, the information processing method at the time of presenting a haptic stimulus will be described with reference to FIG. 22. As illustrated in FIG. 22, the example of the information processing method according to the present embodiment includes a plurality of steps from Step S201 to Step S205. Hereinafter, details of each step included in the example of the information processing method according to the present embodiment will be described.

The server for haptics 300 and a distribution data editing server 400 of the information processing system 10 receive information of a stamp 850 input from the viewer 900 (such as a type of the stamp 850, the viewer 900 who performs the input, and information of a distributor 800 to whom transmission is performed) (Step S201). Note that in the present embodiment, in a case where the viewer 900 performs viewing on a browser or the like, the server for haptics 300 and the distribution data editing server 400 of the information processing system 10 may simultaneously receive video/audio/vibration data itself. Then, the distribution data editing server 400 of the information processing system 10 superimposes and displays a video effect on a distribution screen of the corresponding distributor 800 or reproduces an audio effect according to the received information of the stamp 850 (Step S202).

Then, the server for haptics 300 of the information processing system 10 determines whether a haptic control signal corresponding to the stamp 850 can be received by the haptic presentation device 100 of the distributor 800 or the viewer 900 corresponding to the information of the stamp 850 (Step S203). The server for haptics 300 proceeds to Step S204 in a case of determining that the reception is possible (Step S203: Yes), and ends the processing in a case of determining that the reception is not possible (Step S203: No).

The server for haptics 300 of the information processing system 10 reads each parameter of the haptic control signal associated with the stamp 850 (Step S204). Then, the server for haptics 300 outputs the haptic control signal from the haptic presentation device 100 according to each read parameter (Step S205).

As described above, in the present embodiment, in a case where the viewer 900 simultaneously enjoys the distributions from the plurality of distributors 800, it is possible to easily select the distributor 800 to whom the stamp with a haptic stimulus effect 850 is to be transmitted. Furthermore, in the present embodiment, the viewer 900 can feel a haptic stimulus presented to one or the plurality of distributors 800, and viewers 900 can mutually transmit stamps with a haptic stimulus effect 850. In other words, according to the present embodiment, the viewers 900 can acquire a real-time and interactive experience with a high added value.

5. Third Embodiment

Figure 23:
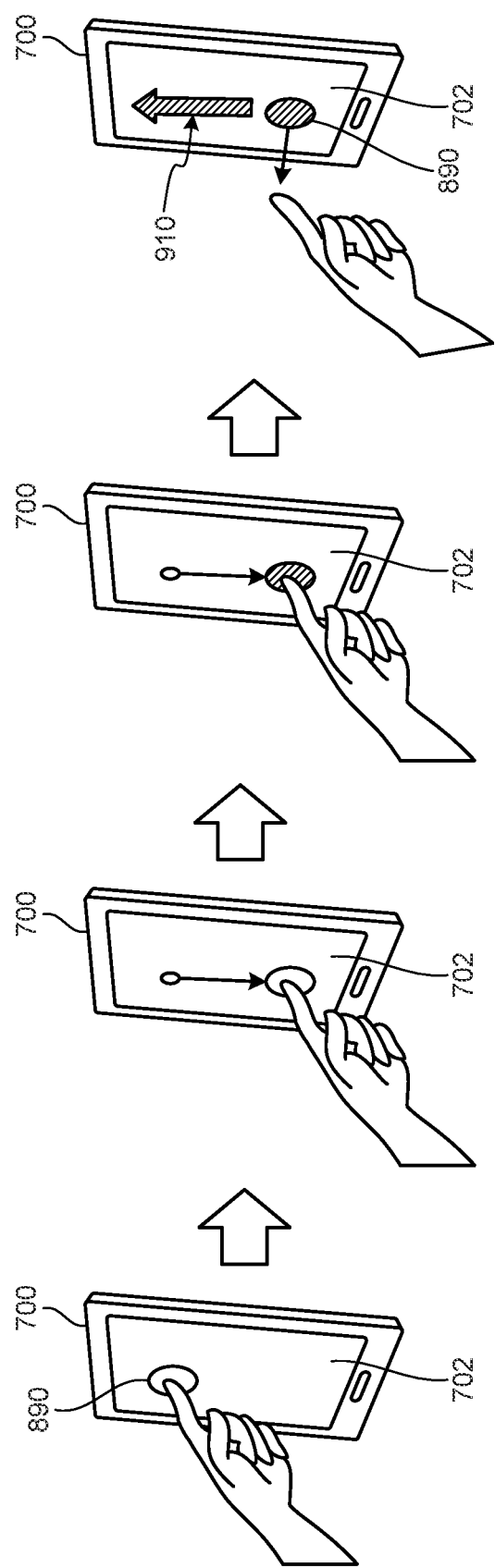
FIG. 23 is an explanatory diagram (part 1) for describing an input example according to a third embodiment of the present disclosure.

Next, a third embodiment of the present disclosure with respect to a method of setting each parameter of a haptic control signal and of setting a distributor 800 to whom a stamp with a haptic stimulus effect 850 is transmitted, the setting being performed by a viewer 900 will be described with reference to FIG. 23. FIG. 23 is an explanatory diagram for describing an input example according to the third embodiment of the present disclosure.

For example, in the present embodiment, as illustrated in FIG. 23, the viewer 900 can set intensity or a type of a haptic control signal to be presented to the distributor 800 by a drag operation to perform dragging (specifically, an operation of releasing a finger after the drag operation from a touch operation start position of the finger toward a relatively lower part of a screen) on an icon 890 displayed on a display unit 702 of a user terminal 700. In the present embodiment, the intensity or the type of the haptic control signal to be presented to the distributor 800 is determined according to a distance, time, or speed of the dragging of the icon 890 by the viewer 900. Furthermore, at this time, a haptic stimulus may be presented to the distributor 800 at a timing at which the viewer 900 releases the finger from the icon 890. Furthermore, at this time, a haptic stimulus may be presented to the distributor 800 associated with a position corresponding to a vector 910 opposite to a vector corresponding to a track of the drag operation.

Figure 24:
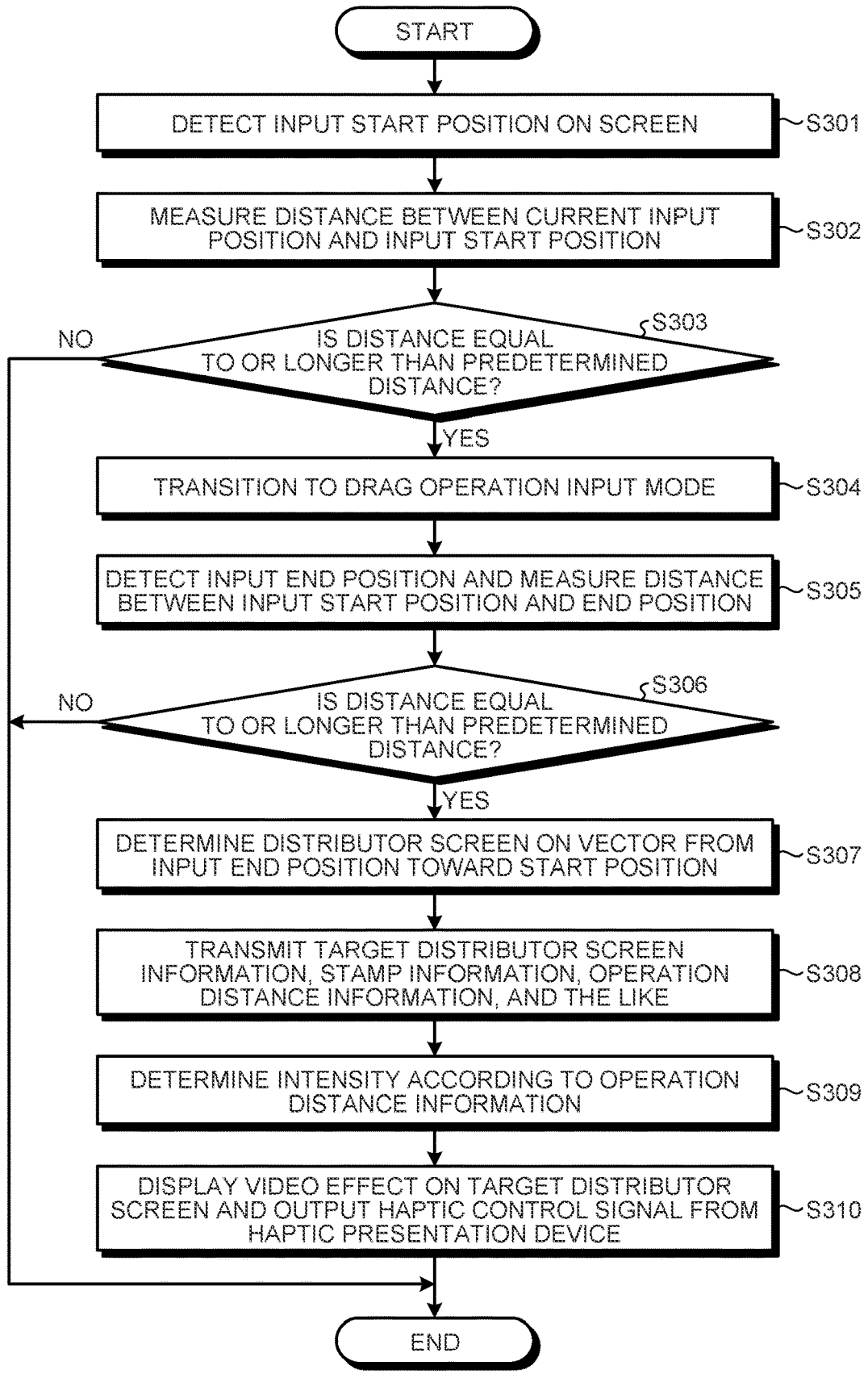
FIG. 24 is a flowchart (part 1) of an example of an information processing method according to the third embodiment of the present disclosure.

Next, an information processing method according to the present embodiment will be described with reference to FIG. 24. FIG. 24 is a flowchart of an example of the information processing method according to the present embodiment. As illustrated in FIG. 24, the example of the information processing method according to the present embodiment includes a plurality of steps from Step S301 to Step S310. Hereinafter, details of each step included in the example of the information processing method according to the present embodiment will be described.

A user terminal 700 of an information processing system 10 detects an input start position (portion where a touch operation is started) by the viewer 900 on a screen of the user terminal 700 (Step S301). Then, a server for haptics 300 measures a distance between a current input position and the input start position (Step S302).

Then, the user terminal 700 of the information processing system 10 determines whether the distance measured in Step S302 is equal to or longer than a predetermined distance (Step S303). The user terminal 700 proceeds to Step S304 in a case of determining that the measured distance is equal to or longer than the predetermined distance (Step S303: Yes), and ends the processing in a case of determining that the measured distance is not equal to or longer than the predetermined distance (Step S303: No).

Then, the user terminal 700 of the information processing system 10 transitions to a drag operation input mode (Step S304). The user terminal 700 detects an input end position (position at which a finger is released from the screen), and measures a distance between the input end position and the input start position (Step S305).

Then, the user terminal 700 of the information processing system 10 determines whether the distance measured in Step S305 is equal to or longer than a predetermined distance (Step S306). The user terminal 700 proceeds to Step S307 in a case of determining that the measured distance is equal to or longer than the predetermined distance (Step S306: Yes), and ends the processing in a case of determining that the measured distance is not equal to or longer than the predetermined distance (Step S306: No).

Then, the user terminal 700 of the information processing system 10 determines a distribution screen of the distributor 800 on a vector from the input end position toward the input start position (Step S307). Then, the user terminal 700 transmits screen information of the distributor 800 to be a target, information of the stamp 850, operation distance information, and the like to the server for haptics 300 or the like (Step S308). Then, the server for haptics 300 determines intensity of a haptic control signal according to the operation distance information (Step S309). Then, the distribution data editing server 400 displays a video effect on the distribution screen of the distributor 800 to be the target, and the server for haptics 300 outputs the haptic control signal from the haptic presentation device 100 (Step S310).

Figure 25:
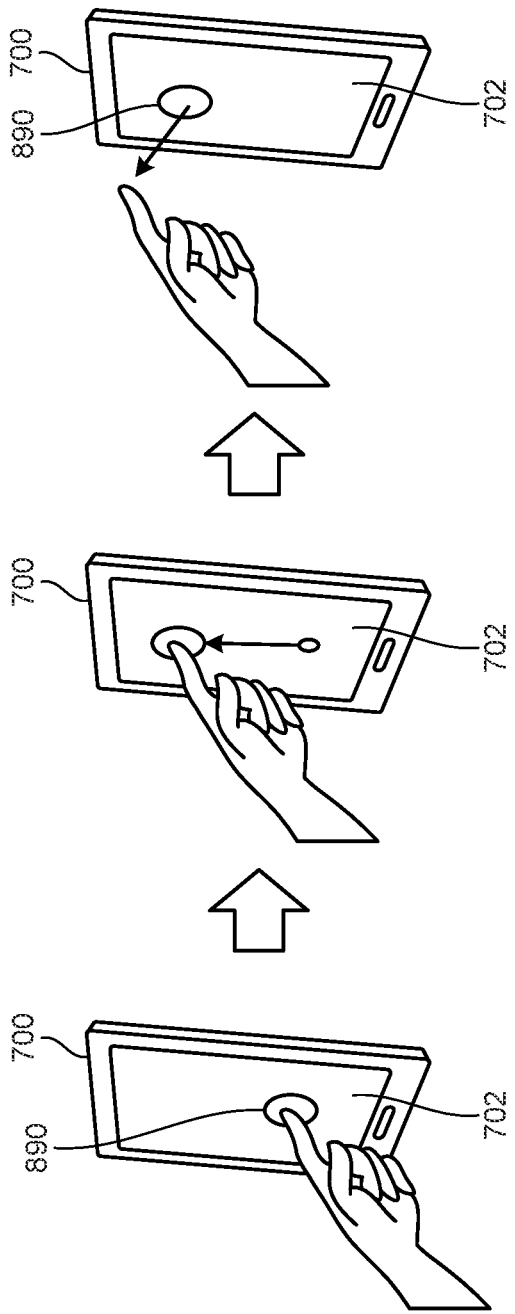
FIG. 25 is an explanatory diagram (part 2) for describing an input example according to the third embodiment of the present disclosure.

Furthermore, a different setting method may be used in the present embodiment. The different setting method will be described with reference to FIG. 25. FIG. 25 is an explanatory diagram for describing an input example according to the present embodiment.

As illustrated in FIG. 25, the viewer 900 may perform a swipe operation (releasing a finger after relatively quick swipe operation from a touch start position of the finger toward an upper portion of the screen (or the distribution screen of the distributor) on the icon 890 displayed on the display unit 702 of the user terminal 700. Also in this case, intensity of a haptic control signal presented to the distributor 800 is determined according to a distance or speed of the swipe operation.

Figure 26:
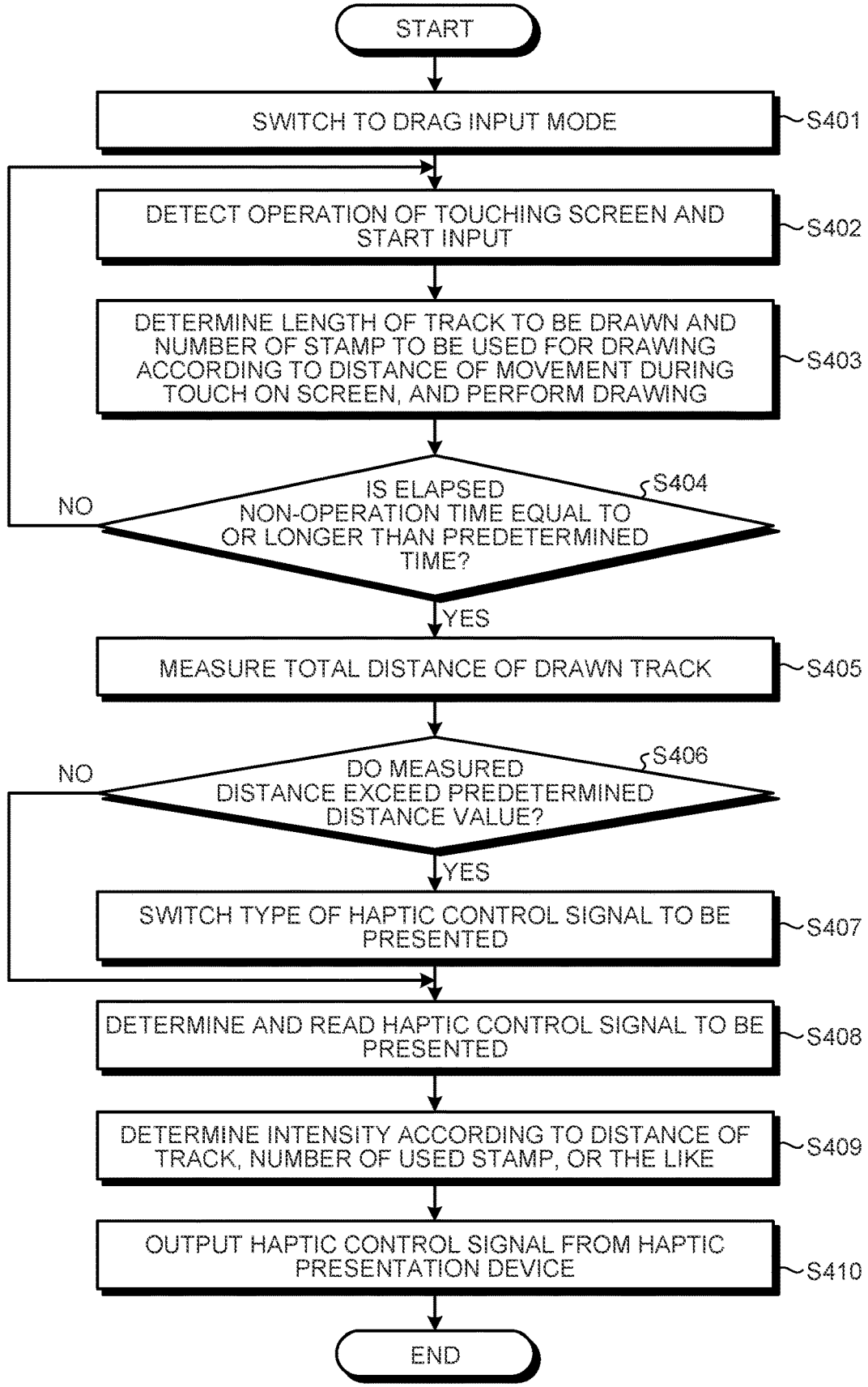
FIG. 26 is a flowchart (part 2) of an example of an information processing method according to the third embodiment of the present disclosure.

Next, an information processing method according to the present embodiment will be described with reference to FIG. 26. FIG. 26 is a flowchart of an example of the information processing method according to the present embodiment. As illustrated in FIG. 26, the example of the information processing method according to the present embodiment includes a plurality of steps from Step S401 to Step S410. Hereinafter, details of each step included in the example of the information processing method according to the present embodiment will be described.

When receiving a predetermined trigger (such as an input of a specific stamp 850, mode switching by the distributor 800, or mode switching by the viewer 900), the user terminal 700 of the information processing system 10 switches to a drag input mode (Step S401). Then, the user terminal 700 detects an operation of touching the screen by the viewer 900 and starts an input (Step S402).

The information processing system 10 (specifically, the user terminal 700 or the distribution data editing server 400) determines a length of a track to be drawn and the number of stamps to be used for drawing according to a distance of movement of the viewer 900 during the touch on the screen, and performs the drawing (Step S403).

Then, the user terminal 700 of the information processing system 10 determines whether non-operation time has elapsed for predetermined time or longer (Step S404). The user terminal 700 proceeds to Step S405 in a case of determining that the non-operation time is equal to or longer than the predetermined time (Step S404: Yes), and returns to the processing in Step S402 in a case of determining that the non-operation time is not equal to or longer than the predetermined time (Step S404: No).

The user terminal 700 of the information processing system 10 measures a total distance of the drawn track (or the number of stamps to be used) (Step S405).

Then, the user terminal 700 of the information processing system 10 determines whether the distance measured in Step S405 is equal to or longer than a predetermined distance (or the predetermined number) (Step S406). The user terminal 700 proceeds to Step S407 in a case of determining that the measured distance is equal to or longer than the predetermined distance (Step S406: Yes), and proceeds to processing in Step S408 in a case of determining that the measured distance is not equal to or longer than the predetermined distance (Step S406: No).

The user terminal 700 or the server for haptics 300 of the information processing system 10 switches a type of a haptic control signal to be presented on the basis of the determination in Step S406 (Step S407). The server for haptics 300 determines the haptic control signal to be presented and reads each parameter of the haptic control signal (Step S408). The server for haptics 300 determines intensity of the haptic control signal according to the distance of the track, the number of used stamps 850, or the like (Step S409). Then, the server for haptics 300 outputs the haptic control signal from the haptic presentation device 100 (Step S410).

Furthermore, in the present embodiment, the viewer 900 may perform setting by tapping a back surface that faces the display unit 702 of the user terminal 700. Specifically, the viewer 900 selects the stamp 850 by a tap operation on the display unit 702, and determines timing of presenting a haptic stimulus by the tap operation on the back surface. Note that the tap operation on the back surface can be detected by an acceleration sensor 728 built in the user terminal 700. Furthermore, in the present embodiment, a timing of presenting a haptic stimulus may be determined at a timing at which tap operations by a plurality of viewers 900 are synchronized.

Furthermore, in the present embodiment, the haptic stimulus is edited and set not only by the operation on the display unit 702 but also by utilization of various sensors and other devices built in the user terminal 700, for example. In the present embodiment, for example, the viewer 900 may edit a waveform, an intensity change, or the like of the haptic stimulus by performing a touch operation such as applying vibration or a motion operation such as changing a holding angle on the user terminal 700. Specifically, in the present embodiment, the motion operation is detected by a gyroscope sensor 726 and the acceleration sensor 728 built in the user terminal 700, and a waveform or the like of the haptic stimulus can be determined on the basis of the detected sensing data.

Furthermore, in the present embodiment, a shape or a character (track) drawn by the viewer 900 may be recognized, a word may be extracted from a result of the recognition, and a stamp 850 or a haptic control signal associated with the extracted word may be selected. At that time, not only an operation on a touch panel (not illustrated) of the user terminal 700 but also drawing of a character or a shape in the air may be performed. In this case, for example, the character or the shape may be recognized by an IMU sensor (not illustrated) attached to an arm of the viewer 900.

Figure 27:
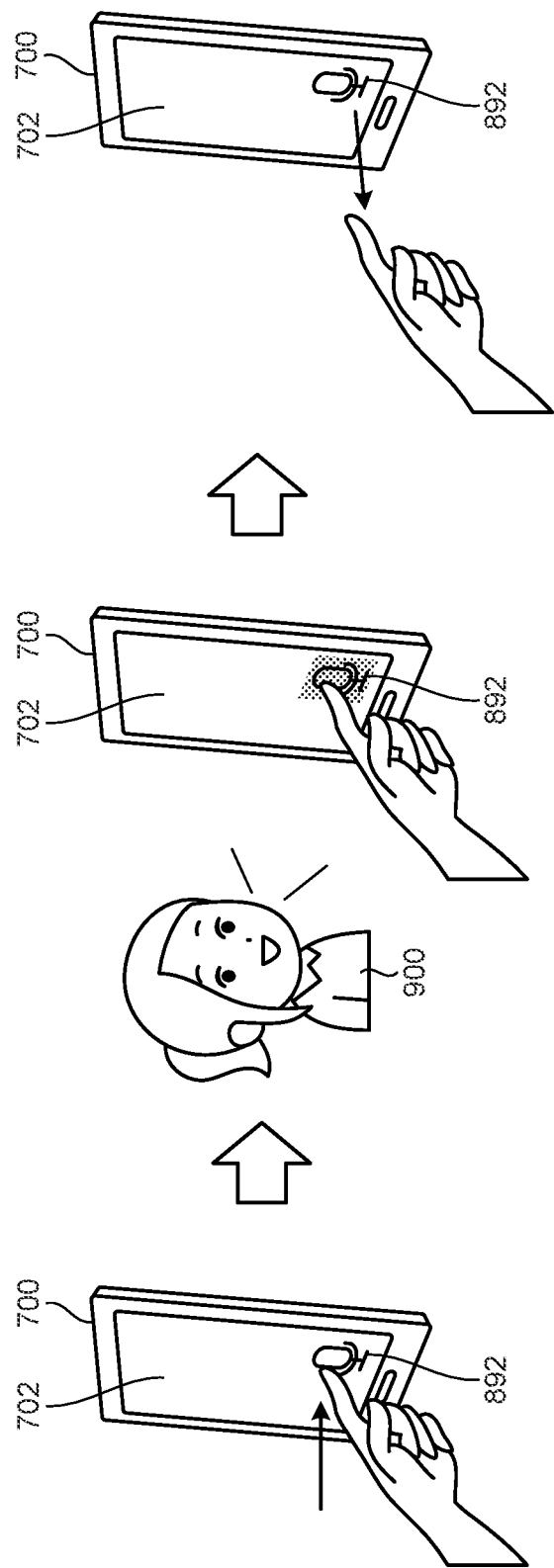
FIG. 27 is an explanatory diagram (part 3) for describing an input example according to the third embodiment of the present disclosure.

Furthermore, as illustrated in FIG. 27, a haptic control signal can also be edited by a voice input. FIG. 27 is an explanatory diagram for describing an input example according to the present embodiment. For example, the viewer 900 utters a voice having a predetermined rhythm to the user terminal 700, and causes a microphone 724 built in the user terminal 700 to detect the utterance. Then, the server for haptics 300 may use the sensing data detected by the microphone 724 and set a frequency of the haptic control signal according to the rhythm of the voice. Furthermore, in the present embodiment, for example, as illustrated in FIG. 27, switching to a voice input mode may be performed while the viewer 900 is touching a microphone icon 892 (the voice input mode is ended when a finger is released), or a start and end of the input may be switched each time the microphone icon 892 is touched.

Note that, for example, in a case where it is desired to continuously present haptic stimuli associated with a plurality of stamps 850 to the distributor 800 to rhythm of music, it can be said that voice input is an effective means since timing of the presentation can be determined by the voice instead of the tap operation. Furthermore, when predetermined music or rhythm is output toward the viewer 900 and the rhythm or timings of the music and the uttered voice of the viewer 900 match, intensity of the haptic control signal may increase or other parameters may change.

Furthermore, in the present embodiment, in a case where the viewer 900 utters an onomatopoeia (such as stuck-up, bummer, or tremble), a name of a stamp 850 (such as heart, or bouquet), or the like, a word may be extracted from the uttered voice and a stamp 850 or a haptic stimulus associated with the extracted word may be selected. At that time, the intensity of the haptic control signal may be increased or other parameters may be changed according to a sound pressure (volume) of the uttered voice.

As described above, in the embodiment of the present disclosure, the viewer 900 can set a presentation timing of the haptic stimulus, the distributor 800 to whom the presentation is performed, and each parameter of the haptic control signal by various input methods. Since the viewer 900 can easily perform the setting in such a manner, the viewer 900 can acquire a real-time and interactive experience with a high added value according to the present embodiment.

6. Fourth Embodiment

Figure 28:
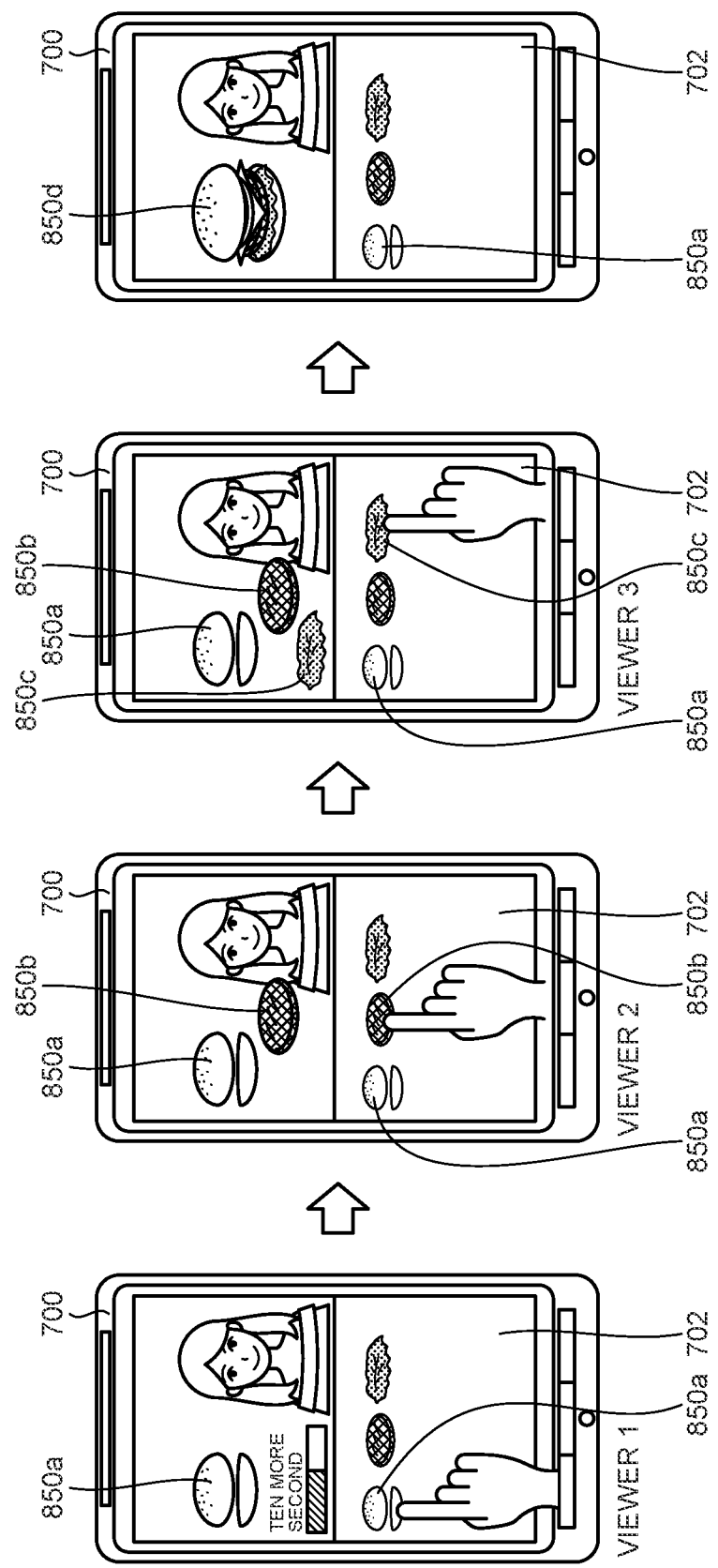
FIG. 28 is an explanatory diagram for describing an input example according to a fourth embodiment of the present disclosure.

Furthermore, in the present disclosure, in a case where a plurality of viewers 900 selects predetermined types of stamps 850 within a predetermined time, the stamps 850 may be changed to a new stamp 850 and changed to a new haptic stimulus according to a combination of the stamps 850. Such a fourth embodiment of the present disclosure will be described with reference to FIG. 28. FIG. 28 is an explanatory diagram for describing an input example according to the present embodiment.

For example, as illustrated in FIG. 28, in a case where a viewer 1 selects a stamp 850*a* of buns, a clock starts, and the user terminal 700 displays remaining time. Then, in a case where a viewer 2 selects a stamp 850*b* of meat and a viewer 3 selects a stamp 850*c* of lettuce within a predetermined time, a change to a stamp 850*d* of a hamburger in which the stamps 850*a*, 850*b*, and 850*c* are combined is made. A haptic stimulus associated with the stamp 850*d* is different from haptic stimuli associated with the other stamps 850*a*, 850*b*, and 850*c*. That is, in the present embodiment, in a case where the plurality of viewers 900 selects the predetermined types of stamps 850 within the predetermined time and a predetermined condition is satisfied, a video effect of the stamps 850 change, or a haptic stimulus presented to the distributor 800 changes.

Figure 29:
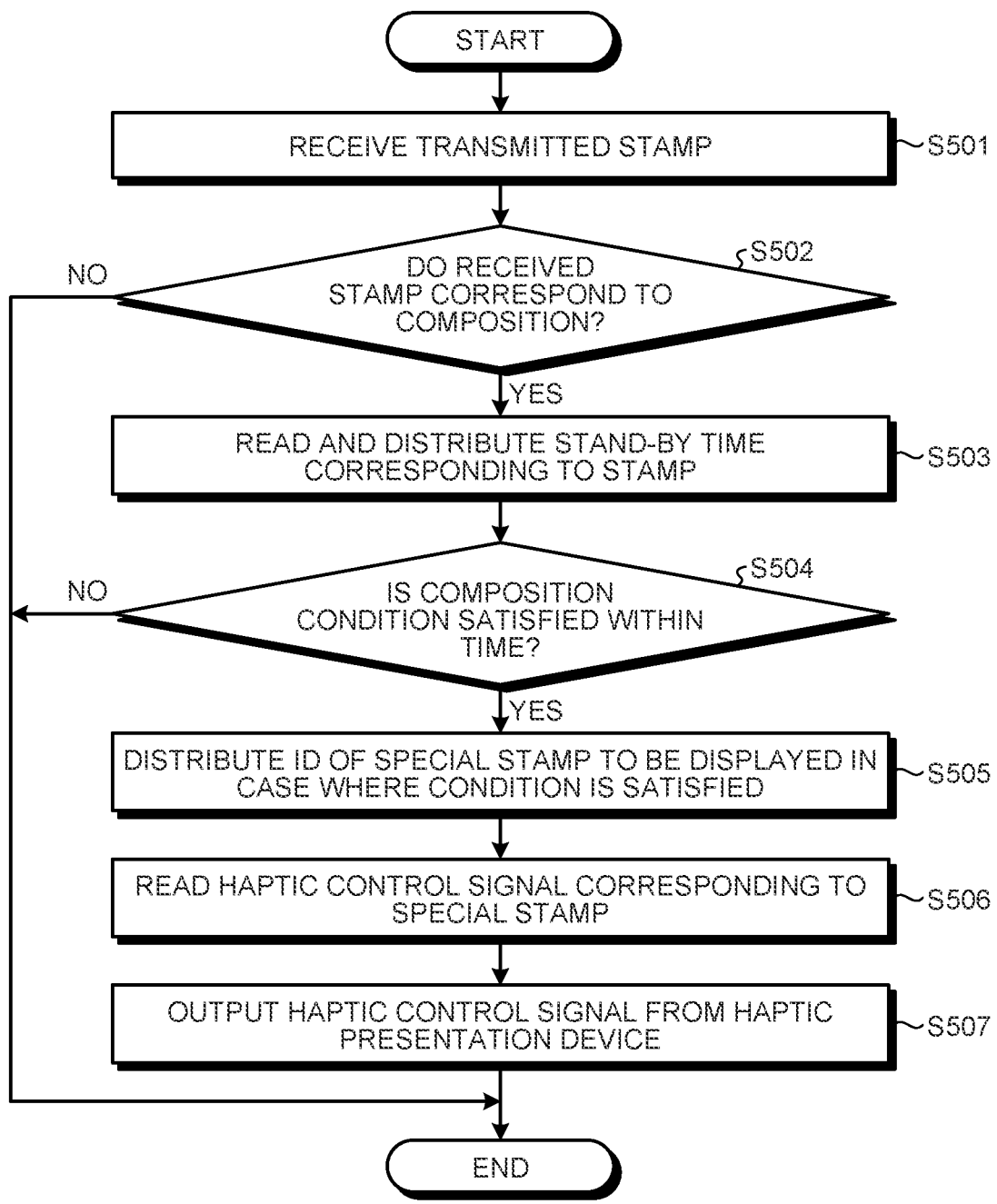
FIG. 29 is a flowchart of an example of an information processing method according to the fourth embodiment of the present disclosure.

Next, an example of an information processing method according to the present embodiment will be described with reference to FIG. 29. FIG. 29 is a flowchart of an example of the information processing method according to the present embodiment. As illustrated in FIG. 29, the example of the information processing method according to the present embodiment includes a plurality of steps from Step S501 to Step S507.

Hereinafter, details of each step included in the example of the information processing method according to the present embodiment will be described.

A distribution data editing server 400 of an information processing system 10 receives information of a stamp 850 (identification information of the stamp 850) transmitted from the user terminal 700 (Step S501).

Then, the distribution data editing server 400 of the information processing system 10 determines whether the selected stamp 850 corresponds to composition (Step S502). The distribution data editing server 400 proceeds to Step S503 in a case of determining that the stamp 850 corresponds to the composition (Step S502: Yes), and ends the processing in a case of determining that the stamp 850 does not correspond to the composition (Step S502: No).

Then, the distribution data editing server 400 reads a stand-by time corresponding to the selected stamp 850 and performs distribution thereof (Step S503). At this time, the user terminal 700 that receives the distribution presents remaining time to each viewer 900 by displaying text, a time bar, or the like thereof on the basis of the stand-by time.

Then, the distribution data editing server 400 determines whether a stamp 850 input from another viewer 900 within a predetermined time satisfies a predetermined composition condition (Step S504). The distribution data editing server 400 proceeds to Step S505 in a case of determining that the composition condition is satisfied (Step S504: Yes), and ends the processing in a case of determining that the composition condition is not satisfied (Step S504: No).

The distribution data editing server 400 of the information processing system 10 distributes identification information and a video effect of a special stamp 850 to be displayed in a case where the composition condition is satisfied, and causes the user terminal 700 to display the special stamp 850 (Step S505). At this time, an image of the stamp 850 input until then and displayed on the user terminal 700 may be deleted. Furthermore, a server for haptics 300 reads a haptic control signal associated with the special stamp 850 selected in Step S505 (Step S506). Next, the server for haptics 300 outputs a haptic control signal (signal different from the haptic control signal corresponding to the stamp 850) from a haptic presentation device 100 (Step S507). Note that, in the present embodiment, the server for haptics 300 may receive identification information associated with the special stamp 850 selected in Step S505, and read the haptic control signal on the basis of the received identification information in Step S506 described above.

As described above, in the embodiment of the present disclosure, a new stamp 850 and a new haptic stimulus can be transmitted to the distributor 800 in cooperation with another viewer 900. Since such transmission can be performed, the viewer 900 can acquire a real-time and interactive experience with a high added value according to the present embodiment.

7. Fifth Embodiment

Incidentally, in a case where a large number of stamps 850 are simultaneously transmitted to one distributor 800, a haptic stimulation unit 106 of a haptic presentation device 100 worn on the distributor 800 may generate heat due to operation and cause operation abnormality. Thus, in the following, as the fifth embodiment of the present disclosure, an embodiment in which a limit is set on haptic stimuli reproduced at the same time and a burden on a haptic stimulation unit 106 of a haptic presentation device 100 can be avoided will be described.

For example, in the present embodiment, a server for haptics 300 of an information processing system 10 compares the number of haptic stimuli (stamps 850) simultaneously reproduced, intensity of a haptic control signal, presentation time, heat of the haptic stimulation unit 106, or the like with a threshold determined in advance according to a characteristic of the haptic stimulation unit 106. Then, the server for haptics 300 limits the haptic stimuli reproduced at the same time in a case of determining that the threshold is exceeded. Furthermore, in a case where the limit is set, the server for haptics 300 may temporarily stop the presentation of the haptic stimuli, or stack the haptic stimulus of each stamp 850 and resume the presentation of the haptic stimuli when the parameter falls below the threshold. Note that it is assumed that a temperature of the haptic stimulation unit 106 is transmitted from the haptic presentation device 100 to the server for haptics 300 in the present embodiment.

Figure 30:
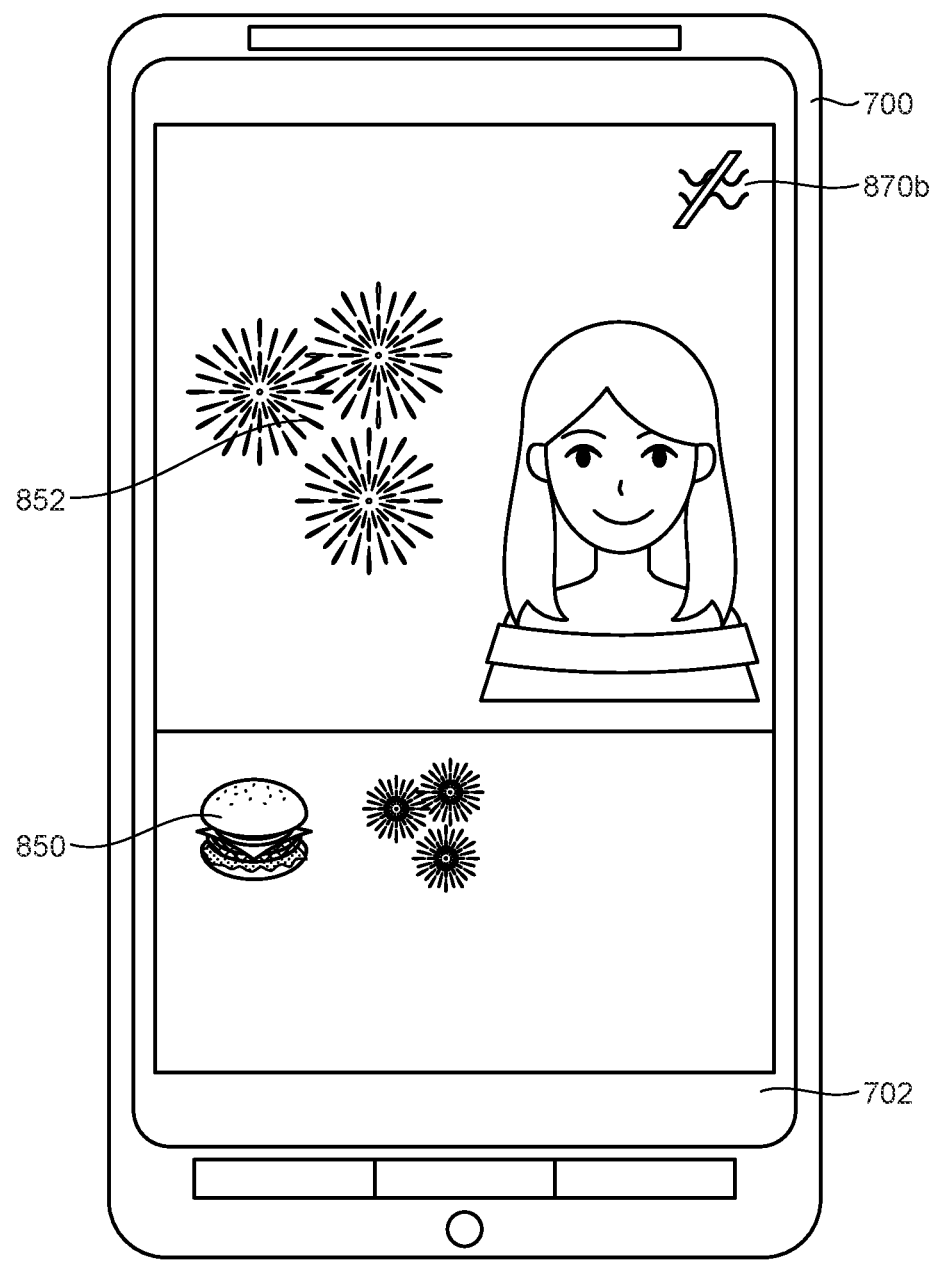
FIG. 30 is an explanatory diagram (part 1) for describing a display example according to a fifth embodiment of the present disclosure.
Figure 31:
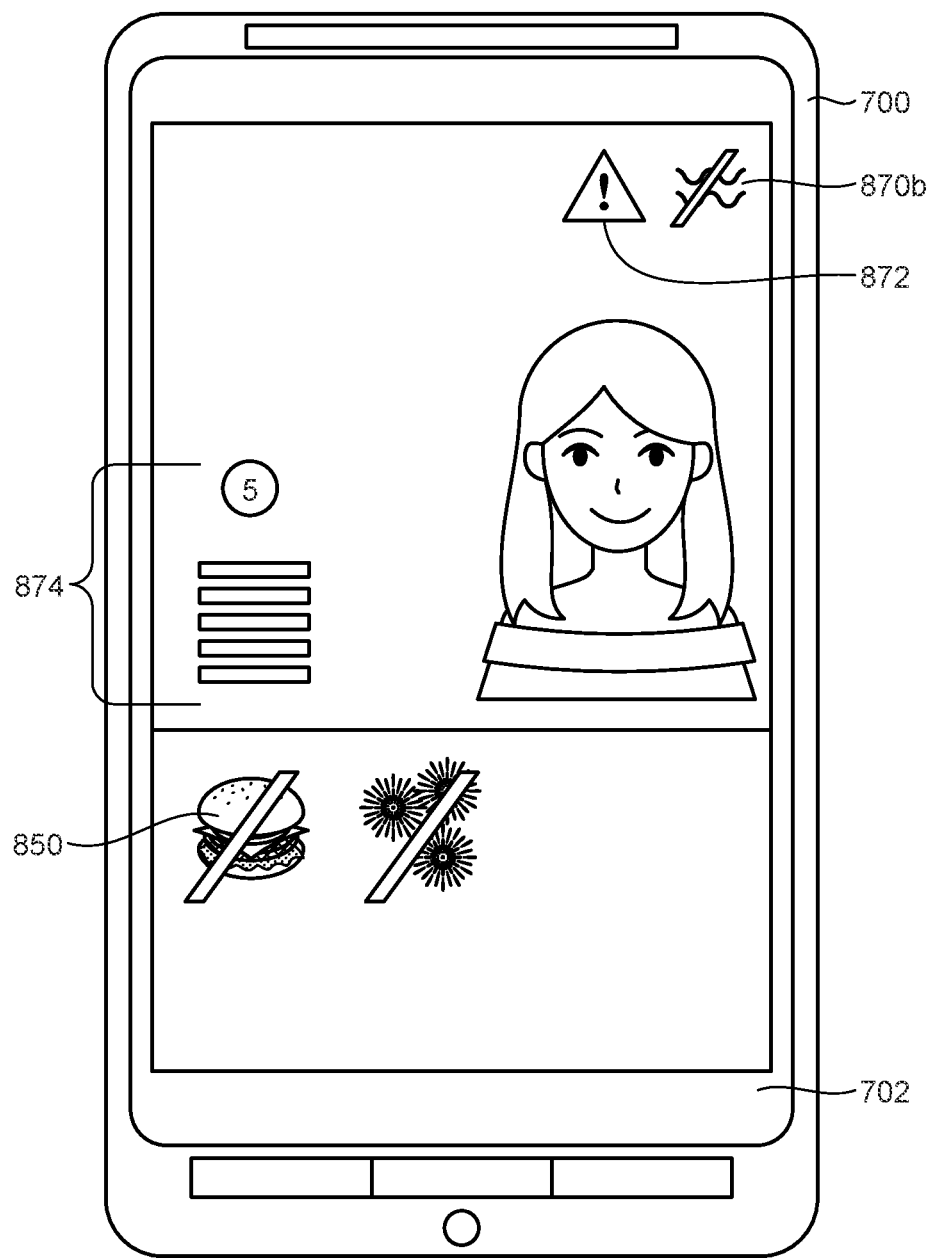
FIG. 31 is an explanatory diagram (part 2) for describing a display example according to the fifth embodiment of the present disclosure.

Furthermore, at the time of the temporary stop, it is preferable to notify a viewer 900 of a primary stop. For example, a display example of the notification will be described with reference to FIG. 30 and FIG. 31. FIG. 30 and FIG. 31 are explanatory diagrams for describing the display example according to the present embodiment.

For example, as illustrated in FIG. 27, a user terminal 700 may stop only the presentation of the haptic stimulus and may keep displaying a stamp 852 or the like. Furthermore, at this time, the user terminal 700 may display an icon 870b indicating the temporary stop and perform a display 850 indicating that there is no stamp that can be selected by the viewer 900.

Furthermore, in a case where not only the haptic stimulus but also a video display are stopped, the user terminal 700 may perform a display in a manner illustrated in FIG. 31. Furthermore, at this time, the user terminal 700 may display an icon 872 indicating that a state is a stopped state, or may display the number of stamps 850 or haptic stimuli in a stack as indicated by a reference sign 874.

Figure 32:
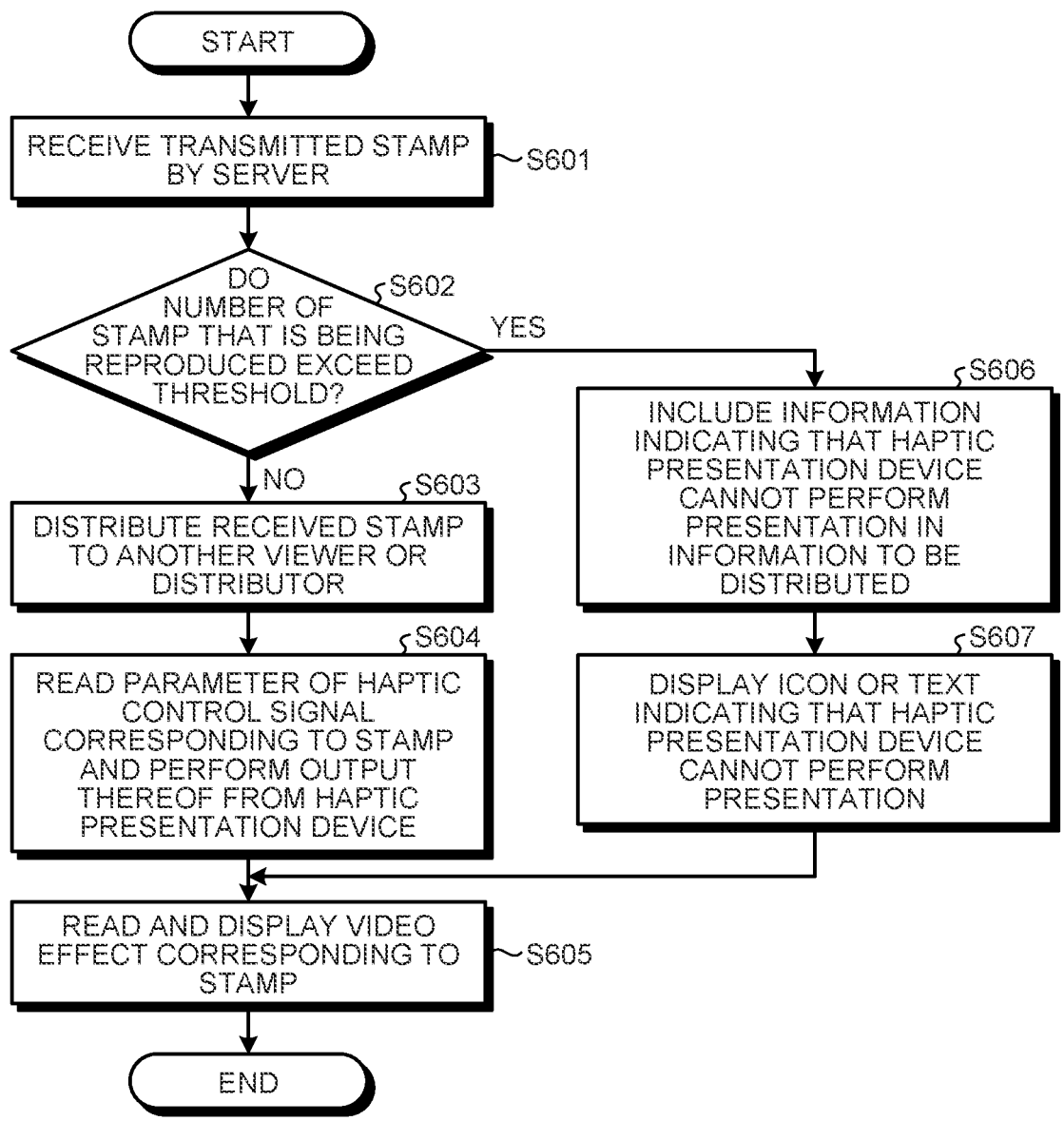
FIG. 32 is a flowchart of an example of an information processing method according to the fifth embodiment of the present disclosure.

Next, an information processing method according to the present embodiment will be described with reference to FIG. 32. FIG. 32 is a flowchart of an example of the information processing method according to the present embodiment. As illustrated in FIG. 32, the example of the information processing method according to the present embodiment includes a plurality of steps from Step S601 to Step S607. Hereinafter, details of each step included in the example of the information processing method according to the present embodiment will be described.

The server for haptics 300 and a distribution data editing server 400 of the information processing system 10 receive information (such as ID) of a stamp 850 transmitted from the user terminal 700 (Step S601).

Then, the server for haptics 300 of the information processing system 10 determines whether the number of stamps 850 that is being reproduced exceeds a threshold (Step S602). The server for haptics 300 proceeds to Step S606 in a case of determining that the number exceeds the threshold (Step S602: Yes), and proceeds to Step S603 in a case of determining that the number does not exceed the threshold (Step S602: No).

The distribution data editing server 400 of the information processing system 10 distributes the received stamp 850 to another viewer 900 and the distributor 800 (Step S603). The server for haptics 300 of the information processing system 10 reads a parameter of a haptic control signal corresponding to the stamp 850 and performs an output thereof from the haptic presentation device 100 (Step S604). The distribution data editing server 400 of the information processing system 10 reads and displays a video effect corresponding to the stamp 850 (Step S605).

The server for haptics 300 of the information processing system 10 includes, in information to be distributed, information indicating that the haptic presentation device 100 cannot present a haptic stimulus (Step S606). The user terminal 700 displays an icon or text indicating that the haptic presentation device 100 cannot present the haptic stimulus (Step S607).

As described above, according to the present embodiment, it is possible to limit haptic stimuli reproduced simultaneously, and avoid a burden on the haptic stimulation unit 106 of the haptic presentation device 100.

8. Sixth Embodiment

Incidentally, in the present disclosure, for example, in a case where a distributor 800 does not wear a haptic presentation device 100, in a case where the distributor 800 does not want to receive a haptic stimulus, or in a case where battery capacity of the haptic presentation device 100 is low, vibration of a haptic stimulus may be presented by another modal such as a video instead of the haptic stimulus. Thus, a presentation method in such a case will be described as the fifth embodiment of the present disclosure with reference to FIG. 33 to FIG. 37. FIG. 33 to FIG. 37 are explanatory diagrams for describing a display example according to the present embodiment.

Figure 33:
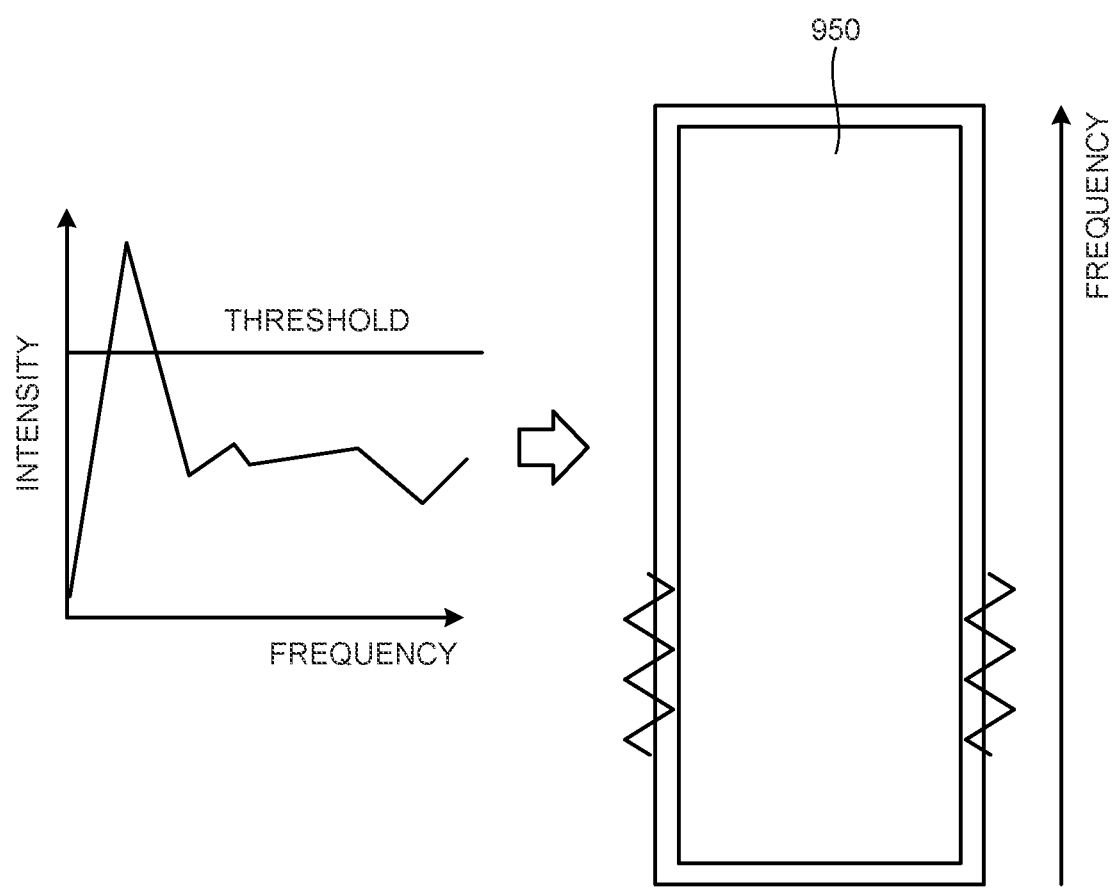
FIG. 33 is an explanatory diagram (part 1) for describing a display example according to a sixth embodiment of the present disclosure.

In the present embodiment, for example, as illustrated in FIG. 33, a video effect to cause a distributed video 950 or a part of the video 950 to reciprocate right and left according to a frequency of a haptic control signal may be used. Specifically, for example, a cycle of reciprocating the video 950 is shortened as the frequency of the haptic control signal is higher. Furthermore, in the present embodiment, a region of the video 950 to be reciprocated may be determined according to a frequency of a haptic control signal exceeding a threshold. For example, as illustrated in FIG. 33, as the frequency of the haptic control signal is lower, a video closer to a lower portion of the video 950 is reciprocated.

Figure 34:
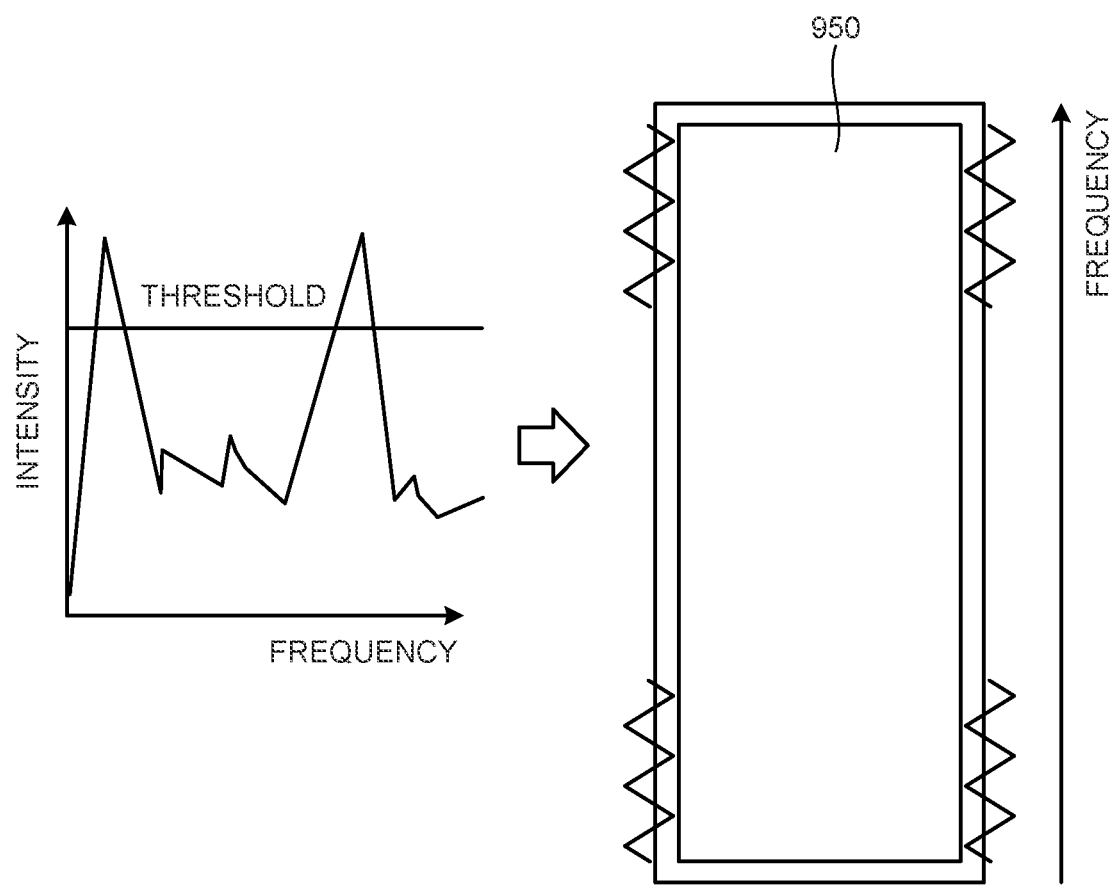
FIG. 34 is an explanatory diagram (part 2) for describing a display example according to the sixth embodiment of the present disclosure.

Furthermore, as illustrated in FIG. 34, in a case where a plurality of frequencies of the haptic control signal exceeds the threshold (for example, in a case where two frequency regions of a relatively low frequency region and a high frequency region exceed the threshold), the lower portion and an upper portion of the distributed video 950 are reciprocated.

Figure 35:
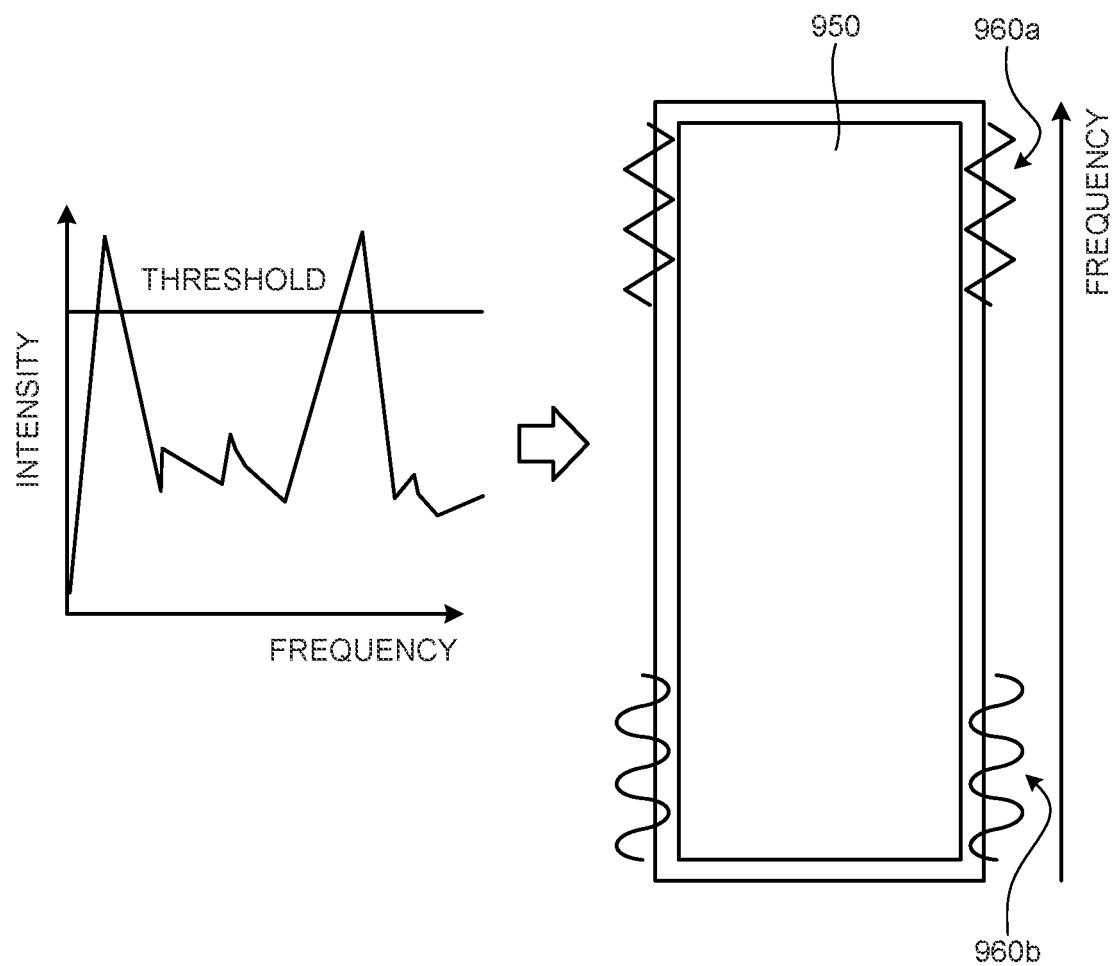
FIG. 35 is an explanatory diagram (part 3) for describing a display example according to the sixth embodiment of the present disclosure.

Furthermore, in the present embodiment, when the video 950 is reciprocated right and left, a turn thereof may be switched to be continuous or discontinuous, or a degree thereof may be switched. For example, as illustrated in FIG. 35, the turn of video deformation is made continuous (region 960*b*) in a case where a vibration frequency component is relatively low, and the turn of video deformation is made discontinuous (region 960*a*) in a case where the vibration frequency component is relatively high. In such a manner, in the video 950, a video effect having a softer impression is applied at a lower frequency. Note that, in the present embodiment, not only the frequency of when the video 950 is reciprocated right and left but also an interval, a waveform, or the like may change according to the frequency of the haptic control signal.

Figure 36:
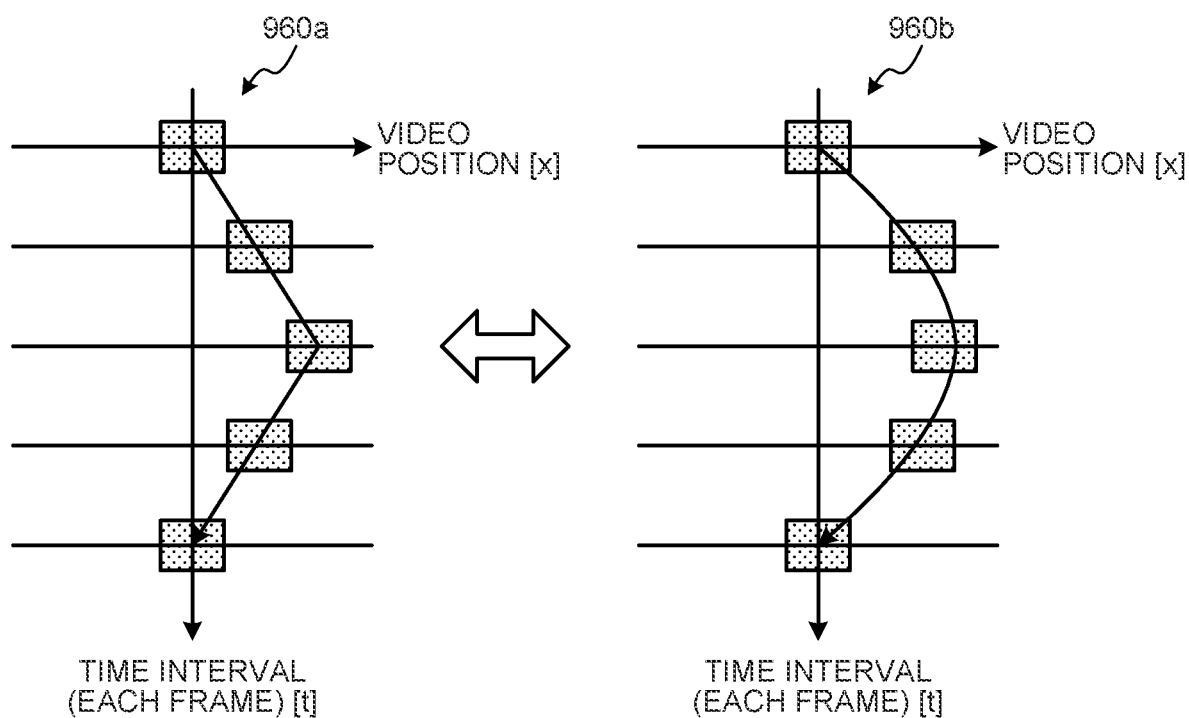
FIG. 36 is an explanatory diagram (part 4) for describing a display example according to the sixth embodiment of the present disclosure.
Figure 37:
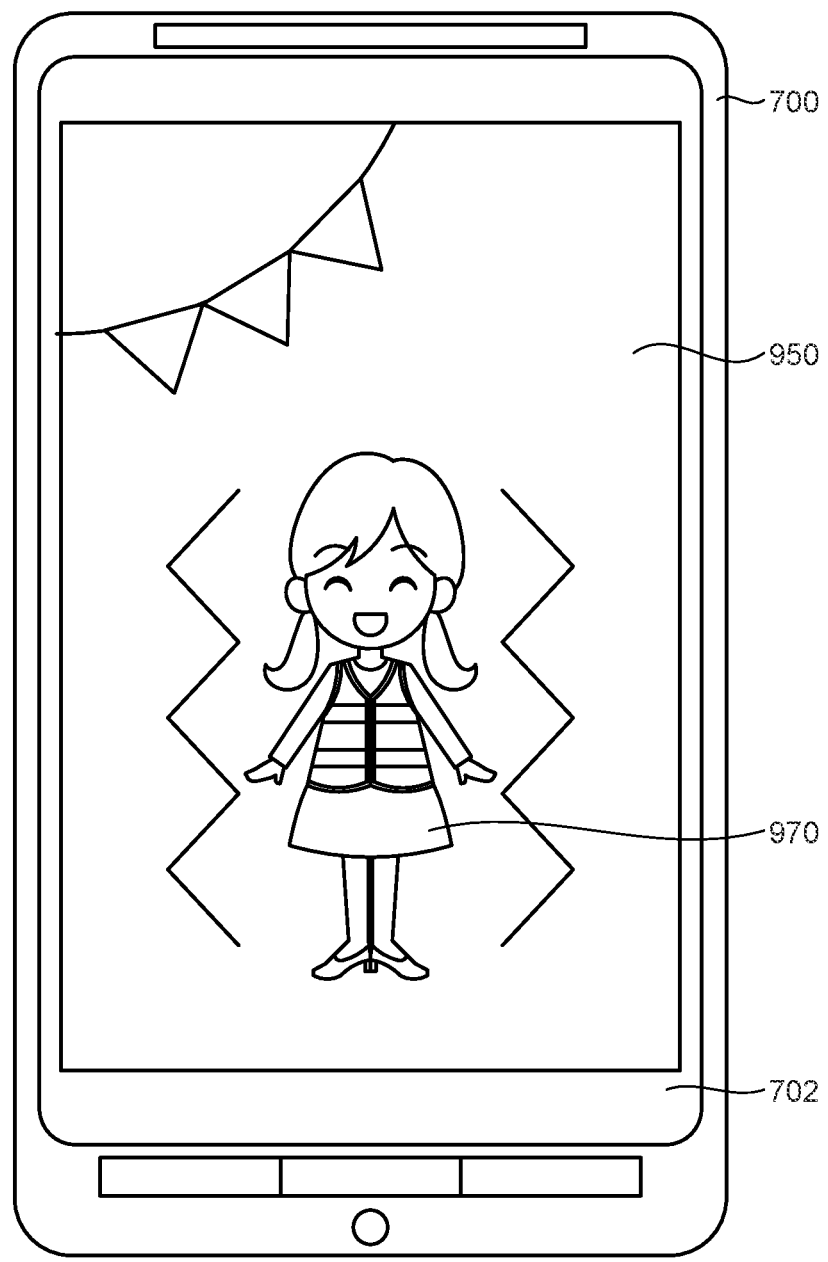
FIG. 37 is an explanatory diagram (part 5) for describing a display example according to the sixth embodiment of the present disclosure.

More specifically, the example of FIG. 35 will be described with reference to FIG. 36 that is a view illustrating a position of the video for each unit time at the turn of the video deformation. As illustrated in FIG. 36, in the example of FIG. 35, a video position changes in proportion to the elapse of the unit time, and the video position starts to change in the opposite direction when the video position reaches an end.

In a case where the frequency is relatively high which case is illustrated on a left side of FIG. 36 (region 960*a*), the video position is determined according to the following expression (1) and expression (2). First, the video position is determined according to elapsed time t and the expression (1), and a video position x is determined according to the elapsed time t and the expression (2) when the end is reached. Note that a in the expressions (1) and (2) is an arbitrary coefficient.

$$x = \alpha \times t \quad \text{expression (1)}$$

$$x = -\alpha \times t \quad \text{expression (2)}$$

In a case where the frequency is relatively low which case is illustrated on a right side of FIG. 36 (region 960*b*), the video position x is determined according to the elapsed time t and an expression (3). Note that α and β in the expression (3) are arbitrary coefficients.

$$x = \alpha \times \sin(\beta \times t) \quad \text{expression (3)}$$

Note that in the present embodiment, the determination of the video position at the turn of the video deformation can be performed on the basis of the frequency component and intensity of the haptic control signal, a type of video content, a type of the video effect, and metadata associated with the video content or the video effect.

Furthermore, in the present embodiment, not only the reciprocation of the entire video 950 to the right and left but also reciprocation of only a predetermined region 970 in the video 950 to the right and left may be performed. For example, in FIG. 37, the region 970 in which the distributor 800 is displayed may be reciprocated right and left. Alternatively, in the present embodiment, only an image of a stamp 850 superimposed on an image of the distributor 800 may be reciprocated right and left.

Furthermore, in the present embodiment, in a case where there is metadata associated with the video content, a type of the video deformation may be determined on the basis of the metadata. For example, in a case where metadata such as "falling" is assigned to the stamp 850 having a video effect that an object falls from above, the video 950 may be reciprocated up and down instead of right and left.

Figure 38:
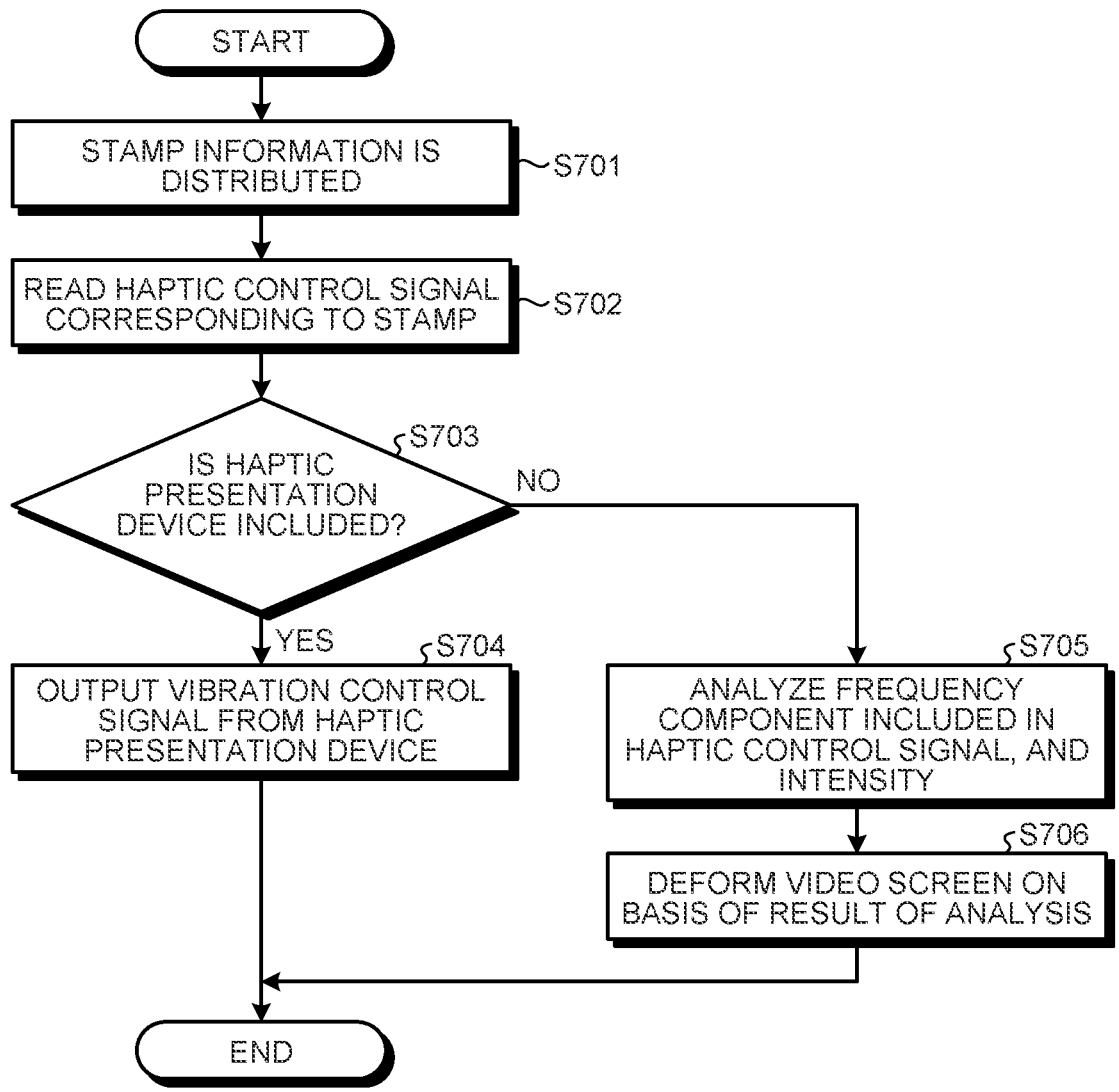
FIG. 38 is a flowchart of an example of an information processing method according to the sixth embodiment of the present disclosure.

Next, an example of an information processing method according to the present embodiment will be described with reference to FIG. 38. FIG. 38 is a flowchart of an example of the information processing method according to the present embodiment. As illustrated in FIG. 38, the example of the information processing method according to the present embodiment includes a plurality of steps from Step S701 to Step S706. Hereinafter, details of each step included in the example of the information processing method according to the present embodiment will be described.

The user terminal 700 of the information processing system 10 transmits the information of the stamp 850 to the server for haptics 300 (Step S701). The server for haptics 300 reads a haptic control signal corresponding to the stamp 850 (Step S702).

Then, the server for haptics 300 of the information processing system 10 determines whether the distributor 800 or the viewer 900 has the haptic presentation device 100 (Step S703). The server for haptics 300 proceeds to Step S704 in a case of determining that the haptic presentation device 100 is included (Step S703: Yes), and proceeds to Step S705 in a case of determining that the haptic presentation device 100 is not included (Step S703: No).

The server for haptics 300 of the information processing system 10 outputs the haptic control signal corresponding to the stamp 850 from the haptic presentation device 100 (Step S704).

The server for haptics 300 of the information processing system 10 analyzes the frequency component included in the haptic control signal, and the intensity (Step S705). The distribution data editing server 400 of the information processing system 10 deforms the video 950 on the basis of a result of the analysis in Step S705 (Step S706).

Furthermore, in the present embodiment, in addition to shaking of the video 950 to the right and left, processing of shaking a sound image up and down may be performed on voice data to be distributed to the viewer 900 or the distributor 800 by a sound image localization technology.

Furthermore, in the present embodiment, in a case where the distributor 800 does not wear the haptic presentation device 100, wind (such as hot air, cold air, or the like) may be output by a blower-type device, or a temperature of a temperature presentation device (equipped with a Peltier element or the like) worn on a body may be changed. In addition, in the present embodiment, a fragrance may be presented by a discharger that discharges the fragrance.

As described above, for example, even in a case where the distributor 800 does not wear the haptic presentation device 100, the vibration of the haptic stimulus can be presented by another modal in the present embodiment. Thus, according to the present embodiment, the viewer 900 can acquire a real-time and interactive experience with a high added value.

9. Seventh Embodiment

Figure 39:
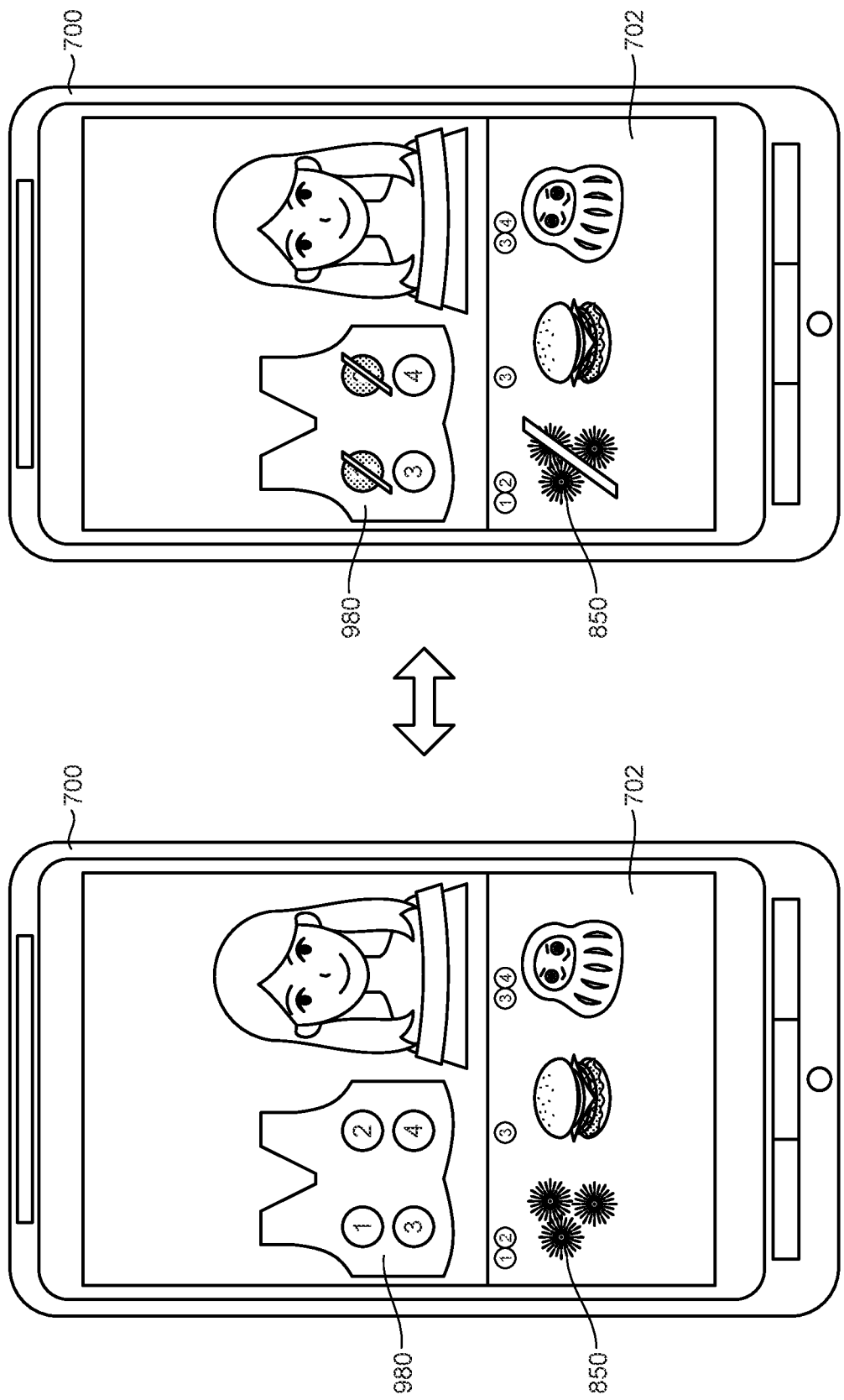
FIG. 39 is an explanatory diagram (part 1) for describing a display example according to a seventh embodiment of the present disclosure.
Figure 40:
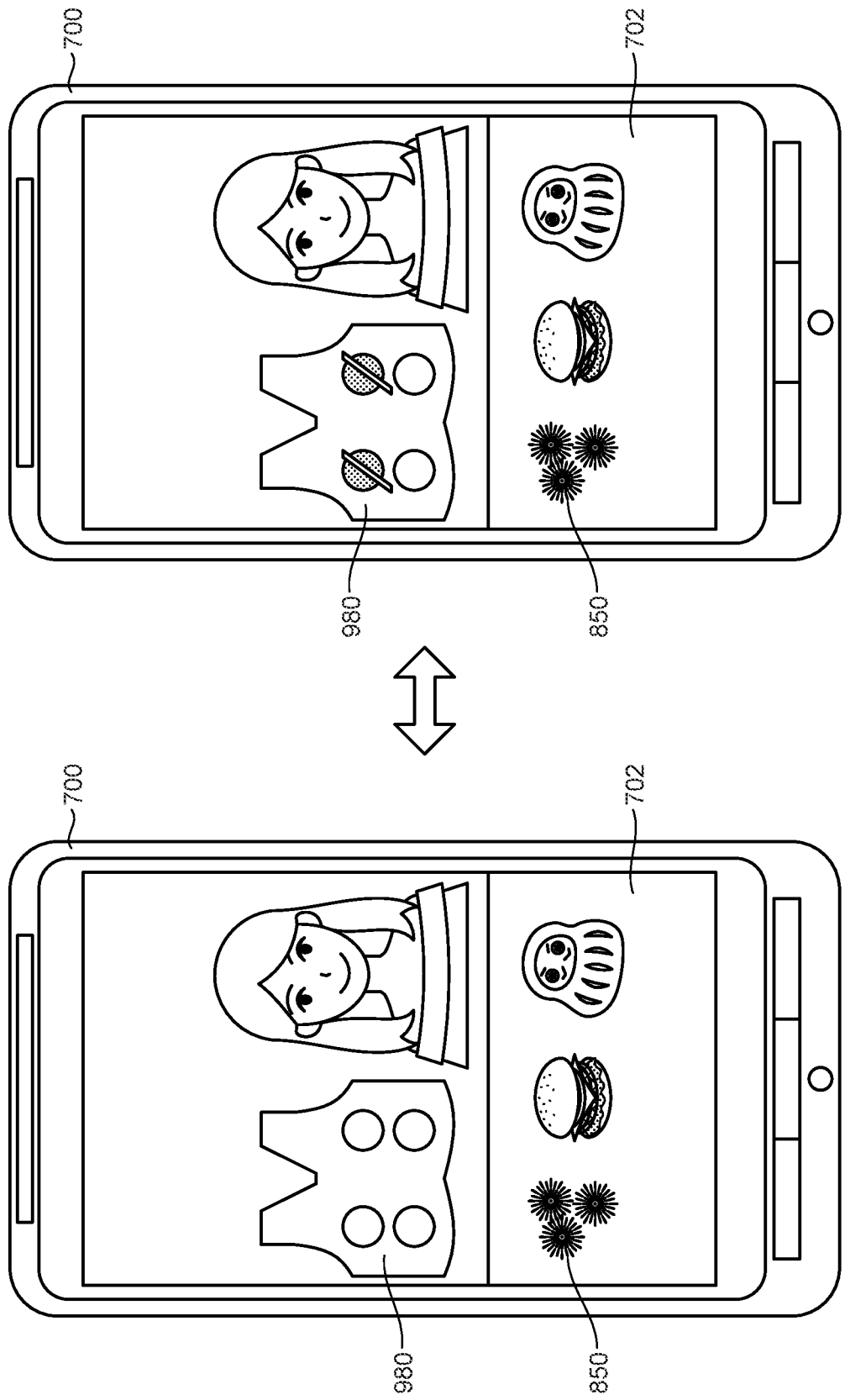
FIG. 40 is an explanatory diagram (part 2) for describing a display example according to the seventh embodiment of the present disclosure.
Figure 41:
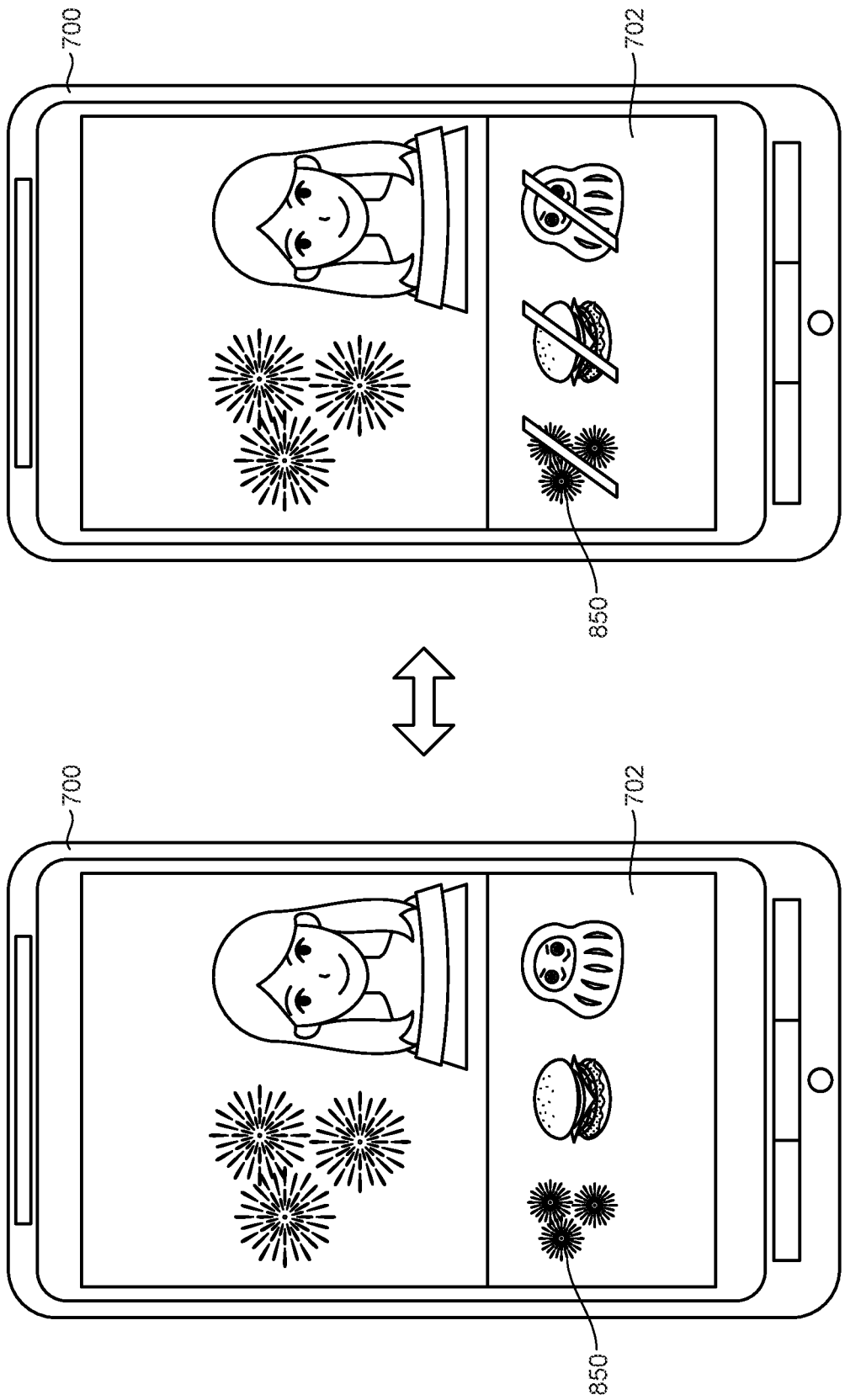
FIG. 41 is an explanatory diagram (part 3) for describing a display example according to the seventh embodiment of the present disclosure.

Next, the seventh embodiment of the present disclosure will be described with reference to FIG. 39 to FIG. 41. FIG. 39 to FIG. 41 are explanatory diagrams for describing a display example according to the present embodiment.

In the present embodiment, for example, in a case where a haptic presentation device 100 worn by a distributor 800 includes a plurality of haptic stimulation units 106, each of the haptic stimulation units 106 may be exclusively used by a viewer 900. That is, a viewer 900 other than the viewer 900 performing the exclusive use cannot present a haptic stimulus by using the corresponding haptic stimulation unit 106. For example, in order to occupy the haptic stimulation unit 106, the viewer 900 is assumed to be able to pay a predetermined amount of money, collectively purchase, or subscribe. Furthermore, in the present embodiment, presentation by a haptic stimulation unit 106 located around a haptic stimulation unit 106 designated by a stamp 850 with a high price may be stopped. Furthermore, in a case where viewers 900 are divided into a several groups (divided by regions or divided by ranks, for example), the haptic stimulation unit 106 may be assigned to each group.

For example, in FIG. 39, a left side is a display example of a user terminal 700 of a viewer 900 who occupies a part of haptic stimulation units 106, and a right side is a display example of a user terminal 700 of a viewer 900 who does not occupy a part of the haptic stimulation unit 106. In this case, the user terminal 700 of the viewer 900 who does not occupy the part of the haptic stimulation units 106 displays that a stamp 850 corresponding to the occupied haptic stimulation unit 106 cannot be selected.

Furthermore, for example, in FIG. 40, a left side is a display example of the user terminal 700 of the viewer 900 who occupies the part of the haptic stimulation units 106, and a right side is a display example of the user terminal 700 of the viewer 900 who does not occupy the part of the haptic stimulation unit 106. In this case, the user terminal 700 of the viewer 900 who does not occupy the part of the haptic stimulation units 106 displays that the occupied haptic stimulation unit 106 cannot be selected.

Furthermore, for example, in FIG. 41, a left side is a display example of the user terminal 700 of the viewer 900 who occupies all of the haptic stimulation units 106, and a right side is a display example of the user terminal 700 of the viewer 900 who does not occupy all of the haptic stimulation units 106. In this case, the user terminal 700 of the viewer 900 who does not occupy all of the haptic stimulation units 106 displays that the stamp 850 cannot be selected since all of the haptic stimulation units 106 are occupied. Alternatively, in the display example of FIG. 41, a left side may be a display example of a user terminal 700 of a viewer 900 who pays a high amount of money or is in a high rank (such as a premium course, a gold rank, or the like), and a right side may be a display example of a user terminal 700 of another viewer 900 when the viewer 900 inputs a haptic control signal. In this case, after presentation of a haptic stimulus related to the haptic control signal input by the viewer 900 who, for example, pays the high amount of money ends, the other viewer 900 can input the haptic control signal. Alternatively, in the present embodiment, in a case where the viewer 900 who pays the high amount of money or is in the high rank inputs the haptic control signal immediately after a viewer 900 who pays a low amount of money or is in a low rank (such as a basic course, a bronze rank, or the like) inputs the haptic control signal, presentation of the haptic control signal input by the viewer 900 who pays the low amount of money or is in the low rank may be canceled immediately.

Furthermore, in the present embodiment, the haptic stimulation unit 106 capable of presenting the haptic stimulus may be switched according to a category of content being distributed. For example, in a case of a makeup distribution or gaming commentary distribution, the haptic stimulation unit 106 corresponding to a hand or arm used for the makeup or the game is set not to present the haptic stimulus. Furthermore, in a case of distribution related to a flea market (or livestream shopping), since a vest-type haptic presentation device 100 is removed in order to try on clothes, the haptic stimulation unit 106 corresponding to a torso is set not to present the haptic stimulus. In this case, in a case where the haptic presentation device 100 is worn, the stacked haptic stimuli may be presented in series.

Furthermore, in the present embodiment, in a case where types of the haptic presentation devices 100 worn by the distributor 800 and the viewer 900 are different (reproducible frequency bands are different or the numbers of mounted actuators are different, for example) in a battle-type distribution or the like, the haptic stimulus may be presented by utilization of only the haptic stimulation units 106 of common parts (having common reproducible frequency regions, minimum value of vibration intensity that can be outputted, and common actuator parts).

Specifically, in order to adjust a haptic control signal optimized for one having a larger number of mounted haptic stimulation units 106 to a haptic control signal for one having a smaller number of mounted haptic stimulation units 106, a control signal applied to each haptic stimulation unit 106 may be merged and output from a specific haptic stimulation unit 106. Specifically, haptic stimuli scheduled to be presented on a shoulder and an arm are merged and output from one haptic stimulation unit 106 mounted on a wrist. Furthermore, when the haptic stimuli are merged, priority may be set in advance for each body part or each haptic stimulation unit 106 in order to determine a mixing ratio. Specifically, for example, in a case where the priority of the shoulder is set to 4 and the priority of the arm is set to 1 (it is assumed that a larger number indicates higher priority), intensity of the haptic control signal output from the haptic stimulation unit 106 corresponding to the wrist is intensity of the haptic control signal applied to the shoulder× 0.8+intensity of the haptic control signal applied to the arm×0.2.

Furthermore, in the present embodiment, a meaning (such as a positive system/negative system) may be set in advance for each of the haptic stimulation units 106, and a haptic stimulation unit 106 having a meaning corresponding to metadata may be determined as a haptic stimulation unit 106 that presents the haptic stimulus by collation with the metadata associated with a stamp 850.

Figure 42:
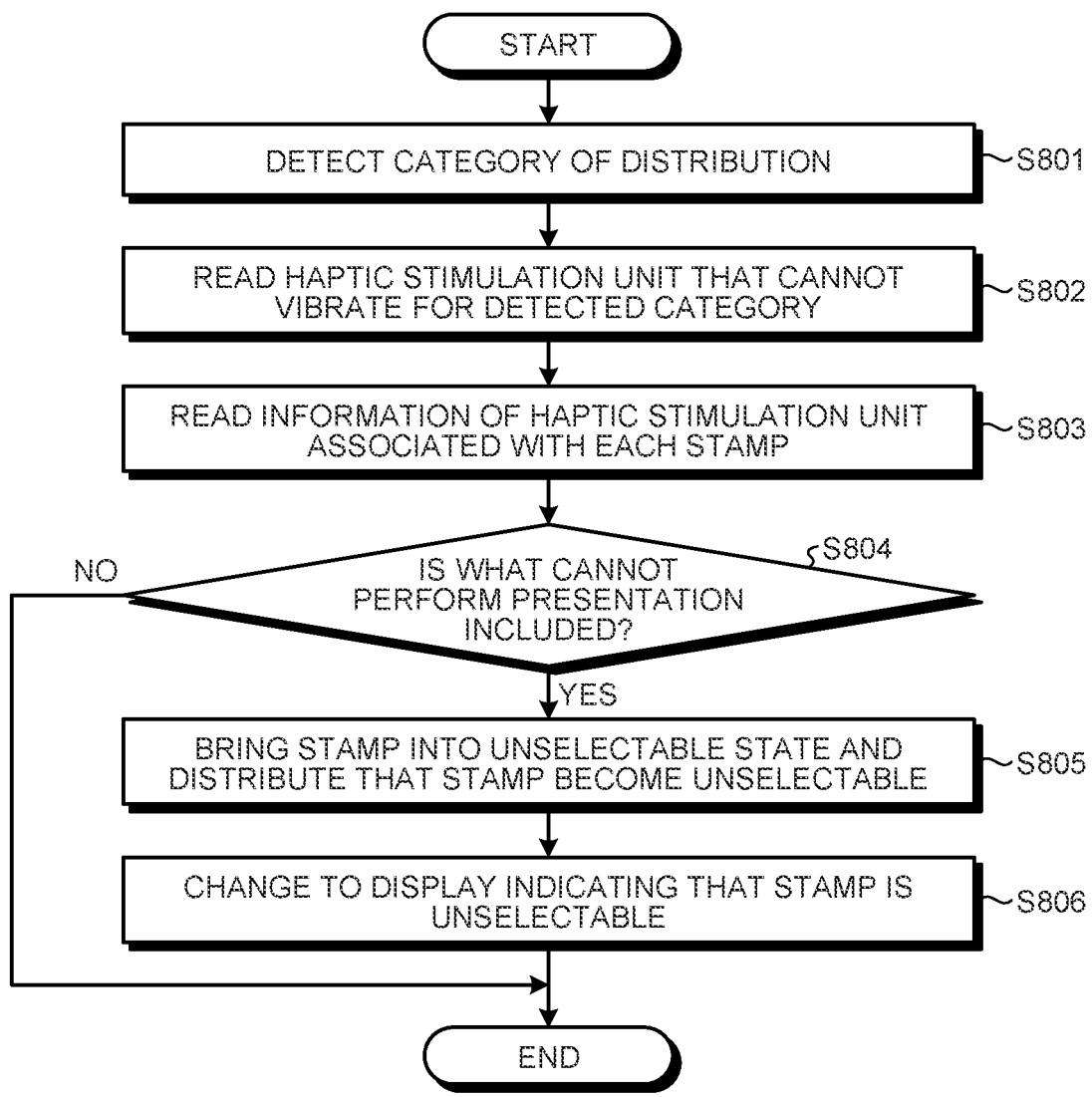
FIG. 42 is a flowchart of an example of an information processing method according to the seventh embodiment of the present disclosure.

Next, an information processing method according to the present embodiment will be described with reference to FIG. 42. FIG. 42 is a flowchart of an example of the information processing method according to the present embodiment. As illustrated in FIG. 42, an example of the information processing method according to the present embodiment includes a plurality of steps from Step S801 to Step S806. Hereinafter, details of each step included in the example of the information processing method according to the present embodiment will be described.

A server for haptics 300 of an information processing system 10 detects a category of distribution (Step S801). The server for haptics 300 reads information of a haptic stimulation unit 106 that cannot perform haptic presentation for the detected category (Step S802). Then, the server for haptics 300 reads information of a haptic stimulation unit 106 associated with a stamp 850 (Step S803).

Then, the server for haptics 300 of the information processing system 10 determines whether the haptic stimulation unit 106 that cannot present the haptic stimulus is included (Step S804). The server for haptics 300 proceeds to Step S805 in a case of determining that the haptic stimulation unit 106 that cannot present the haptic stimulus is included (Step S804: Yes), and ends the processing in a case of determining that the haptic stimulation unit 106 that cannot present the haptic stimulus is not included (Step S804: No).

The server for haptics 300 of the information processing system 10 brings the stamp 850 into an unselectable state, and distributes that the stamp becomes unselectable (Step S805). The user terminal 700 of the information processing system 10 performs a change to a display indicating that the stamp 850 cannot be selected (Step S806).

As described above, in the embodiment of the present disclosure, the viewer 900 can occupy the haptic stimulation unit 106, the haptic stimulation unit 106 that presents the haptic stimulus can be changed according to content of distribution, or the haptic stimulus can be changed according to a type of the haptic presentation device 100. In such a manner, according to the present embodiment, the viewer 900 can acquire a real-time interactive experience with a high added value.

10. Eighth Embodiment

In the eighth embodiment of the present disclosure, by simultaneous input of stamps 850 by viewers 900 at the same timing or rhythm, a switch to a haptic stimulus different from those associated with the stamps 850 may be performed and presentation thereof may be performed.

Furthermore, in the present embodiment, it may be made possible to set a time range (such as from when to when, or for how many minutes) in which the stamps 850 can be selected, and the number of stamps that can be sent within the time. In the present embodiment, for example, the number of minutes in which each viewer 900 can input the stamp 850 may be determined by bidding.

11. Ninth Embodiment

Furthermore, in the present embodiment, in a case of a distribution in which the number of viewers 900 is relatively small or a distribution in which the number of transmitted stamps 850 is not active (the number of transmission stamps 850 per unit time is smaller than a threshold), a chat text or the like may be used as a trigger and a haptic stimulus corresponding to the chat text may be presented to a distributor 800. In such a manner, it is possible to increase motivation of the distributor 800 for distribution. For example, when a comment including a keyword or a pictograph set in advance by the distributor 800 is posted by a viewer 900, the comment may be detected and the haptic stimulus may be presented. Furthermore, a type of a video effect may be switched or intensity of the presented haptic stimulus may be increased according to the number of matched keywords or the number of matched pictographs in the comment. In this case, the keyword may be set before the distribution is started or may be appropriately set during the distribution (for example, a correct keyword is set each time in a scene in which a quiz is asked).

Furthermore, in the present embodiment, the haptic stimulus may be presented with entrance of a new viewer 900 into a distribution room of the distributor 800 as a trigger. Furthermore, in the present embodiment, the haptic stimulus may be presented by utilization, as a trigger, of a timing at which a plurality of viewers 900 simultaneously (within a certain time) posts the same comment, posts comments including the same pictograph, or posts the same stamps 850 (however, not corresponding to the haptic stimulus).

12. Conclusion

As described above, according to each embodiment of the present disclosure, the viewer 900 can acquire a real-time and interactive experience with high added value.

Note that the embodiment of the present disclosure can be applied not only to the above-described live distribution or the like but also to, for example, a stamp 850 or the like exchanged on a social networking service (SNS). In that case, for example, the user terminal 700 vibrates instead of the haptic presentation device 100, whereby the haptic stimulus can be given to the one to whom the stamp 850 is sent.

13. First Modification Example of an Information Processing System 10 of the Present Disclosure Furthermore, a modification example of an information processing system 10 according to an embodiment of the present disclosure will be described with reference to FIG. 43 to FIG. 50. FIG. 43 to FIG. 50 are system diagrams illustrating a schematic configuration example of the information processing system 10 according to the first modification example of the embodiment of the present disclosure.

Figure 43:
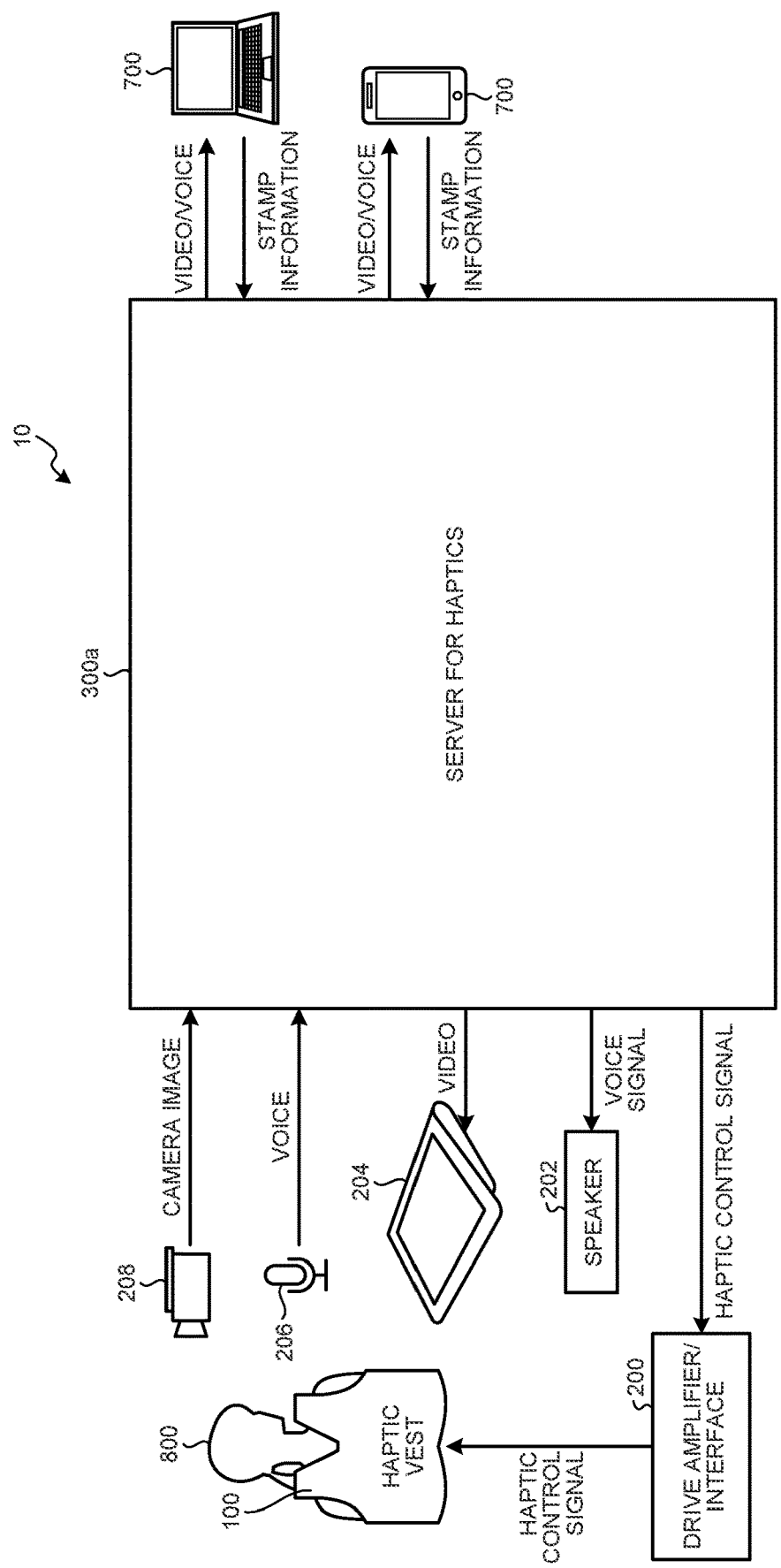
FIG. 43 is a system diagram (part 1) illustrating a schematic configuration example of an information processing system 10 according to a first modification example of an embodiment of the present disclosure.

First, in the information processing system 10 illustrated in FIG. 43, a server for haptics 300a also has functions of the distribution data editing server 400 and the live distribution server 500 described above. In this case, management of the server for haptics 300a can be performed by one business operator.

Figure 44:
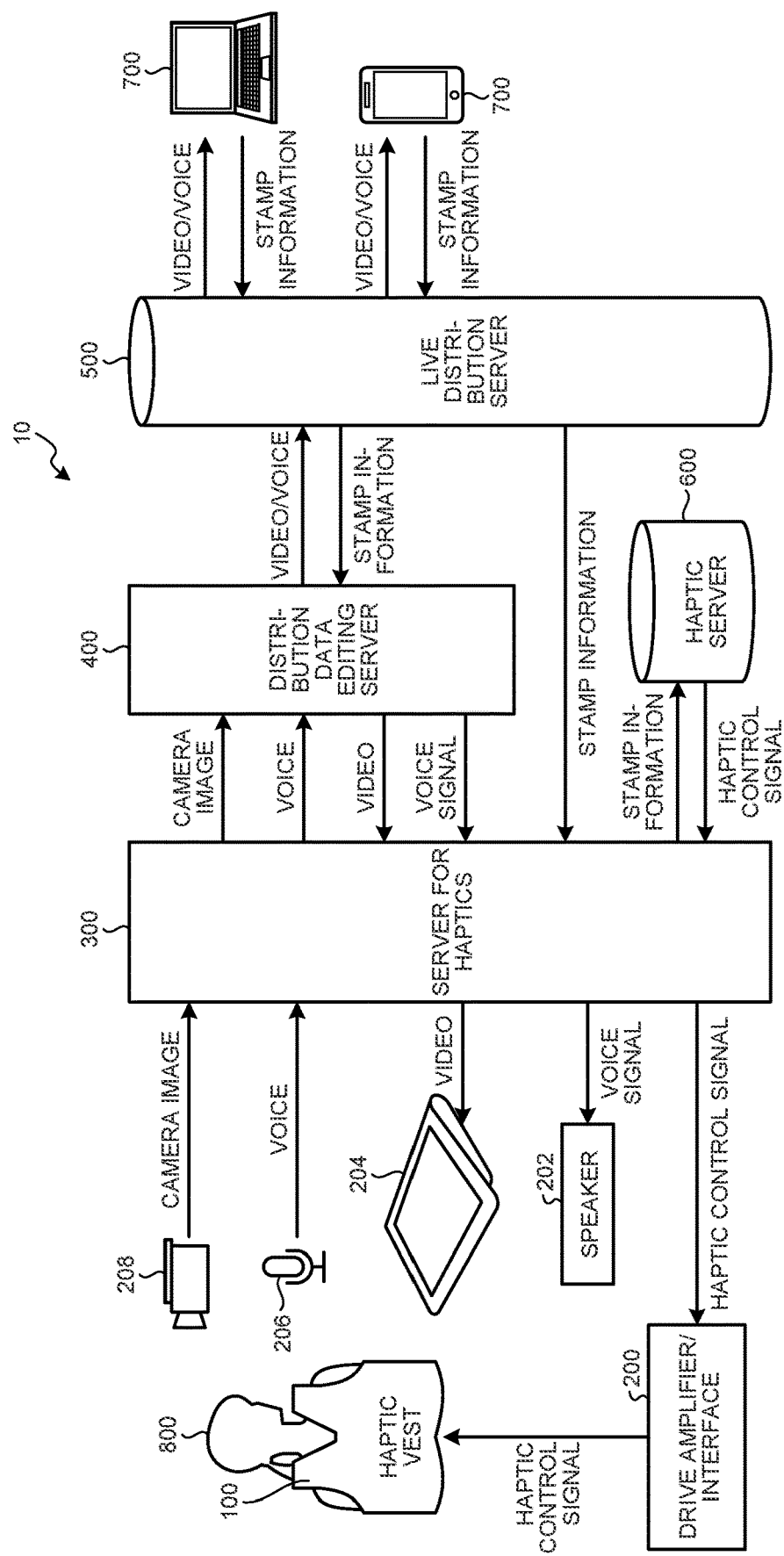
FIG. 44 is a system diagram (part 2) illustrating a schematic configuration example of an information processing system 10 according to the first modification example of the embodiment of the present disclosure.

Furthermore, in an information processing system 10 illustrated in FIG. 44, a haptic server 600 may be included as what performs a part of functions of a storage unit 318 of a server for haptics 300. In this case, the haptic server 600 stores a previously generated haptic data library (such as a vibration waveform pattern) in association with identification information (ID) of each stamp 850. The haptic server 600 may store, for example, information such as the number of haptic stimulation units 106, positions thereof, a frequency characteristic, a maximum input voltage, and the like of the haptic presentation device 100 as profile information of the haptic presentation device 100.

Figure 45:
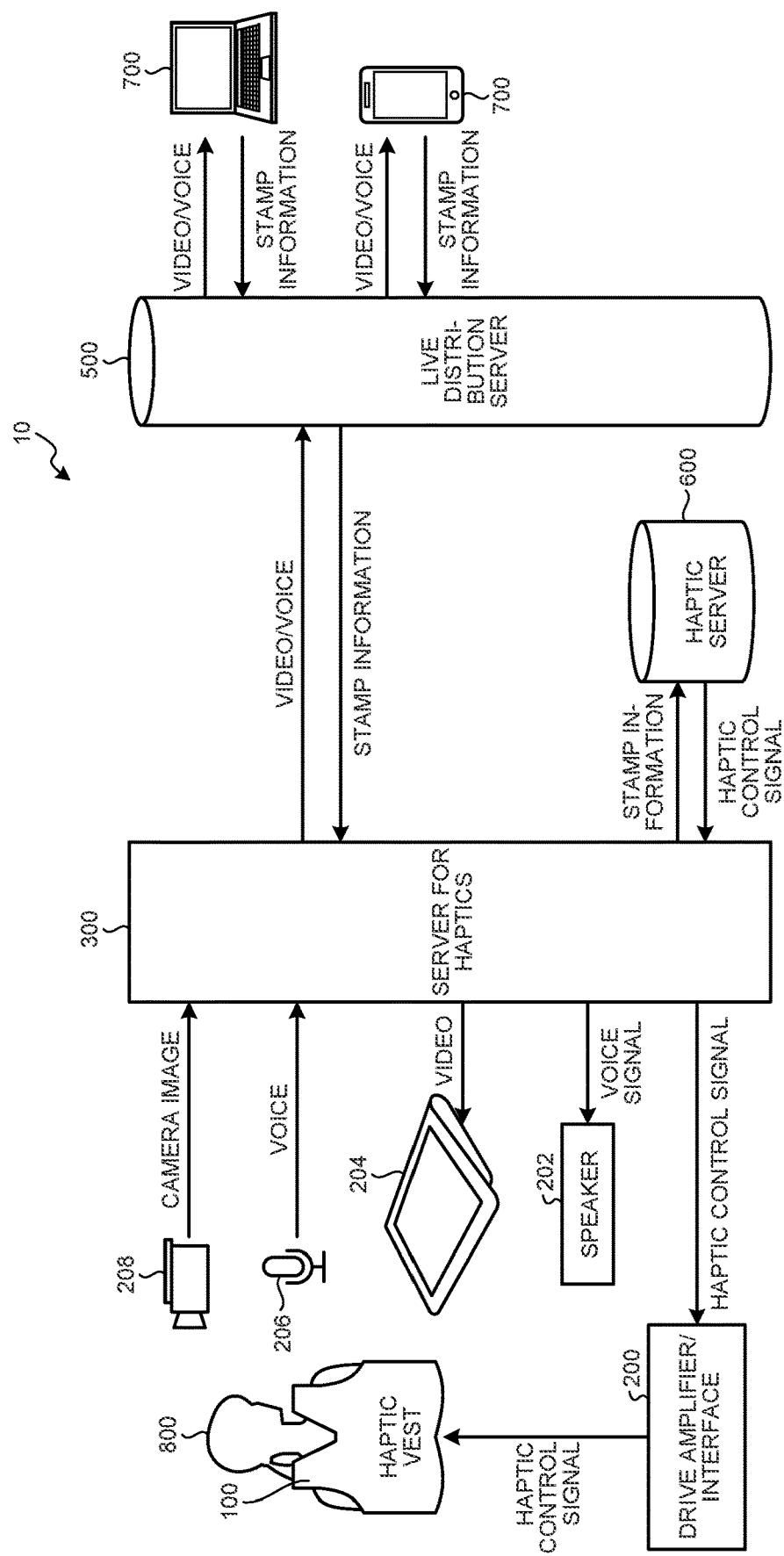
FIG. 45 is a system diagram (part 3) illustrating a schematic configuration example of an information processing system 10 according to the first modification example of the embodiment of the present disclosure.

In addition, in an information processing system 10 illustrated in FIG. 45, a server for haptics 300 also has a function of the distribution data editing server 400 described above. In this case, a business operator that manages presentation of a haptic stimulus and a business operator that manages distribution can be different business operators.

Figure 46:
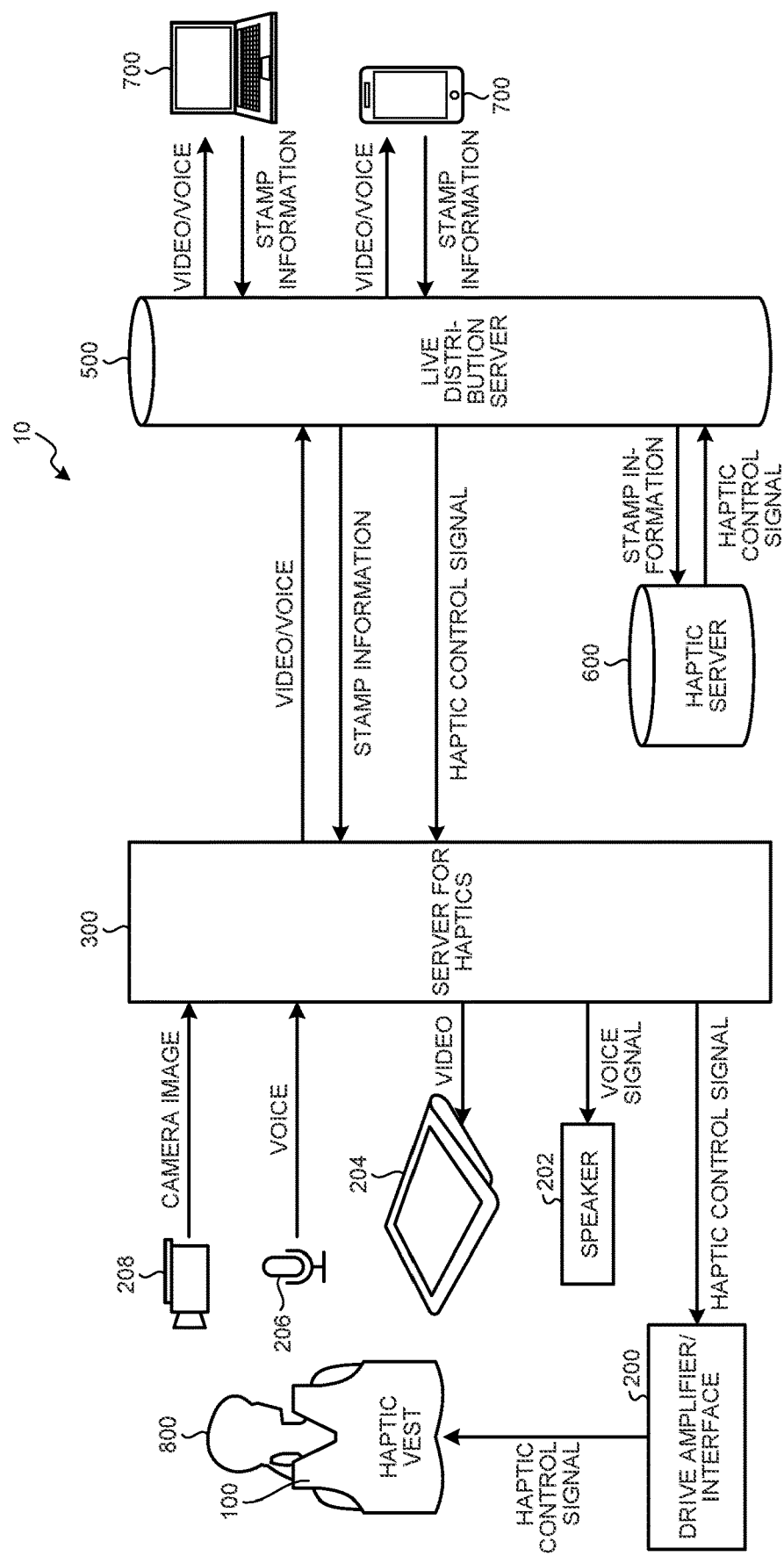
FIG. 46 is a system diagram (part 4) illustrating a schematic configuration example of an information processing system 10 according to the first modification example of the embodiment of the present disclosure.

Furthermore, unlike the example of FIG. 45, in an information processing system 10 illustrated in FIG. 46, information stored in a haptic server 600 is provided to a server for haptics 300 via a live distribution server 500.

Figure 47:
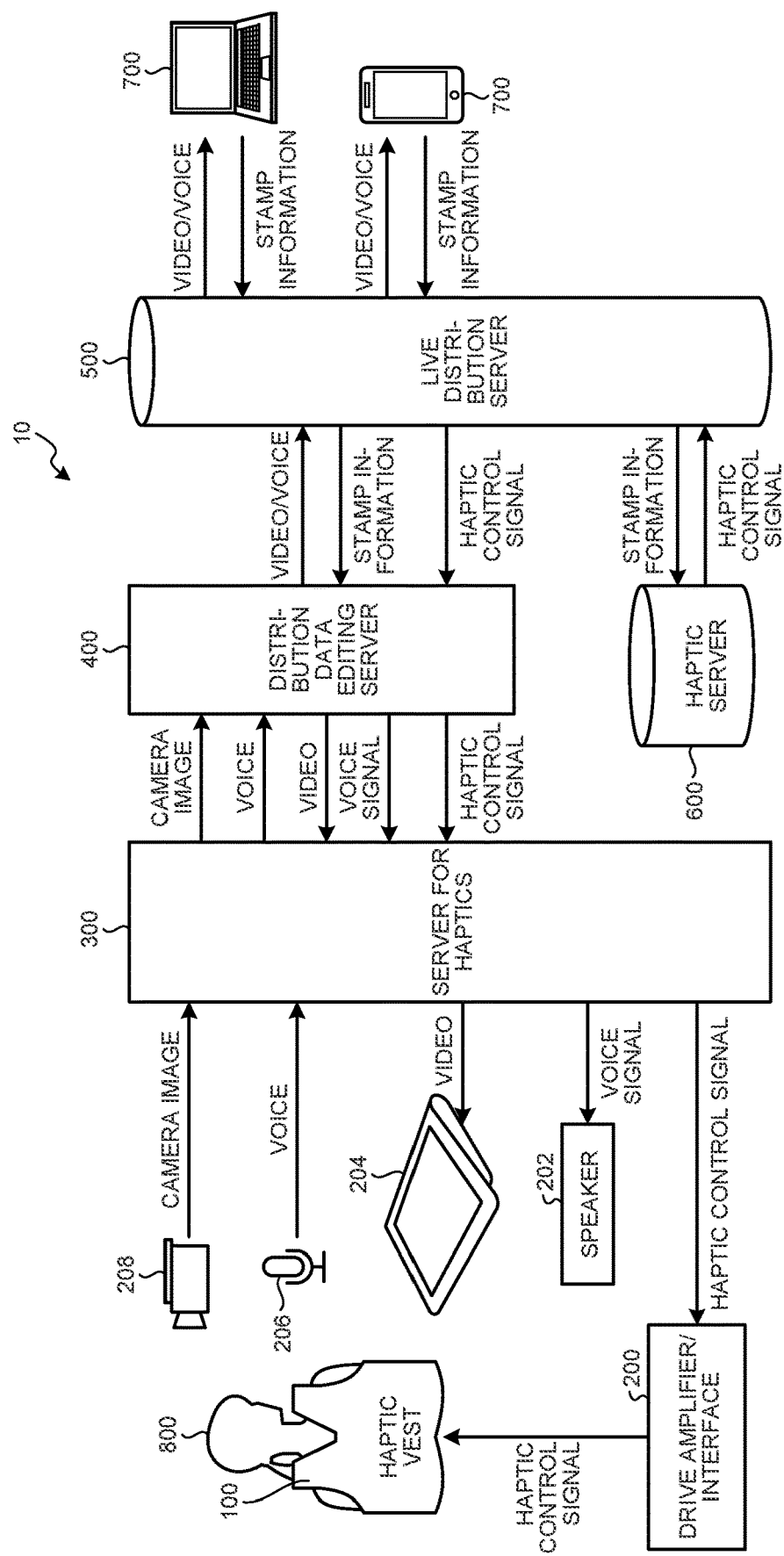
FIG. 47 is a system diagram (part 5) illustrating a schematic configuration example of an information processing system 10 according to the first modification example of the embodiment of the present disclosure.

Furthermore, in an information processing system 10 illustrated in FIG. 47, unlike the example of FIG. 45, information stored in a haptic server 600 is provided to a server for haptics 300 via a live distribution server 500 and a distribution data editing server 400.

Figure 48:
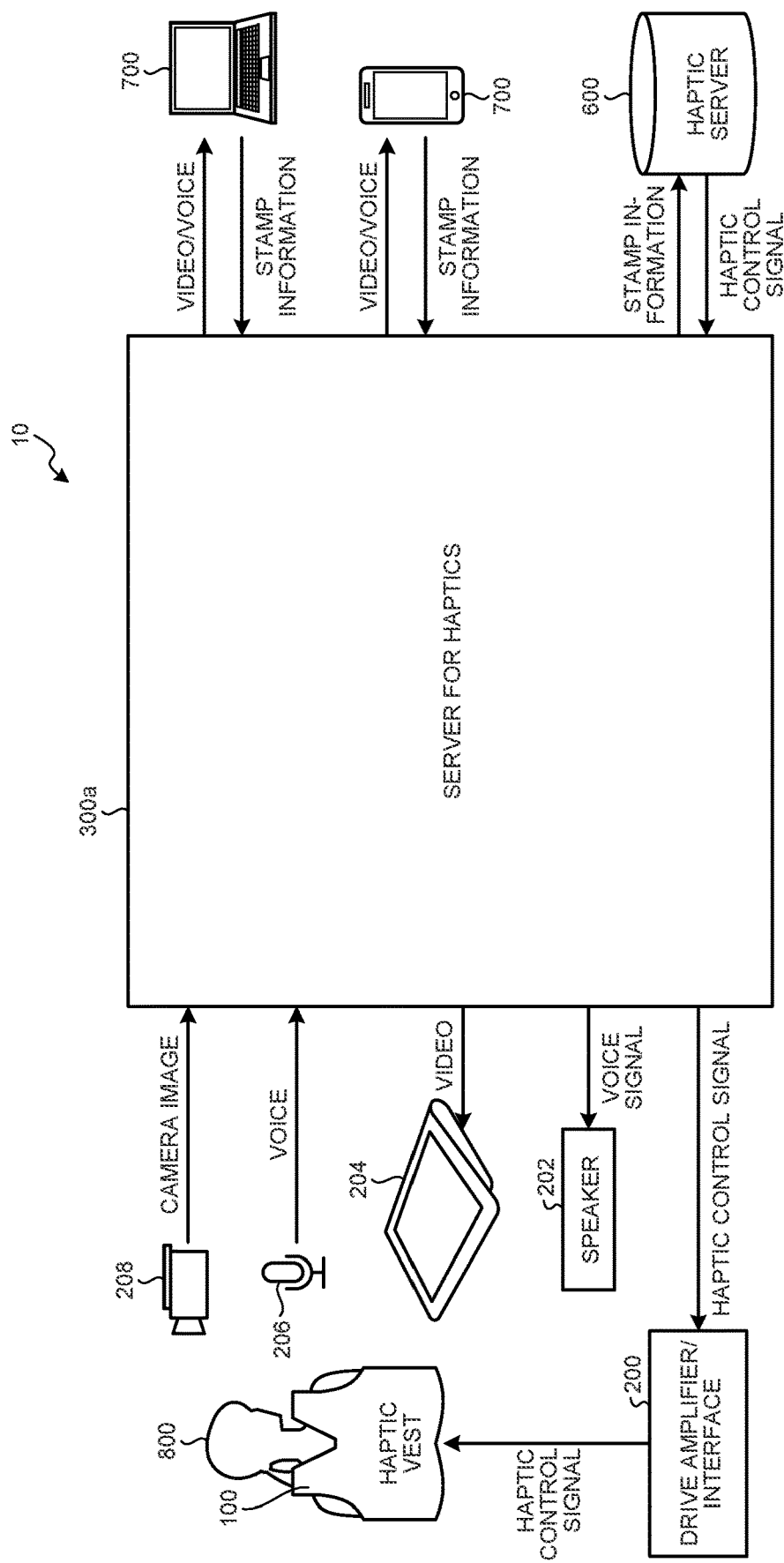
FIG. 48 is a system diagram (part 6) illustrating a schematic configuration example of an information processing system 10 according to the first modification example of the embodiment of the present disclosure.

Furthermore, unlike the example illustrated in FIG. 43, in an information processing system 10 illustrated in FIG. 48, a haptic server 600 may be included as what has a part of a function of a storage unit 318 of a server for haptics 300.

Figure 49:
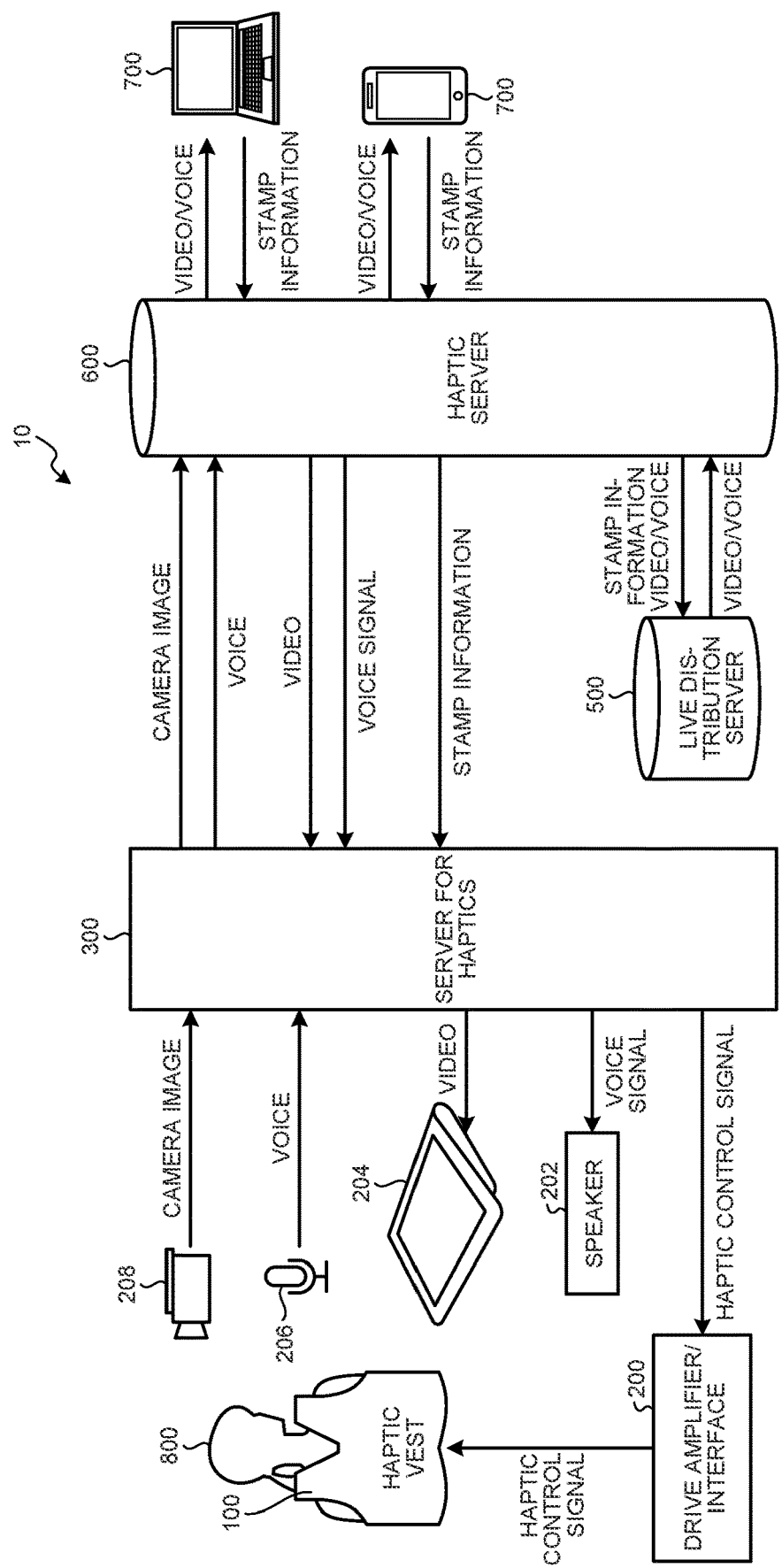
FIG. 49 is a system diagram (part 7) illustrating a schematic configuration example of an information processing system 10 according to the first modification example of the embodiment of the present disclosure.

Furthermore, in the information processing system 10 illustrated in FIG. 49, a haptic server 600 may perform distribution to a user terminal 700 in cooperation with a live distribution server 500.

Figure 50:
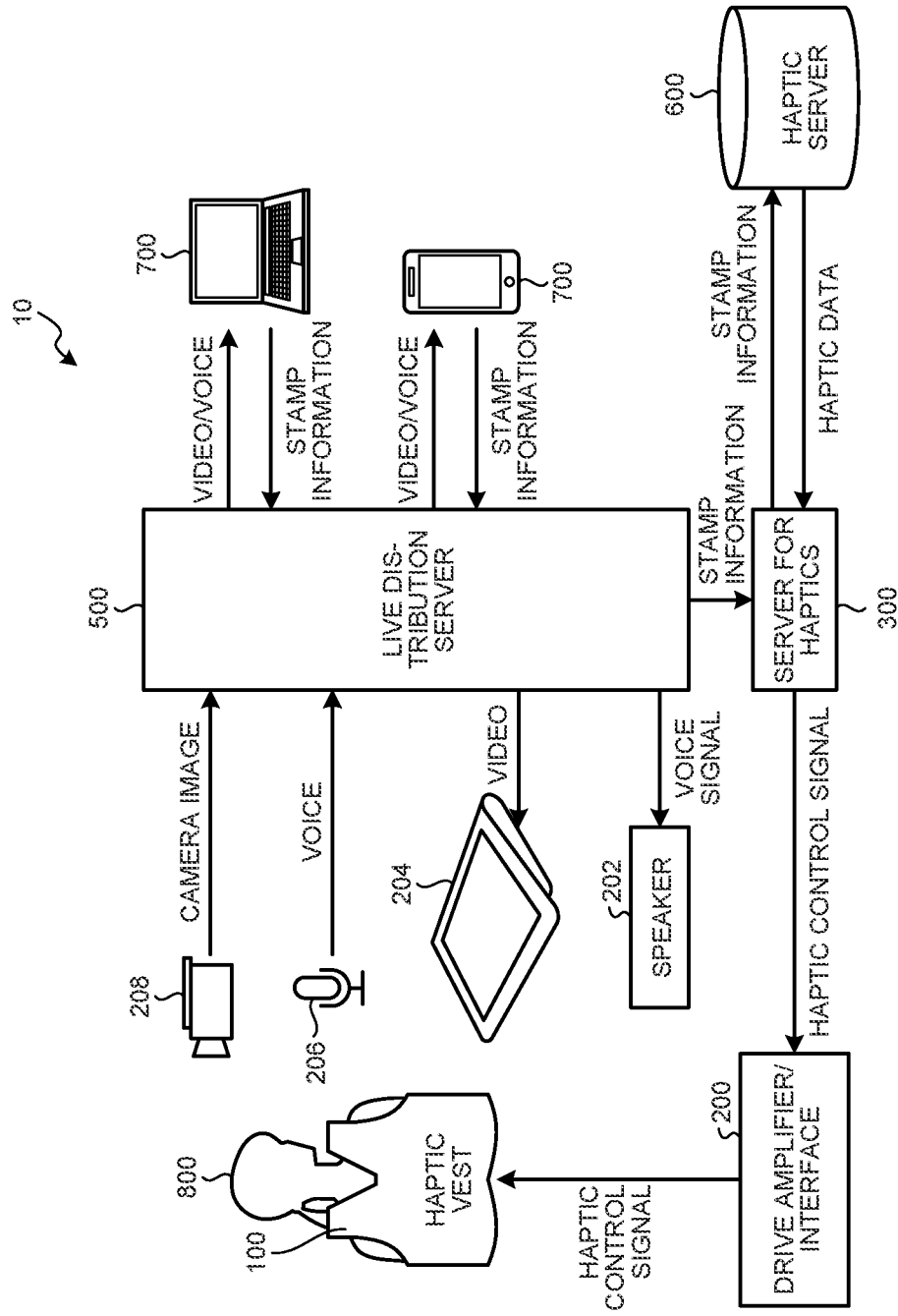
FIG. 50 is a system diagram (part 8) illustrating a schematic configuration example of an information processing system 10 according to the first modification example of the embodiment of the present disclosure.

Furthermore, in an information processing system 10 illustrated in FIG. 50, a live distribution server 500 acquires information of a stamp 850 from a user terminal 700 and distributes a video or the like. Furthermore, a server for haptics 300 acquires identification information (ID) of each stamp 850 from the live distribution server 500. Furthermore, the server for haptics 300 generates a haptic control signal associated with each stamp 850 on the basis of information in a haptic server 600 with reference to the identification information. Note that in FIG. 50, haptic data is identification information of a haptic control signal (waveform data) corresponding to the stamp 850 or the haptic control signal itself.

14. Second Modification Example of an Information Processing System 10 of the Present Disclosure An information processing system 10 according to an embodiment of the present disclosure may be applied to a system including a plurality of devices on the premise of connection to a network (or communication between devices), such as cloud computing (cloud), for example. Thus, variations of a position (cloud side or local side) on the network of each server in the information processing system 10 according to the present embodiment will be described with reference to FIG. 51 to FIG. 54. FIG. 51 to FIG. 54 are system diagrams illustrating a schematic configuration example of the information processing system 10 according to the second modification example of the embodiment of the present disclosure. Note that in these drawings, a local-side control device 350 corresponds to a server for haptics 300 in the embodiment of the present disclosure described above, and a live distribution server 500 corresponds to the live distribution server 500 and the distribution data editing server 400 in the embodiment of the present disclosure described above. Furthermore, in these drawings, haptic data is identification information of a haptic control signal (waveform data) corresponding to a stamp 850 or the haptic control signal itself.

Figure 51:
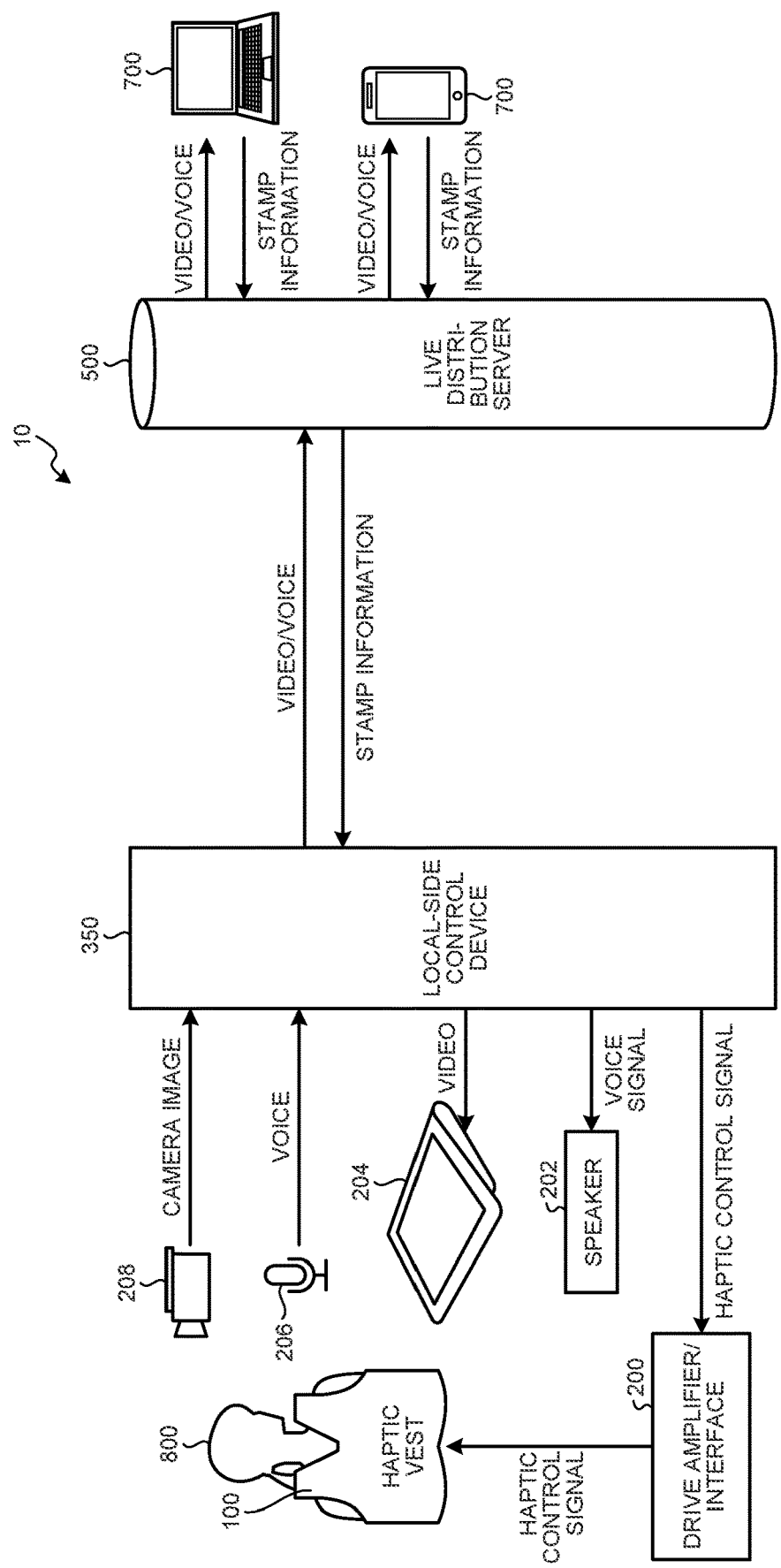
FIG. 51 is a system diagram (part 1) illustrating a schematic configuration example of an information processing system 10 according to a second modification example of an embodiment of the present disclosure.

First, in the information processing system 10 illustrated in FIG. 51, the local-side control device 350 is installed on a side of a distributor 800. On the other hand, the live distribution server 500 is arranged on the cloud side. Furthermore, the local-side control device 350 includes a PC or the like, and is equipped with a browser and software to perform the present embodiment (execute a display of a stamp 850 and transmission to and reception from the live distribution server 500). Furthermore, the local-side control device 350 is equipped with software and a database to control the haptic presentation device 100. Furthermore, each device and software installed on a distributor side of the information processing system 10 may be provided by the same business operator or may be provided by different business operators. Furthermore, the business operator may be the same as or different from a business operator that manages/operates the live distribution server 500.

Figure 52:
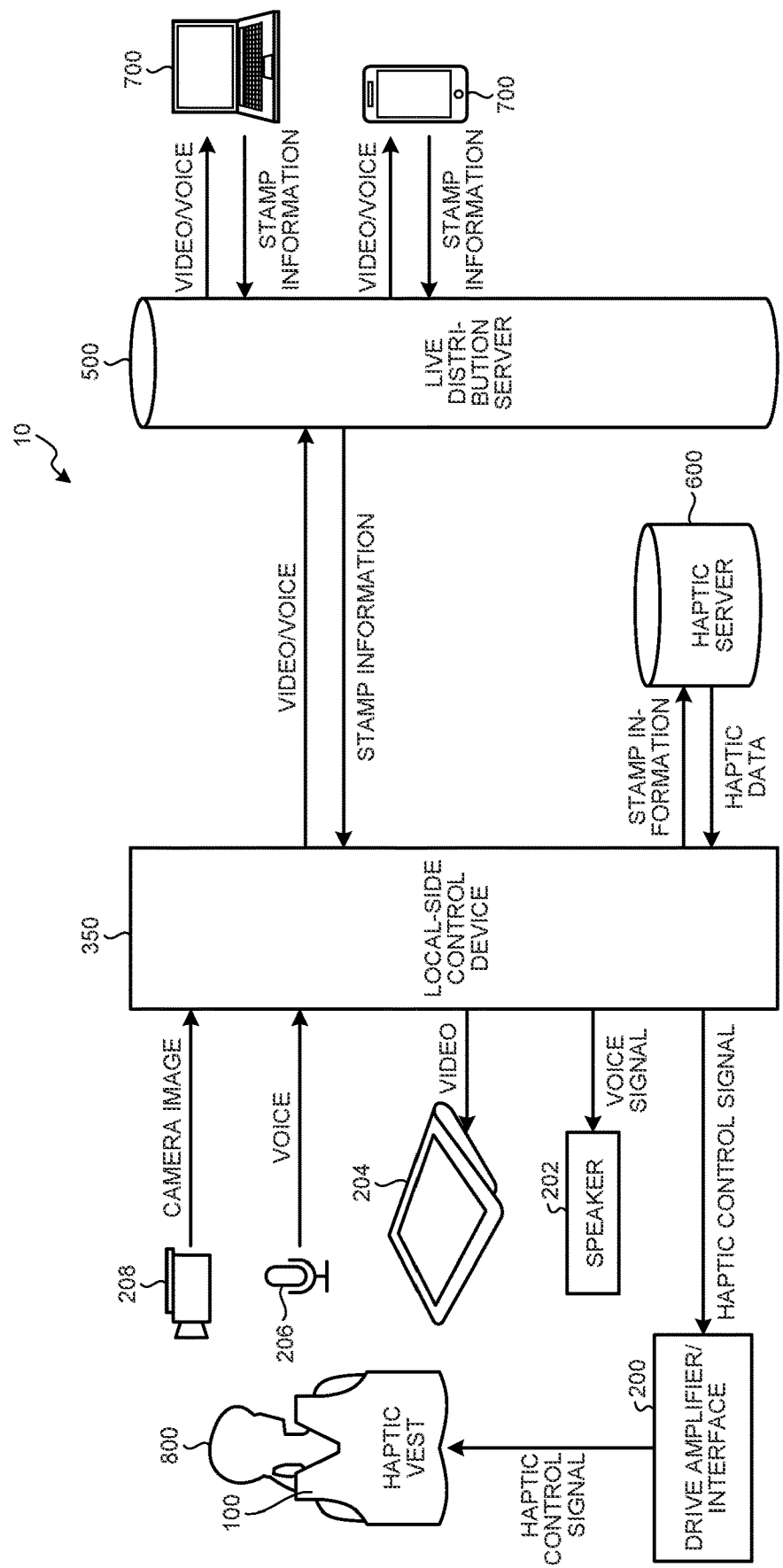
FIG. 52 is a system diagram (part 2) illustrating a schematic configuration example of an information processing system 10 according to the second modification example of the embodiment of the present disclosure.

Next, unlike the information processing system 10 illustrated in FIG. 51, an information processing system 10 illustrated in FIG. 52 includes a haptic server 600 arranged on a cloud side. A local-side control device 350 includes a PC or the like, and can acquire identification information or the like of a haptic control signal (waveform data) associated with identification information of a stamp 850 (stamp information) from the haptic server 600. Note that in the information processing system 10 illustrated in FIG. 52, the haptic server 600 may be a local device installed on a side of a distributor 800.

Figure 53:
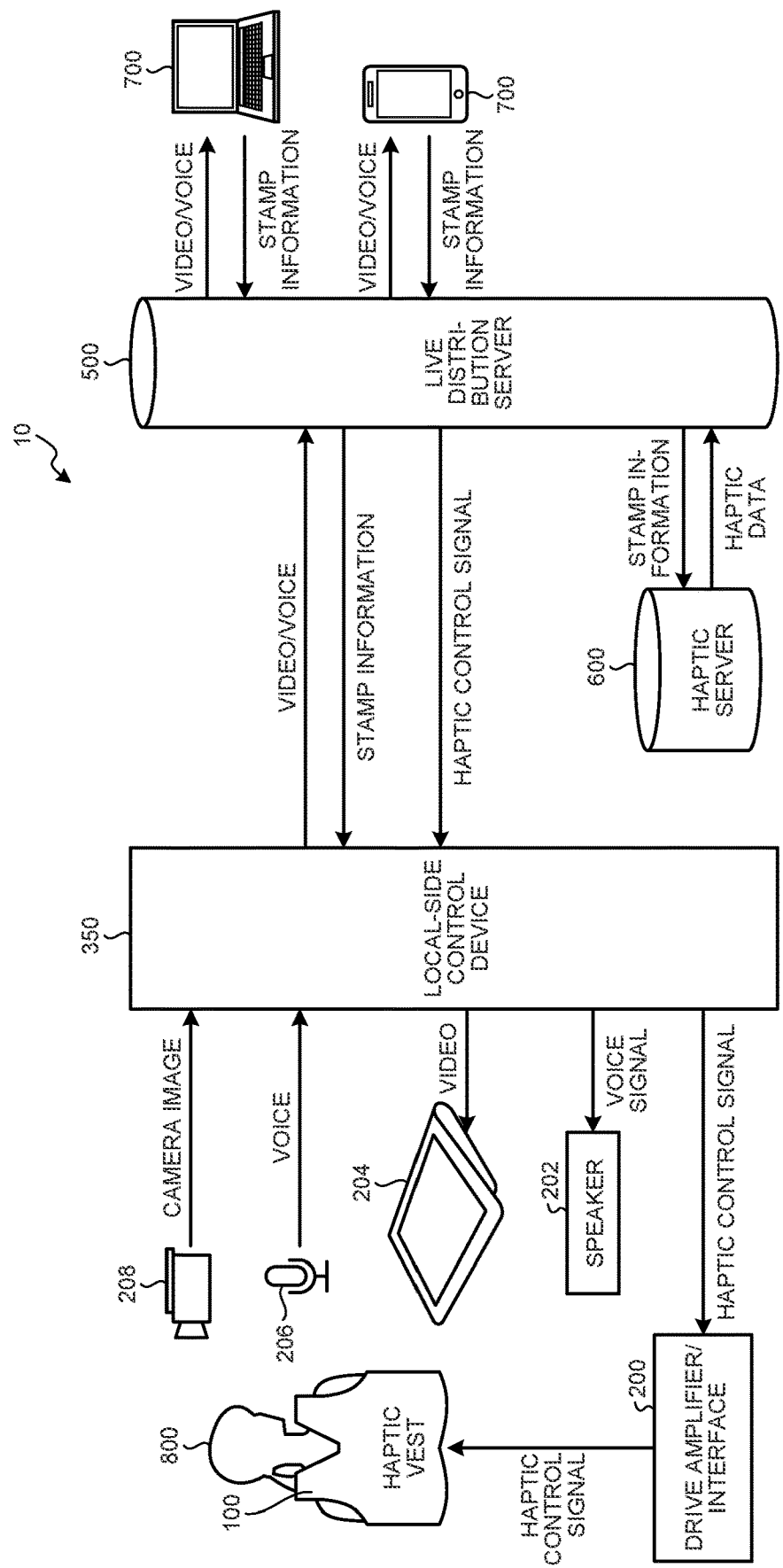
FIG. 53 is a system diagram (part 3) illustrating a schematic configuration example of an information processing system 10 according to the second modification example of the embodiment of the present disclosure.

Next, similarly to the information processing system 10 illustrated in FIG. 52, an information processing system 10 illustrated in FIG. 53 includes a haptic server 600 arranged on a cloud side. However, the information processing system 10 illustrated in FIG. 53 is different from the information processing system 10 illustrated in FIG. 52 in a point that a local-side control device 350 acquires, from the haptic server 600, identification information or the like of a haptic control signal (waveform data) associated with identification information of a stamp 850 (stamp information) via a live distribution server 500.

Figure 54:
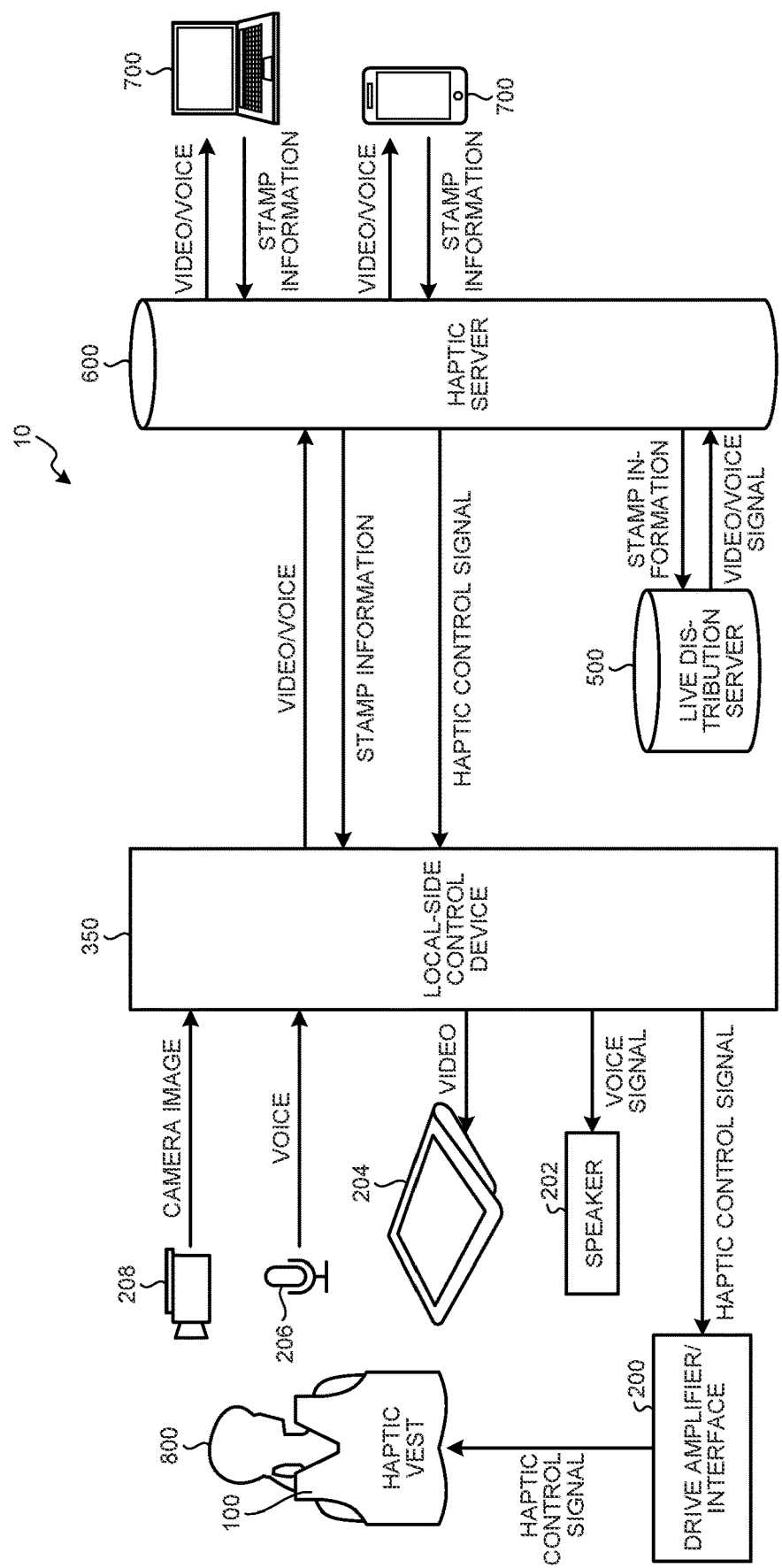
FIG. 54 is a system diagram (part 4) illustrating a schematic configuration example of an information processing system 10 according to the second modification example of the embodiment of the present disclosure.

Furthermore, in an information processing system 10 illustrated in FIG. 54, a local-side control device 350 is installed on a side of a distributor 800. On the other hand, a live distribution server 500 and a haptic server 600 are arranged on a cloud side. The information processing system 10 illustrated in FIG. 54 is different from the information processing system 10 illustrated in FIG. 53, and a local-side control device 350 acquires a video, a voice signal, and the like associated with identification information of a stamp 850 (stamp information) from the live distribution server 500 via the haptic server 600.

15. Method of Outputting a Haptic Stimulus

Figure 55:
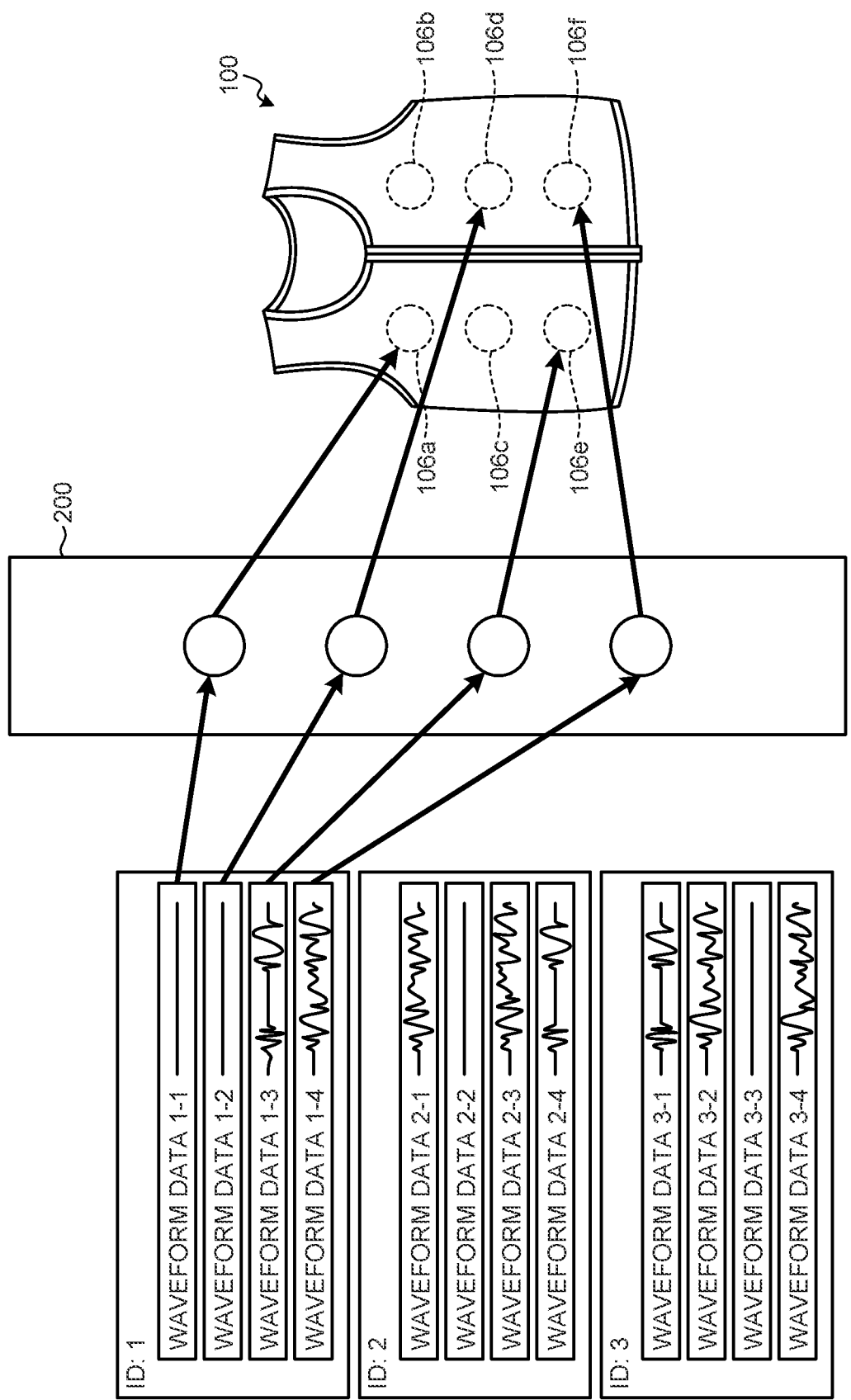
FIG. 55 is an explanatory diagram for describing a method of presenting a haptic stimulus according to an embodiment of the present disclosure.

In each of the above-described embodiments of the present disclosure, the server for haptics 300 refers to identification information of a received stamp 850 and generates/outputs a haptic control signal corresponding to the stamp 850 on the basis of data that is associated with the identification information and is stored in advance. Thus, a specific method of presenting a haptic stimulus in an embodiment of the present disclosure will be described with reference to FIG. 55. FIG. 55 is an explanatory diagram for describing a method of presenting a haptic stimulus according to the embodiment of the present disclosure.

In the present embodiment, for example, as illustrated in FIG. 55, waveform data of a haptic stimulus associated with identification information of a stamp 850 is prepared and stored in the server for haptics 300 or the haptic server 600 in such a manner as to correspond to the haptic stimulation unit 106 that presents the haptic stimulus. Then, the server for haptics 300 or the haptic server 600 transmits a plurality of pieces of waveform data associated with the identification information of the received stamp 850 to the drive amplifier/interface 200. Furthermore, the drive amplifier/interface 200 can present a haptic stimulus by driving designated haptic stimulation units 106a to 106f on the basis of the received waveform data.

Note that in the above description, although it has been described that the waveform data is prepared in such a manner as to correspond to the haptic stimulation unit 106 that presents the haptic stimulus, the present embodiment is not limited thereto. For example, waveform data of a haptic stimulus associated with identification information of a stamp 850 is prepared and stored in the server for haptics 300 or the haptic server 600 without being associated with the haptic stimulation unit 106 that presents the haptic stimulus. Furthermore, it is assumed that the server for haptics 300, the haptic server 600, or the drive amplifier/interface 200 acquires information of specifications (such as the number and positions of the haptic stimulation units 106, and maximum vibration intensity to be applied) of the haptic presentation device 100 from the haptic presentation device 100, or stores the information in advance.

Then, the server for haptics 300 or the haptic server 600 associates (matches) each of a plurality of pieces of waveform data associated with the identification information of the received stamp 850 with each of the haptic stimulation units 106 according to the specifications of the haptic presentation device 100. In such a manner, for example, in a case where the number of pieces of the waveform data prepared in advance is not the same as the number of the haptic stimulation units 106, the server for haptics 300 or the haptic server 600 can transmit only waveform data that matches the specifications of the haptic presentation device 100. Then, the server for haptics 300 or the haptic server 600 transmits the waveform data associated with each of the haptic stimulation units 106 to the drive amplifier/interface 200, and the drive amplifier/interface 200 can present the haptic stimulus by driving each of the haptic stimulation units 106 on the basis of the received waveform data.

16. Modification Example of a Stamp Display

Figure 56:
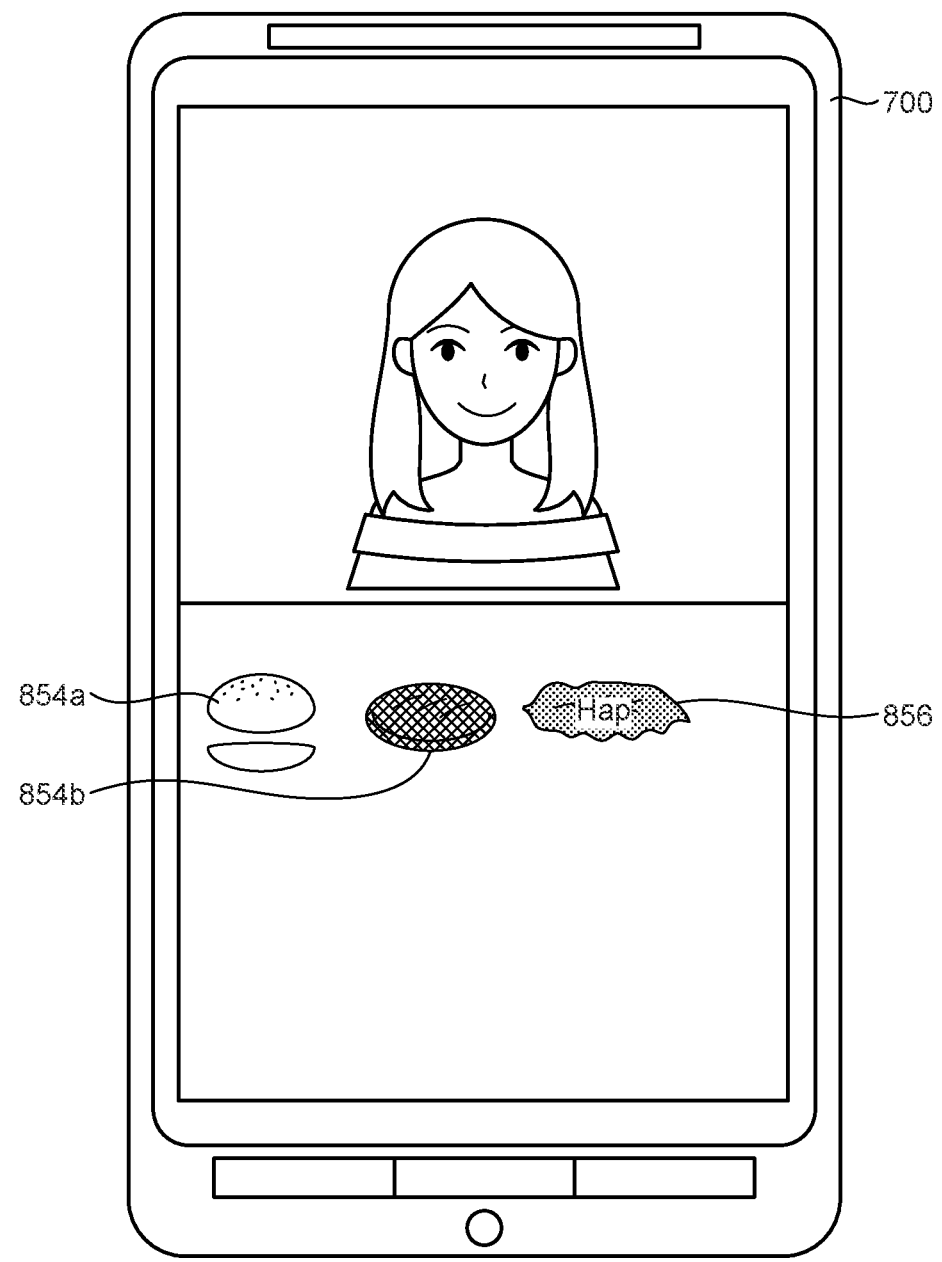
FIG. 56 is an explanatory diagram for describing a display example according to a modification example of an embodiment of the present disclosure.

Furthermore, a display example according to a modification example of an embodiment of the present disclosure will be described with reference to FIG. 56. FIG. 56 is an explanatory diagram for describing a display example according to the modification example of the embodiment of the present disclosure. In each of the embodiments of the present disclosure described above, it has been described that the viewer 900 selects the stamp with a haptic stimulus effect 850. However, this is not a limitation in the present disclosure, and the viewer 900 may be able to select a stamp without a haptic stimulus effect together with the stamp with a haptic stimulus effect 850.

For example, in FIG. 56, a display example of a user terminal 700 of a viewer 900 is illustrated, and stamps without a haptic stimulus effect 854a and 854b are displayed together with a stamp with a haptic stimulus effect 856 in the display example. In the present modification example, by performing an operation on such a display, the viewer 900 can select both a stamp with a haptic stimulus effect 850 and a stamp without a haptic stimulus effect 854.

17. Hardware Configuration

Figure 57:
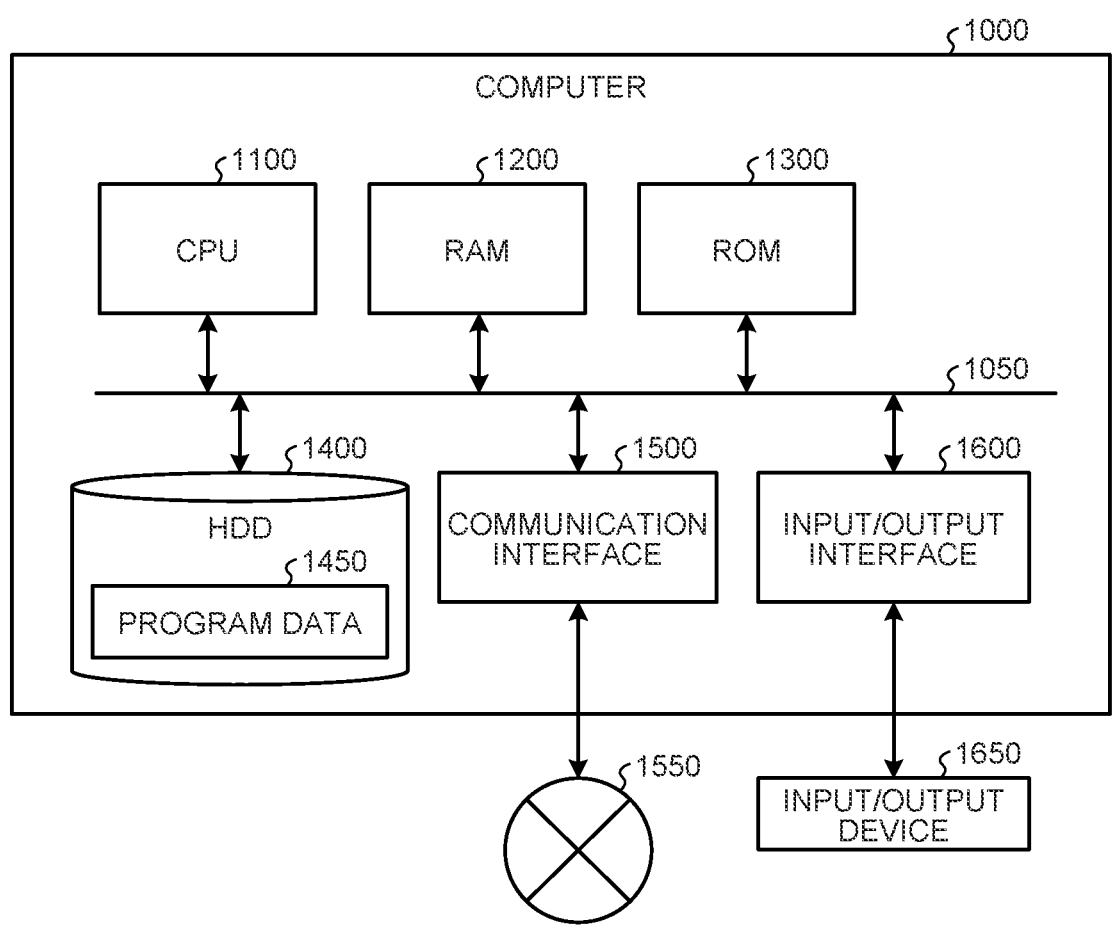
FIG. 57 is a hardware configuration diagram illustrating an example of a computer that realizes a function of the server for haptics 300.

The information processing device such as the server for haptics 300 according to each of the embodiments described above is realized by a computer 1000 having a configuration in a manner illustrated in FIG. 57, for example. Hereinafter, the server for haptics 300 according to each of the embodiments of the present disclosure will be described as an example. FIG. 57 is a hardware configuration diagram illustrating an example of the computer that realizes a function of the server for haptics 300. The computer 1000 includes a CPU 1100, a RAM 1200, a read only memory (ROM) 1300, a hard disc drive (HDD) 1400, a communication interface 1500, and an input/output interface 1600. Each unit of the computer 1000 is connected by a bus 1050.

The CPU 1100 operates on the basis of programs stored in the ROM 1300 or the HDD 1400, and controls each unit. For example, the CPU 1100 expands the programs, which are stored in the ROM 1300 or the HDD 1400, in the RAM 1200 and executes processing corresponding to the various programs.

The ROM 1300 stores a boot program such as a basic input output system (BIOS) executed by the CPU 1100 during activation of the computer 1000, a program that depends on hardware of the computer 1000, and the like.

The HDD 1400 is a computer-readable recording medium that non-temporarily records a program executed by the CPU 1100, data used by the program, and the like. Specifically, the HDD 1400 is a recording medium that records an information processing program according to the present disclosure which program is an example of program data 1450.

The communication interface 1500 is an interface for the computer 1000 to connect to an external network 1550 (such as the Internet). For example, the CPU 1100 receives data from another device or transmits data generated by the CPU 1100 to another device via the communication interface 1500.

The input/output interface 1600 is an interface to connect an input/output device 1650 and the computer 1000. For example, the CPU 1100 receives data from an input device such as a keyboard or mouse via the input/output interface 1600. Also, the CPU 1100 transmits data to an output device such as a display, or a printer via the input/output interface 1600. Also, the input/output interface 1600 may function as a medium interface that reads a program or the like recorded on a predetermined recording medium (medium). The medium is, for example, an optical recording medium such as a digital versatile disc (DVD) or phase change rewritable disk (PD), a magneto-optical recording medium such as a magneto-optical disk (MO), a tape medium, a magnetic recording medium, a semiconductor memory, or the like.

For example, in a case where the computer 1000 functions as the server for haptics 300 according to the embodiment of the present disclosure, the CPU 1100 of the computer 1000 executes an information processing program loaded on the RAM 1200, and realize a function of generating a haptic control signal, or the like. In addition, the HDD 1400 stores an information processing program and the like according to the embodiment of the present disclosure. Note that the CPU 1100 reads the program data 1450 from the HDD 1400 and performs execution thereof, but may acquire these programs from another device via the external network 1550 in another example.

Furthermore, the information processing device according to the present embodiment may be applied to a system including a plurality of devices on the premise of connection to a network (or communication between devices), such as cloud computing. That is, the information processing device according to the present embodiment described above can be also realized as an information processing system that performs processing related to the information processing method according to the present embodiment by a plurality of devices, for example.

18. Supplementary Notes

Furthermore, each of the embodiments described above can include, for example, a program for causing the computer to function as the information processing device according to the present embodiment, and a non-transitory tangible medium on which the program is recorded. Furthermore, the program may be distributed via a communication line (including wireless communication) such as the Internet.

Furthermore, the steps in the processing of each of the embodiments described above may not necessarily be processed in the described order. For example, the steps may be processed in appropriately changed order. In addition, the steps may be processed partially in parallel or individually instead of being processed in time series. Furthermore, the processing method of the steps may not necessarily be processed along the described method, and may be processed by a different method by a different functional block, for example.

Preferred embodiments of the present disclosure have been described in detail in the above with reference to the accompanying drawings. However, a technical scope of the present disclosure is not limited to such examples. It is obvious that a person having ordinary knowledge in the technical field of the present disclosure can conceive various alterations or modifications within the scope of the technical idea described in the claims, and it should be understood that these alterations or modifications naturally belong to the technical scope of the present disclosure.

In addition, the effects described in the present specification are merely illustrative or exemplary, and are not restrictive. That is, in addition to the above effects or instead of the above effects, the technology according to the present disclosure can exhibit a different effect obvious to those skilled in the art from the description of the present specification.

Note that the present technology can also have the following configurations.

(1) An information processing device comprising:
  a first acquisition unit that acquires, according to an input from a first user, a control command including presentation unit information designating a presentation unit that presents a haptic stimulus by a haptic presentation device, and form information designating a form of the haptic stimulus;
  a generation unit that generates, according to the control command, a first haptic control signal to present the haptic stimulus to the presentation unit; and
  a first distribution unit that distributes the first haptic control signal to the haptic presentation device worn on a body of each of a plurality of second users designated by the input by the first user.

(2) The information processing device according to (1), further comprising:
  a second acquisition unit that acquires an image of each of the second users; and
  a second distribution unit that distributes the image of each of the second users to each of display devices that displays the image toward the first user and a third user.

(3) The information processing device according to (2), wherein the first user designates the haptic presentation device of the second user, to which device the first haptic control signal is transmitted, by performing an operation on the image of the second user or a display corresponding to the image of the second user.

(4) The information processing device according to (1), wherein by performing a drag operation on a touch panel held by the first user and an operation of releasing a finger from the touch panel, the first user designates the haptic presentation device of the second user corresponding to a vector in an opposite direction of a vector corresponding to a track of the drag operation as the haptic presentation device of the second user to which device the first haptic control signal is transmitted.

(5) The information processing device according to (4), wherein intensity of the haptic stimulus is determined according to a moving distance or a moving speed of the drag operation.

(6) The information processing device according to (1), wherein the first user designates the haptic presentation device of the second user, to which device the first haptic control signal is transmitted, by performing utterance corresponding the second user.

(7) The information processing device according to (2) or (3), wherein the first distribution unit distributes the first haptic control signal to a device held by the third user.

(8) The information processing device according to (7), wherein the device held by the third user is a vibrator mounted on an electronic device owned by the third user, or the haptic presentation device worn on a body of the third user.

(9) The information processing device according to (8), wherein the generation unit adjusts the first haptic control signal according to a function of the haptic presentation device worn on the body of the third user.

(10) The information processing device according to (7) or (8), wherein the device held by the third user receives, on a basis of a previous setting by the third user, the first haptic control signal distributed to the haptic presentation device of the second user selected from the plurality of second users.

(11) The information processing device according to (2), wherein
  the generation unit generates a second haptic control signal to be distributed to a device held by the third user by superimposing the first haptic control signals provided to the haptic presentation devices of the plurality of second users, and
  the first distribution unit distributes the second haptic control signal to the device held by the third user.

(12) The information processing device according to (11), wherein the generation unit superimposes the first haptic control signals provided to the haptic presentation devices of the plurality of second users in a ratio corresponding to the first haptic control signals transmitted by the third user to the second users in the past or a viewing time of the images of the second user by the third user in the past.

(13) The information processing device according to (2), wherein the first distribution unit distributes the first haptic control signal to a device held by the third user designated by the input by the first user.

(14) The information processing device according to (3), wherein the first distribution unit distributes the first haptic control signal to the haptic presentation device worn on a body of the second user when input timings of the first user and the third user are synchronized.

(15) The information processing device according to (3), wherein the first distribution unit distributes the first haptic control signal to the haptic presentation device worn on a body of the second user when information input by the first user and that by the third user match.

(16) The information processing device according to (1), further comprising
  an input information acquisition unit that acquires information corresponding to the input from the first user from another information processing device capable of communicating with a device held by the first user.

(17) The information processing device according to (16), wherein
  the input information acquisition unit acquires, from the other information processing device, command information corresponding to the input by the first user.

(18) The information processing device according to (1), further comprising:
  a third acquisition unit that acquires a predetermined image according to the input from the first user; and a fourth distribution unit that distributes the predetermined image to a display device that displays the image toward the first user.
(19) An information processing device comprising:
a first acquisition unit that acquires, according to an input from a first user, identification information to specify presentation unit information designating a presentation unit that presents a haptic stimulus by a haptic presentation device and form information designating a form of the haptic stimulus;
a generation unit that generates, on a basis of the identification information and a database stored in advance, a first haptic control signal to present the haptic stimulus to the presentation unit; and
a first distribution unit that distributes the first haptic control signal to the haptic presentation device worn on a body of each of a plurality of second users designated by the input by the first user.
(20) An information processing method comprising:
acquiring, according to an input from a first user, a control command including presentation unit information designating a presentation unit that presents a haptic stimulus by a haptic presentation device, and form information designating a form of the haptic stimulus;
generating, according to the control command, a first haptic control signal to present the haptic stimulus to the presentation unit; and
distributing the first haptic control signal to the haptic presentation device worn on a body of each of a plurality of second users designated by the input by the first user,
the acquiring, generating, and distributing being performed by an information processing device.
(21) A program for causing a computer to realize:
a function of acquiring, according to an input from a first user, a control command including presentation unit information designating a presentation unit that presents a haptic stimulus by a haptic presentation device, and form information designating a form of the haptic stimulus;
a function of generating, according to the control command, a first haptic control signal to present the haptic stimulus to the presentation unit; and
a function of distributing the first haptic control signal to the haptic presentation device worn on a body of each of a plurality of second users designated by the input by the first user.
(22) An information processing system comprising: an information processing device; and a distribution device, wherein
the information processing device includes
a first acquisition unit that acquires, according to an input from a first user, a control command including presentation unit information designating a presentation unit that presents a haptic stimulus by a haptic presentation device, and form information designating a form of the haptic stimulus,
a generation unit that generates, according to the control command, a first haptic control signal to present the haptic stimulus to the presentation unit, and
a first distribution unit that distributes the first haptic control signal to the haptic presentation device worn on a body of each of a plurality of second users designated by the input by the first user, and the distribution device includes
an image generation unit that superimposes a predetermined image, which is generated on a basis of the input, on an image of a real space distributed to the first user.
(23) The information processing system according to (22), wherein the distribution device includes a device on a cloud.

REFERENCE SIGNS LIST

10 INFORMATION PROCESSING SYSTEM
100 HAPTIC PRESENTATION DEVICE
102, 302, 402, 502, 708 COMMUNICATION UNIT
104, 710 CONTROL UNIT
106, 106a, 106b, 106c, 106d, 106e, 106f HAPTIC STIMULATION UNIT
108 OPERATION UNIT
200 DRIVE AMPLIFIER/INTERFACE
202, 706 SPEAKER
204 MONITOR
206, 724 MICROPHONE
208, 722 CAMERA
300, 300a SERVER FOR HAPTICS
304, 404 CAMERA IMAGE ACQUISITION UNIT
306, 410 MICROPHONE VOICE ACQUISITION UNIT
308, 408, 506 STAMP ACQUISITION UNIT
310 HAPTIC SIGNAL GENERATION UNIT
312 DISTRIBUTOR STATE ACQUISITION UNIT
314 OUTPUT IMAGE ACQUISITION UNIT
316, 414 OUTPUT VOICE ACQUISITION UNIT
318, 416, 518, 712 STORAGE UNIT
350 LOCAL-SIDE CONTROL DEVICE
400 DISTRIBUTION DATA EDITING SERVER
406 IMAGE GENERATION UNIT
412 VOICE GENERATION UNIT
500 LIVE DISTRIBUTION SERVER
504 GUI CONTROL UNIT
508 VOICE DATA ACQUISITION UNIT
510 IMAGE DATA ACQUISITION UNIT
512 HAPTIC SIGNAL ACQUISITION UNIT
514 VIEWER INFORMATION ACQUISITION UNIT
516 DISTRIBUTION CONTROL UNIT
600 HAPTIC SERVER
700 USER TERMINAL
702 DISPLAY UNIT
704 OPERATION INPUT UNIT
720 SENSOR UNIT
726 GYROSCOPE SENSOR
728 ACCELERATION SENSOR
800, 800a, 800b, 800c DISTRIBUTOR
840 WAVEFORM IMAGE
842, 872, 874, 880, 980 DISPLAY
850, 850a, 850b, 850c, 850d, 852, 854, 854a, 854b, 856 STAMP
860 COMMENT
870a, 870b, 890, 892 ICON
900 VIEWER
910 VECTOR
950 DISPLAY IMAGE
960a, 960b, 970 REGION

The invention claimed is:

1. An information processing device comprising:
    circuitry configured to
        acquire, according to an input from a first user,
            a control command including presentation unit information designating a presentation unit that presents a haptic stimulus by a haptic presentation device, and
            form information designating a form of the haptic stimulus,
        generate, according to the control command, a first haptic control signal to present the haptic stimulus to the presentation unit, and
        distribute the first haptic control signal to the haptic presentation device worn on a body of each of a plurality of second users designated by the input by the first user,
    wherein by performing a drag operation on a touch panel held by the first user and an operation of releasing a finger from the touch panel, the first user designates the haptic presentation device of the second user corresponding to a vector in an opposite direction of a vector corresponding to a track of the drag operation as the haptic presentation device of the second user to which device the first haptic control signal is transmitted.

2. The information processing device according to claim 1,
    wherein the circuitry is further configured to
        acquire an image of each of the second users, and
        distribute the image of each of the second users to each of a plurality of display devices configured to display the image toward the first user and a third user.

3. The information processing device according to claim 2,
    wherein the first user designates the haptic presentation device of the second user, to which device the first haptic control signal is transmitted, by performing the drag operation on the image of the second user or on a display of the touch panel corresponding to the image of the second user.

4. The information processing device according to claim 1,
    wherein intensity of the haptic stimulus is determined according to a moving distance or a moving speed of the drag operation.

5. The information processing device according to claim 1,
    wherein the first user designates the haptic presentation device of the second user, to which device the first haptic control signal is transmitted, by performing utterance corresponding the second user.

6. The information processing device according to claim 2,
    wherein the circuitry distributes the first haptic control signal to a device held by the third user.

7. The information processing device according to claim 6,
    wherein the device held by the third user is a vibrator mounted on an electronic device owned by the third user, or the haptic presentation device worn on a body of the third user.

8. The information processing device according to claim 7,
    wherein the circuitry is further configured to adjust the first haptic control signal according to a function of the haptic presentation device worn on the body of the third user.

9. The information processing device according to claim 6,
    wherein the device held by the third user receives, on a basis of a previous setting by the third user, the first haptic control signal distributed to the haptic presentation device of the second user selected from the plurality of second users.

10. The information processing device according to claim 2,
    wherein the circuitry is further configured to
        generate a second haptic control signal to be distributed to a device held by the third user by superimposing the first haptic control signals provided to the haptic presentation devices of the plurality of second users, and
        distribute the second haptic control signal to the device held by the third user.

11. The information processing device according to claim 10,
    wherein the circuitry is further configured to superimpose the first haptic control signals provided to the haptic presentation devices of the plurality of second users in a ratio corresponding to the first haptic control signals transmitted by the third user to the second users in the past or a viewing time of the images of the second user by the third user in the past.

12. The information processing device according to claim 2,
    wherein the circuitry distributes the first haptic control signal to a device held by the third user designated by the input by the first user.

13. The information processing device according to claim 3,
    wherein the circuitry distributes the first haptic control signal to the haptic presentation device worn on a body of the second user when input timings of the first user and the third user are synchronized.

14. The information processing device according to claim 3,
    wherein the circuitry distributes the first haptic control signal to the haptic presentation device worn on a body of the second user when information input by the first user and that by the third user match.

15. The information processing device according to claim 1,
    wherein the circuitry is further configured to acquire information corresponding to the input from the first user from another information processing device configured to communicate with a device held by the first user.

16. The information processing device according to claim 15,
    wherein the circuitry acquires, from the other information processing device, the information including command information corresponding to the input by the first user.

17. The information processing device according to claim 1, wherein the circuitry is further configured to
    acquire a predetermined image according to the input from the first user; and
    distribute the predetermined image to a display device configured to display the image toward the first user.

18. An information processing device comprising:
circuitry configured to
  acquire, according to an input from a first user,
    identification information to specify presentation unit information designating a presentation unit that presents a haptic stimulus by a haptic presentation device, and
    form information designating a form of the haptic stimulus,
  generate, on a basis of the identification information and a database stored in advance, a first haptic control signal to present the haptic stimulus to the presentation unit; and
  distribute the first haptic control signal to the haptic presentation device worn on a body of each of a plurality of second users designated by the input by the first user,
wherein by performing a drag operation on a touch panel held by the first user and an operation of releasing a finger from the touch panel, the first user designates the haptic presentation device of the second user corresponding to a vector in an opposite direction of a vector corresponding to a track of the drag operation as the haptic presentation device of the second user to which device the first haptic control signal is transmitted.

19. An information processing method comprising:
acquiring, according to an input from a first user,
  a control command including presentation unit information designating a presentation unit that presents a haptic stimulus by a haptic presentation device, and
  form information designating a form of the haptic stimulus;
generating, according to the control command, a first haptic control signal to present the haptic stimulus to the presentation unit; and
distributing the first haptic control signal to the haptic presentation device worn on a body of each of a plurality of second users designated by the input by the first user,
wherein the acquiring, the generating, and the distributing are performed by an information processing device, and
wherein by performing a drag operation on a touch panel held by the first user and an operation of releasing a finger from the touch panel, the first user designates the haptic presentation device of the second user corresponding to a vector in an opposite direction of a vector corresponding to a track of the drag operation as the haptic presentation device of the second user to which device the first haptic control signal is transmitted.

20. A non-transitory computer-readable storage medium having embodied thereon a program, which when executed by a computer causes the computer to execute a method, the method comprising:
acquiring, according to an input from a first user,
  a control command including presentation unit information designating a presentation unit that presents a haptic stimulus by a haptic presentation device, and
  form information designating a form of the haptic stimulus;
generating, according to the control command, a first haptic control signal to present the haptic stimulus to the presentation unit; and
distributing the first haptic control signal to the haptic presentation device worn on a body of each of a plurality of second users designated by the input by the first user,
wherein by performing a drag operation on a touch panel held by the first user and an operation of releasing a finger from the touch panel, the first user designates the haptic presentation device of the second user corresponding to a vector in an opposite direction of a vector corresponding to a track of the drag operation as the haptic presentation device of the second user to which device the first haptic control signal is transmitted.

21. An information processing system comprising:
an information processing device; and
a distribution device,
wherein the information processing device includes circuitry configured to
  acquire, according to an input from a first user,
    a control command including presentation unit information designating a presentation unit that presents a haptic stimulus by a haptic presentation device, and
    form information designating a form of the haptic stimulus,
  generate, according to the control command, a first haptic control signal to present the haptic stimulus to the presentation unit, and
  distribute the first haptic control signal to the haptic presentation device worn on a body of each of a plurality of second users designated by the input by the first user,
wherein the distribution device includes circuitry configured to superimpose a predetermined image, which is generated on a basis of the input, on an image of a real space distributed to the first user, and
wherein by performing a drag operation on a touch panel held by the first user and an operation of releasing a finger from the touch panel, the first user designates the haptic presentation device of the second user corresponding to a vector in an opposite direction of a vector corresponding to a track of the drag operation as the haptic presentation device of the second user to which device the first haptic control signal is transmitted.

22. The information processing system according to claim 21, wherein the distribution device includes a device on a cloud.

* * * * *